US007689133B2

(12) United States Patent
Katagiri et al.

(10) Patent No.: US 7,689,133 B2
(45) Date of Patent: Mar. 30, 2010

(54) OPTICAL SIGNAL RECEPTION DEVICE AND METHOD OF CONTROLLING OPTICAL SIGNAL RECEPTION

(75) Inventors: Toru Katagiri, Kawasaki (JP); Takeshi Hoshida, Kawasaki (JP); Tomoo Takahara, Kawasaki (JP); Kentaro Nakamura, Kawasaki (JP); Naoki Kuwata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 779 days.

(21) Appl. No.: 11/510,729

(22) Filed: Aug. 28, 2006

(65) Prior Publication Data
US 2007/0065157 A1  Mar. 22, 2007

Related U.S. Application Data

(63) Continuation-in-part of application No. 11/282,886, filed on Nov. 21, 2005, now abandoned.

(30) Foreign Application Priority Data

Feb. 28, 2005  (JP) ............................. 2005-054371
Jul. 15, 2005   (JP) ............................. 2005-206467
Apr. 20, 2006  (JP) ............................. 2006-116291

(51) Int. Cl.
*H04B 10/06* (2006.01)

(52) U.S. Cl. ..................... 398/204; 398/155; 398/154; 398/188; 398/202

(58) Field of Classification Search ......... 398/202–211, 398/188, 155, 154, 174; 375/330
See application file for complete search history.

(56) References Cited

U.S. PATENT DOCUMENTS 6,567,480 B1 *   5/2003   Brardjanian et al. ......... 375/331

(Continued)

FOREIGN PATENT DOCUMENTS

EP   1 335 510   8/2003

(Continued)

OTHER PUBLICATIONS

A Standalone Burst-Mode Receiver With Clock and Data Recovery, Clock Phase Alignment, and RS(255, 239) Codes for SAC-OCDMA Applications Bhavin J. Shastri, Ziad A. Ei-Sahn, Ming Zeng, Noha Kheder, Leslie A. Rusch, and David V. Phan.*

(Continued)

*Primary Examiner*—Ken N Vanderpuye
*Assistant Examiner*—Hibret A Woldekidan
(74) *Attorney, Agent, or Firm*—Staas & Halsey LLP

(57) ABSTRACT

An optical signal reception device is disclosed that receives and demodulates an optical signal modulated by DQPSK and performs logical inversion and other controls to transit to the object reception state. The signal reception device includes a front end including a delay interferometer and an opto-electric conversion element that receive the DQPSK optical signal and convert it into an in-phase signal and a quadrature-phase signal, a clock regenerator that regenerates a clock signal based on the in-phase signal and the quadrature-phase signal, a multiplexer that multiplexes the in-phase signal and the quadrature-phase signal, a reception frame processing unit that detects frame synchronization based on the signal multiplexed by the multiplexer and de-maps the received frames, and a controller that, based on out-of-frame-synchronization information (LOF/OOF) from the reception frame processing unit, performs logical inversion control in the clock regenerator, multiplexing timing control in the multiplexer, and controls the delay interferometer in the front end so as to transit to the object reception state.

8 Claims, 42 Drawing Sheets

U.S. PATENT DOCUMENTS

| | | | |
|---|---|---|---|
| 7,333,732 B2 * | 2/2008 | Domagala, Jerzy | 398/155 |
| 7,389,055 B1 * | 6/2008 | Rickard et al. | 398/206 |
| 2003/0058499 A1 | 3/2003 | Reingand et al. | |
| 2004/0081470 A1 * | 4/2004 | Griffin | 398/188 |
| 2004/0141222 A1 * | 7/2004 | Miyazaki et al. | 359/237 |
| 2005/0074245 A1 * | 4/2005 | Griffin | 398/188 |

FOREIGN PATENT DOCUMENTS

| | | |
|---|---|---|
| EP | 1 499 044 | 1/2005 |
| JP | 2004-516743 | 6/2004 |
| JP | 2004-533163 | 10/2004 |
| WO | WO 02/51041 | 6/2002 |
| WO | WO 02/091660 | 11/2002 |
| WO | 03/063515 | 7/2003 |

OTHER PUBLICATIONS

A Standalone Receiver With Multiple AccessInterference Rejection, Clock and Data Recovery, and FEC for 2-D_t OCDMA Julien Faucher,Simon Ayotte, Ziad A. El-Sahn, Mustansir Y. Mukadam, Leslie A. Rusch, and David V. Plant.*

Pak S. Cho, et al., "Transmission of 25-Gb/s RZ-DQPSK Signals With 25-Ghz Channel Spacing Over 1000 Km of SMF-28 Fiber," *IEEE Photonics Technology Letter*, vol. 15, No. 3, Mar. 2003, pp. 473-475.

Hoon Kim, et al., "Transmission of 8×20 Gb/s DQPSK Signals Over 310-Km SMF with 0.8-b/s Hz Spectral Efficiency," *IEEE Photonics Technology Letters*, vol. 15, No. 5, May 2003, pp. 769-771.

Noboru Yoshikane, et al., "1.14 b/s spectrally-efficent 50×85.4 Gb/s transmission over 300 km using copolarized CS-RZ DQPSK signals," *Technical Digest of 2004*, Postdeadline Paper, PDP38.

JP 2004-516743 (Reference AB) corresponds to PCT WO 02/51041 (Reference AA) in Form PTO-1449 hereof.

JP 2004-533163 (Reference AD) corresponds to PCT WO 02/091660 (Reference AC) in Form PTO-1449 hereof.

Extended European Search Report issued in corresponding European Patent Application No. 05025496.0, on January 30, 2008.

\* cited by examiner

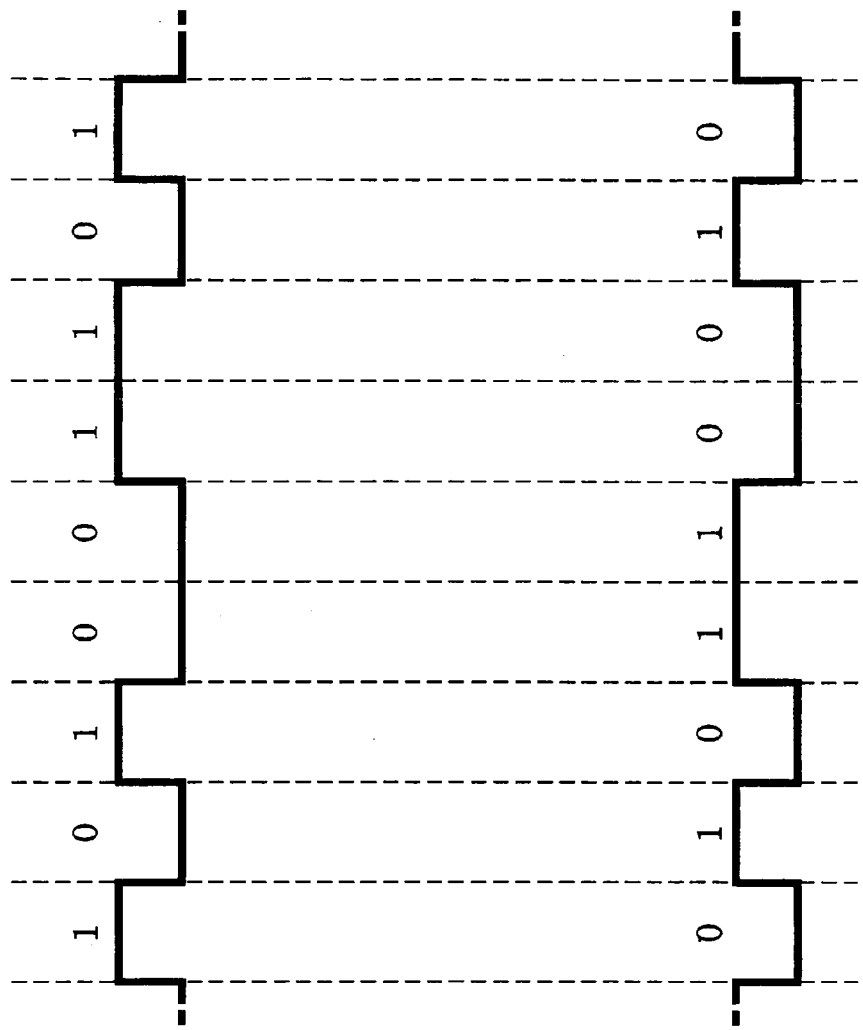
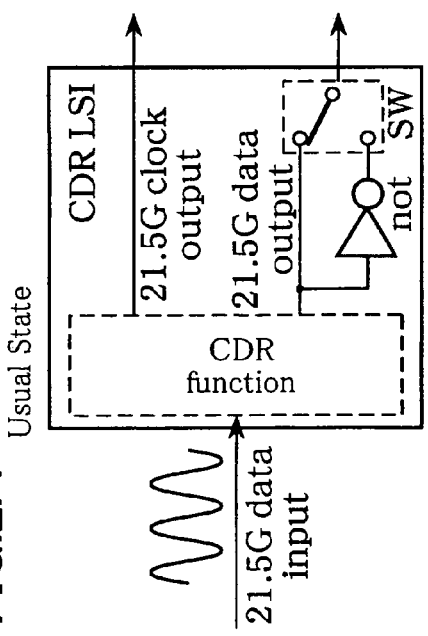
FIG.2A Usual State
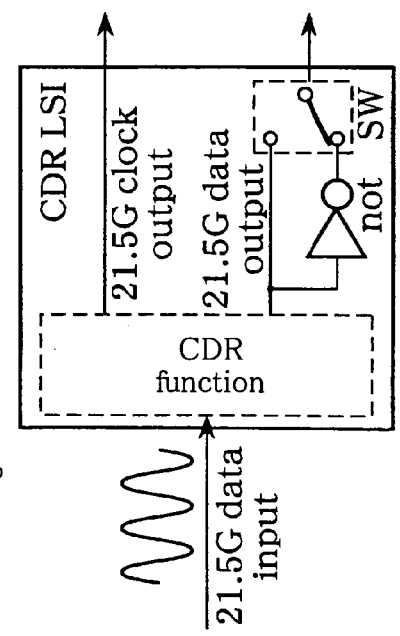
FIG.2B Logical Inversion State

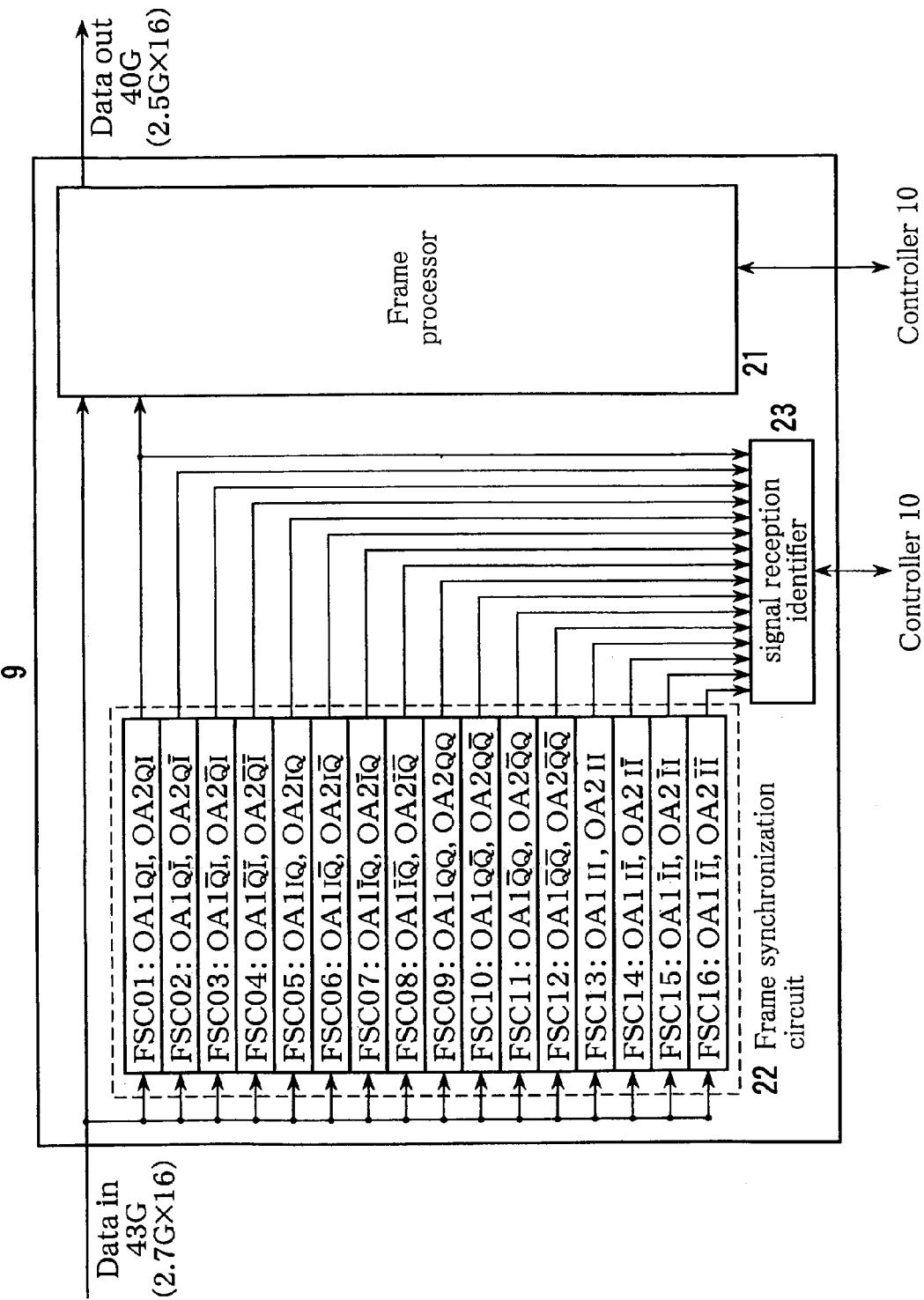

FIG.5

| | | Port A | | | |
|---|---|---|---|---|---|
| | | I | $\bar{I}$ | $\bar{Q}$ | Q |
| Port B | I | ×<br>OA1II={"1111 1100"}<br>OA2II={"0000 0000"} | ×<br>OA1$\bar{I}$I={"0101 0110"}<br>OA2$\bar{I}$I={"1010 1010"} | ○<br>OA1$\bar{Q}$I={"0101 1100"}<br>OA2$\bar{Q}$I={"1000 0010"} | ◎<br>OA1QI={"1111 0110"}<br>OA2QI={"0010 1000"} |
| | $\bar{I}$ | ×<br>OA1I$\bar{I}$={"1010 1001"}<br>OA2I$\bar{I}$={"0101 0101"} | ×<br>OA1$\bar{I}\bar{I}$={"0000 0011"}<br>OA2$\bar{I}\bar{I}$={"1111 1111"} | ○<br>OA1$\bar{Q}\bar{I}$={"0000 1001"}<br>OA2$\bar{Q}\bar{I}$={"1101 0111"} | ○<br>OA1Q$\bar{I}$={"1010 0011"}<br>OA2Q$\bar{I}$={"0111 1101"} |
| | $\bar{Q}$ | △<br>OA1I$\bar{Q}$={"1010 1100"}<br>OA2I$\bar{Q}$={"0100 0001"} | △<br>OA1$\bar{I}\bar{Q}$={"0000 0110"}<br>OA2$\bar{I}\bar{Q}$={"1110 1011"} | ×<br>OA1$\bar{Q}\bar{Q}$={"0000 1100"}<br>OA2$\bar{Q}\bar{Q}$={"1100 0011"} | ×<br>OA1Q$\bar{Q}$={"1010 0110"}<br>OA2Q$\bar{Q}$={"0110 1001"} |
| | Q | △<br>OA1IQ={"1111 1100"}<br>OA2IQ={"0001 0100"} | △<br>OA1$\bar{I}$Q={"0101 0011"}<br>OA2$\bar{I}$Q={"1011 1110"} | ×<br>OA1$\bar{Q}$Q={"0101 0110"}<br>OA2$\bar{Q}$Q={"0110 1001"} | ×<br>OA1QQ={"1111 0011"}<br>OA2QQ={"0011 1100"} |

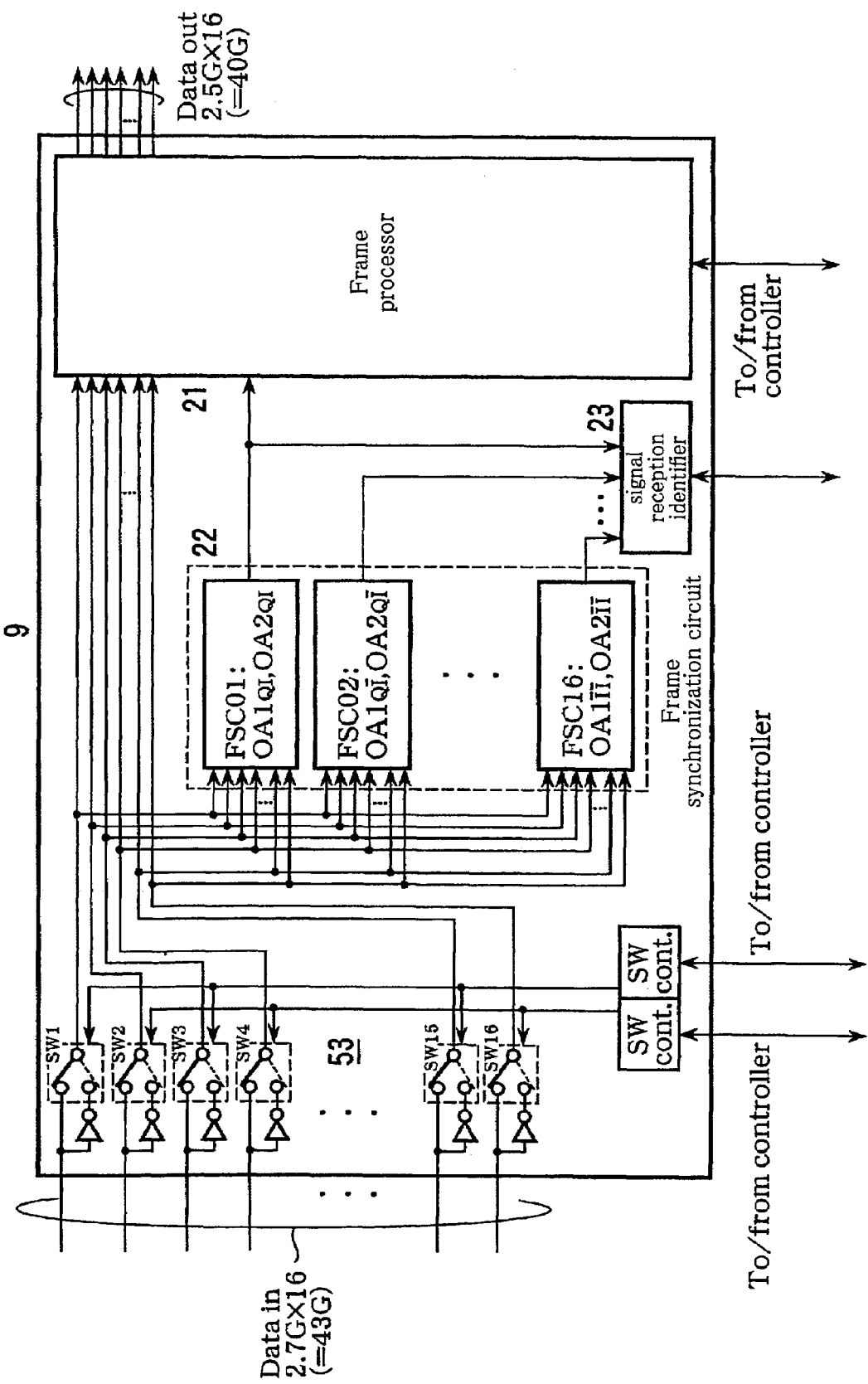

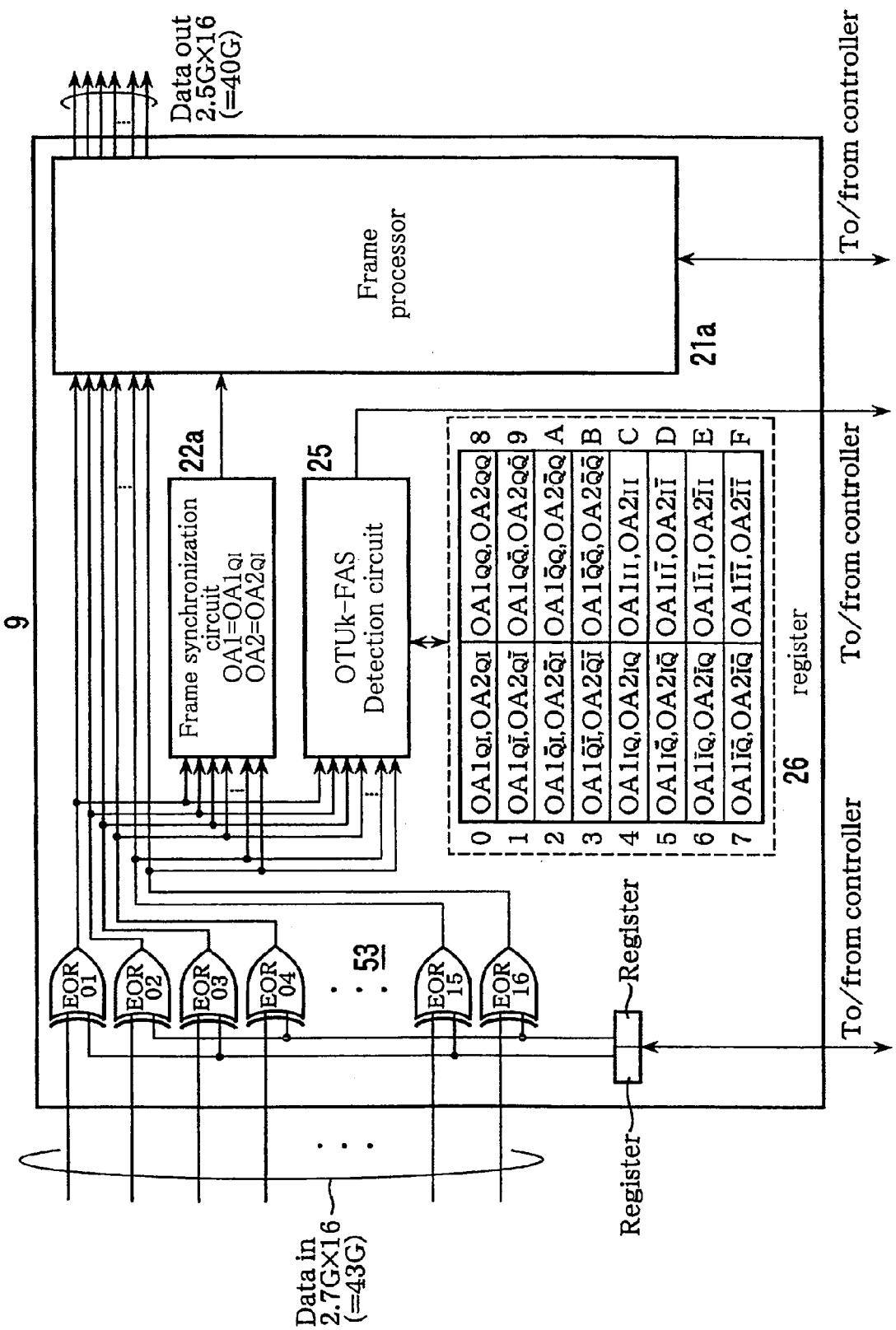

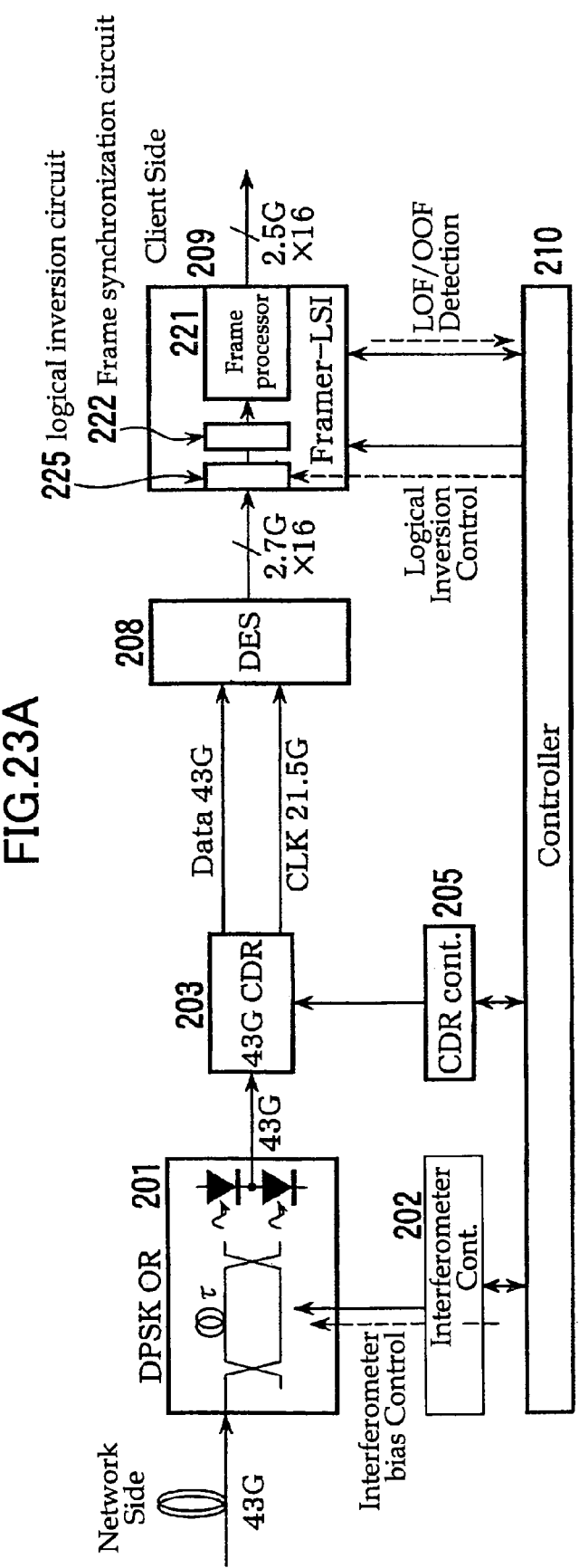

FIG. 30

| No. | NDQPSK comparison pattern (16 bits) | reception state (1) | | | | | | reception state (2) | | | | | |
|---|---|---|---|---|---|---|---|---|---|---|---|---|---|
| | | reception state (odd, even) | status | logic state control | | | | reception state (odd, even) | status | logic state control | | | |
| | | | | logic inversion odd | logic inversion even | BS | 1D MZ1 | | | logic inversion odd | logic inversion even | BS | 1D MZ1 |
| 1 | 1111 1100 0000 0000 | Qk, Qk | × | | | | | Qk, Qk+1 | × | | | | ✓ |
| 2 | 1010 1001 0101 0101 | Qk, Q̄k | × | | | | ✓ | Q̄k, Qk+1 | × | | | | ✓ |
| 3 | 1010 1100 0100 0001 | Qk, Īk | △ | | ✓ | | | Īk, Qk+1 | △ | | | ✓ | |
| 4 | 1111 1001 0001 0100 | Qk, Ik | ◇ | | | | | Ik, Qk+1 | ◇ | | ✓ | ✓ | |
| 5 | 0101 0110 1010 1010 | Q̄k, Qk | × | | | ✓ | | Qk, Q̄k+1 | × | | | | ✓ |
| 6 | 0000 0011 1111 1111 | Q̄k, Q̄k | × | | | ✓ | | Q̄k, Q̄k+1 | × | | | | ✓ |
| 7 | 0000 0110 1110 1011 | Q̄k, Īk | △ | ✓ | | | | Īk, Q̄k+1 | △ | ✓ | | | |
| 8 | 0101 0011 1011 1110 | Q̄k, Ik | △ | ✓ | | | | Ik, Q̄k+1 | △ | ✓ | ✓ | | |
| 9 | 0101 1100 1000 0010 | Īk, Qk | ○ | ✓ | | | | Qk, Īk+1 | ○ | | ✓ | | |
| 10 | 0000 1001 1101 0111 | Īk, Q̄k | ○ | ✓ | | | | Q̄k, Īk+1 | ○ | | | | |
| 11 | 0000 1100 1100 0011 | Īk, Īk | × | | | | | Īk, Īk+1 | × | | | | |
| 12 | 0101 1001 1001 0110 | Īk, Ik | × | | | | | Ik, Īk+1 | × | | | ✓ | ✓ |
| 13 | 1111 0110 0010 1000 | Ik, Qk | ◎ | | | | | Qk, Ik+1 | ◎ | | | ✓ | |
| 14 | 1010 0011 0111 1101 | Ik, Q̄k | ○ | | ✓ | | | Q̄k, Ik+1 | ○ | ✓ | | | |
| 15 | 1010 0110 0110 1001 | Ik, Īk | × | | | | ✓ | Īk, Ik+1 | × | | | | ✓ |
| 16 | 1111 0011 0011 1100 | Ik, Ik | × | | | | ✓ | Ik, Ik+1 | × | | | | ✓ |

BS: bit swap control   1D: 1 bit delay control   MZI: interferometer control

FIG.32

| No. | NDQPSK comparison pattern (16 bits) | reception state (1) | | | | | | reception state (2) | | | | | |
|---|---|---|---|---|---|---|---|---|---|---|---|---|---|
| | | reception state (odd,even) | status | logic state control | | | | reception state (odd,even) | status | logic state control | | | |
| | | | | logic inversion | | BS | 1D | | | logic inversion | | BS | 1D |
| | | | | odd | even | | | | | odd | even | | |
| 1 | 1010 1100 0100 0001 | $Q_k, \overline{I_k}$ | △ | ✓ | | ✓ | | $\overline{I_k}, Q_{k+1}$ | △ | ✓ | | ✓ | ✓ |
| 2 | 1111 1001 0001 0100 | $Q_k, I_k$ | ◇ | ✓ | | ✓ | | $I_k, Q_{k+1}$ | ◇ | | | ✓ | ✓ |
| 3 | 0000 0110 1110 1011 | $\overline{Q_k}, I_k$ | △ | ✓ | | ✓ | | $\overline{I_k}, \overline{Q_{k+1}}$ | △ | ✓ | ✓ | ✓ | ✓ |
| 4 | 0101 0011 1011 1110 | $\overline{Q_k}, I_k$ | △ | ✓ | | ✓ | | $I_k, \overline{Q_{k+1}}$ | △ | ✓ | ✓ | ✓ | ✓ |
| 5 | 0101 1100 1000 0010 | $I_k, Q_k$ | ○ | ✓ | | | | $Q_k, I_{k+1}$ | ○ | | ✓ | | |
| 6 | 0000 1001 1101 0111 | $\overline{I_k}, Q_k$ | ○ | ✓ | | | | $\overline{Q_k}, I_{k+1}$ | ○ | | ✓ | | |
| 7 | 1111 0110 0010 1000 | $I_k, Q_k$ | ◎ | | | | | $Q_k, I_{k+1}$ | ◎ | ✓ | | | |
| 8 | 1010 0011 0111 1101 | $I_k, \overline{Q_k}$ | ○ | | ✓ | | | $\overline{Q_k}, I_{k+1}$ | ○ | ✓ | | | |

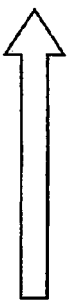

FIG.34

| No. | NDQPSK comparison pattern (16 bits) | reception state (1) | | | | | | reception state (2) | | | | | |
|---|---|---|---|---|---|---|---|---|---|---|---|---|---|
| | | reception state (odd,even) | status | logic state control | | | | reception state (odd,even) | status | logic state control | | | |
| | | | | logic inversion | | BS | 1D | | | logic inversion | | BS | 1D |
| | | | | odd | even | | | | | odd | even | | |
| 1 | 1010 1100 0100 0001 | $Q_k, \overline{I_k}$ | △ | | | ✓ | | $\overline{I_k}, Q_{k+1}$ | △ | ✓ | | ✓ | ✓ |
| 2 | 0101 0011 1011 1110 | $\overline{Q_k}, I_k$ | △ | ✓ | ✓ | ✓ | | $I_k, \overline{Q_{k+1}}$ | △ | ✓ | ✓ | ✓ | ✓ |
| 3 | 0000 1001 1101 0111 | $\overline{I_k}, Q_k$ | ○ | ✓ | | | | $\overline{Q_k}, I_{k+1}$ | ○ | | ✓ | | |
| 4 | 1111 0110 0010 1000 | $I_k, Q_k$ | ◎ | | | | | $Q_k, I_{k+1}$ | ◎ | | | | |

FIG.36

| No. | NDQPSK comparison pattern (16 bits) | reception state (1) | | | | | | reception state (3) | | | | | |
|---|---|---|---|---|---|---|---|---|---|---|---|---|---|
| | | reception state (odd,even) | status | logic inversion odd | logic inversion even | BS | 1D | reception state (odd,even) | status | logic inversion odd | logic inversion even | BS | 1D |
| 1 | 1010 1100 0100 0001 | $Q_k, \overline{I_k}$ | △ | | ✓ | ✓ | | $\overline{I_k}, Q_{k+1}$ | △ | | | ✓ | ✓ |
| 2 | 1111 1001 0001 0100 | $Q_k, I_k$ | ◇ | | | ✓ | | $I_k, Q_{k+1}$ | ◇ | | | ✓ | ✓ |
| 3 | 0000 0110 1110 1011 | $\overline{Q_k}, I_k$ | △ | ✓ | | ✓ | | $\overline{I_k}, \overline{Q_{k+1}}$ | △ | ✓ | | ✓ | ✓ |
| 4 | 0101 0011 1011 1110 | $\overline{Q_k}, I_k$ | △ | ✓ | ✓ | | | $I_k, \overline{Q_{k+1}}$ | △ | ✓ | | ✓ | ✓ |
| 5 | 0101 1100 1000 0010 | $\overline{I_k}, \overline{Q_k}$ | ○ | ✓ | | | | $\overline{Q_k}, I_{k+1}$ | ○ | ✓ | | | |
| 6 | 0000 1001 1101 0111 | $I_k, \overline{Q_k}$ | ○ | | ✓ | | | $\overline{Q_k}, I_{k+1}$ | ○ | | ✓ | | |
| 7 | 1111 0110 0010 1000 | $I_k, Q_k$ | ◎ | | | | | $Q_k, I_{k+1}$ | ◎ | | | | |
| 8 | 1010 0011 0111 1101 | $I_k, \overline{Q_k}$ | ○ | | ✓ | | ✓ | $\overline{Q_k}, I_{k+1}$ | ○ | | ✓ | | ✓ |

FIG.42A reception state of DQPSK signal at delay interferometer + O/E output

|  | O/E A ch. output | | | |
|---|---|---|---|---|
|  | Qk | Q̄k | Īk | Ik |
| O/E B ch. output Qk | × | × | ○ | ◎ |
| Q̄k | × | × | ○ | ○ |
| Īk | △ | △ | × | × |
| Ik | ◇ | △ | × | × |

FIG.42B

DQPSK signal reception state (1) at SFI-5 interface (case 1 and case 2)

|  | SFI5 odd ch. output | | | |
|---|---|---|---|---|
|  | Qk | Q̄k | Īk | Ik |
| SFI5 even ch. output Qk | × | × | ○ | ◎ |
| Q̄k | × | × | ○ | ○ |
| Īk | △ | △ | × | × |
| Ik | ◇ | △ | × | × |

FIG.42C

DQPSK signal reception state (2) at SFI-5 interface (case 3 and case 4)

|  | SFI5 odd ch. output | | | |
|---|---|---|---|---|
|  | Qk | Q̄k | Īk | Ik |
| SFI5 even ch. output Qk+1 | × | × | △ | ◇ |
| Q̄k+1 | × | × | △ | △ |
| Īk+1 | ○ | ○ | × | × |
| Ik+1 | ◎ | ○ | × | × |

OPTICAL SIGNAL RECEPTION DEVICE AND METHOD OF CONTROLLING OPTICAL SIGNAL RECEPTION

CROSS-REFERENCE TO RELATED APPLICATIONS

This application is a Continuation-In-Part of Ser. No. 11/282,886 filed on Nov. 21, 2005, now abandoned.

BACKGROUND OF THE INVENTION

1. Field of the Invention

The present invention relates to an optical signal reception device for receiving and demodulating optical signals modulated by a Differential Quadrature Phase Shift Keying (DQPSK) modulation scheme or a Differential Phase Shift Keying (DPSK) modulation scheme in order to achieve high speed data transmission, and a method of controlling reception of optical signals.

2. Description of the Related Art

In digital communication systems, typically the Internet (IP: Internet Protocol), in order to meet rapidly increasing needs of digital communication, an optical communication scheme employing IM-DQPSK (Intensity Modulation Differential Quadrature Phase Shift Keying) modulation scheme is being studied to improve utilization of frequencies.

For details of IM-DQPSK, reference can be made to P. S. Cho, V. S. Grigoryan, Y. A. Godin, A. Salamon, and Y. Achiam, "Transmission of 25 Gbps RZ-DQPSK signals with 25-GHz channel spacing over 1000 km of SMF-28 fiber", IEEE Photonic Technical Letter, Vol. 15, pp. 473-475, March 2003 (hereinafter, referred to as "reference 1"), and H. Kim, and R-J. Essiambre, "Transmission of 8×20 Gbps DQPSK signals with 25-GHz channel spacing over a 310-km SMF with 0.8-b/s/Hz spectral efficiency", IEEE Photonic Technical Letter, Vol. 15, pp. 769-771, May, 2003 (hereinafter, referred to as "reference 2").

FIG. 38 is a block diagram illustrating an optical transponder (an optical sender and an optical receiver) employing the above IM-DQPSK modulation scheme.

The optical transponder illustrated in FIG. 38 includes a framer LSI 100, an optical receiver (40 G OR) 101, a serializer (SER) 102, a de-multiplexer (DEMUX) 103, a DQPSK precoder 104, a DQPSK modulator (40 G OS DQPSK) 105, a DQPSK optical sender (40 G OS) 106, a de-serializer (DES) 107, a multiplexer (MUX) 108, and a DQPSK demodulator (40 G OR DQPSK) 109.

The DQPSK modulator 105, as schematically exemplified in an expanded portion thereabove in FIG. 38, includes a DFB-LD (Distributed Feedback Laser), a phase modulation section 112, an intensity modulator 113, and a driver. The phase modulation section 112 includes phase modulators 114, 115 and a π/2 phase shifter.

The DQPSK demodulator 109, as schematically exemplified in an expanded portion therebelow in FIG. 38, includes a π/4 delay interferometer 116, a −π/4 delay interferometer 117, photo-diodes (PDs) acting as opto-electric conversion elements, and amplifiers (amp). It should be noted that the configuration of the DQPSK demodulator 109 in FIG. 38 as described above illustrates a state in which the optical transmission direction is reversed.

In FIG. 38, it is illustrated that the transponder converts data signals transmitted at a bit rate of 40 Gbps into optical signals, modulates the optical signals by the DQPSK modulation scheme, and transmits the signals.

As illustrated in FIG. 38, the optical receiver 101 receives the optical signals transmitted at a bit rate of 40 Gbps from a client (user) side, converts the optical signals into electrical signals, and outputs 16 parallel signals each at a bit rate of 2.5 Gbps (=40 Gbps/16) to the framer LSI 100.

The framer LSI 100 transforms each of the 16 parallel signals from the optical receiver 101 into multiple frames, and performs mapping and de-mapping on each frame by means of, for example, SONET (Synchronous Optical Network), SDH (Synchronous Digital Hierarchy), or OTN (Optical Transport Network). In this figure, it is assumed that the framer LSI 100 is the one for OTN.

After the frame processing, the framer LSI 100 outputs 16 parallel signals each at 2.7 Gbps.

A serializer 102 converts the 16 parallel signals at a bit rate of 2.7 Gbps from the framer LSI 100 into a serial data signal at 43 Gbps.

The de-multiplexer (DEMUX) 103 receives the serial data signal at 43 Gbps and a clock signal (CLK) at 21.5 GHz, de-multiplexes the signals from the serializer 102 at a de-multiplexing ratio of 1 to 2, and generates two parallel signals $I_k$ and $Q_k$ each at 21.5 Gbps.

The signals $I_k$ and $Q_k$ output from the de-multiplexer (DEMUX) 103 are input to the DQPSK precoder 104. The DQPSK precoder 104 converts the signals $I_k$ and $Q_k$ into signals $\rho_k$ and $\eta_k$, and inputs the obtained signals $\rho_k$ and $\eta_k$ to the DQPSK demodulator 105.

The DQPSK precoder 104 converts the input in-phase signals $I_k$ and quadrature-phase signals $Q_k$ into signals $\rho_k$ and $\eta_k$ according to the following logical relations.

$$\rho_k = Q_k \rho_{k-1} \eta_{k-1} + I_k \rho_{k-1} \overline{\eta_{k-1}} + \overline{I_k \rho_{k-1}} \eta_{k-1} + \overline{Q_k \rho_{k-1} \eta_{k-1}}$$

$$\eta_k = I_k \rho_{k-1} \eta_{k-1} + \overline{Q_k} \rho_{k-1} \overline{\eta_{k-1}} + Q_k \overline{\rho_{k-1} \eta_{k-1}} + \overline{I_k \rho_{k-1} \eta_{k-1}}$$

FIG. 39 is a circuit diagram illustrating an example of a configuration of the DQPSK precoder 104.

As illustrated in FIG. 39, the DQPSK precoder 104 may be a logic gate circuit constructed by combining logical OR circuits, logical AND circuits, and inhibit circuits or other kinds of logic circuits. In FIG. 39, "D" indicates a one-bit delay circuit.

The signals $\rho_k$ and $\eta_k$ (at 21.5 Gbps) encoded by the DQPSK precoder 104 are input to the DQPSK modulator 105. The DQPSK modulator 105 converts the signals $\rho_k$ and $\eta_k$ into DQPSK optical signals and sends the optical signals to the network side.

The DQPSK modulator 105 splits a light beam emitted from the DFB-LD 111 into two beams, outputs one of the two split light beams into the phase modulator 114, and shifts the phase of the other split light beam by π/2 and outputs the phase-shifted light beam into the phase modulator 115. The phase modulators 114 and 115 perform phase modulation on the respective input light beams according to the respective signals $\rho_k$ and $\eta_k$ from the precoder 104 at 21.5 Gbps. The output light beams from the phase modulators 114 and 115 are combined and are input to the intensity modulator 113. The intensity modulator 113 performs intensity modulation on the input optical signals according to the clock signal (clock) at 21.5 GHz, and generates and transmits IM-DQPSK optical signals at 43 Gbps.

For example, each of the phase modulators 114 and 115, and the intensity modulator 113 of the DQPSK modulator 105 may be structured by a Mach-Zehnder interferometer formed by elements having the electro-optical effect, such as LiNbO$_3$.

The DQPSK demodulator 109 receives the DQPSK optical signals from the network side, splits the optical signals into two portions, outputs one portion into the π/4 delay interferometer 116, delays the phase of the other portion by −π/4, and outputs the resulting optical signals into the −π/4 delay interferometer 117.

Each of the delay interferometers 116 and 117, for example, generates a path length difference between two path lengths each being constituted by a light guide, and generates a time delay τ corresponding to one symbol of the modulated optical signal.

The delay interferometer 116 has a π/4 phase shifter in an arm thereof for generating a π/4 phase shift, and the delay interferometer 117 has a −π/4 phase shifter in an arm thereof for generating a −π/4 phase shift.

Optical signals from arms of the delay interferometers 116 and 117 enter a pair of photo detectors (PD) as light receiving elements via couplers at the output stages of the delay interferometers 116 and 117, and after opto-electric conversion, an in-phase signal $I_k$ is output from the side of the delay interferometer 116, and an quadrature-phase signal $Q_k$ is output from the side of the delay interferometer 117.

The multiplexer (MUX) 108 multiplexes the data signals $I_k$ and $Q_k$ from the DQPSK optical demodulator 109 at 21.5 Gbps to convert the data signals $I_k$ and $Q_k$ into a serial data signal at about 43 Gbps, and outputs the serial data signal at about 43 Gbps and the clock signal (clock) at 21.5 GHz to the de-serializer (DES) 107 in parallel.

The de-serializer 107 converts the serial data signal at about 43 Gbps into 16 parallel signals each at about 2.7 Gbps, and outputs the resulting signals into the framer LSI 100.

The framer LSI 100 de-maps the SONET, SDH or OTN frames, obtains 16 parallel signals each at about 2.5 Gbps, and outputs the 16 parallel signals to the optical sender 106.

The optical sender 106 converts the 16 parallel signals into a serial optical signal, and sends the optical signal at about 43 Gbps to the client side.

In addition, it is proposed to use Mach-Zehnder type delay interferometers in DMPSK (Differential Multiple Phase Shift Keying) optical signal modulation and demodulation unit with M=2$^n$. For example, such an optical communication system is disclosed in International Application's Japanese Publication No. 2004-516743, in which the DMPSK modulation scheme becomes the same as the above DQPSK modulation scheme when n=2.

In addition, for example, an optical communication system is disclosed in International Application's Japanese Publication No. 2004-533163, in which a phase-modulated optical signal is intensity-modulated by a clock signal and is then transmitted; on a receiver end, the clock signal is recovered based on the intensity-modulated component.

FIG. 40 is a block diagram illustrating a principal portion of an optical signal receiver used in an optical communication system for transmitting the DQPSK optical signals.

Illustrated in FIG. 40 are a front end 121 (40 G DQPSK OR), a clock and data recovery (20 G CDR A) 123, a clock and data recovery (20 G CDR B) 124, a multiplexer (MUX) 126, a de-serializer (DES) 128, and a framer LSI 129 acting as a frame processing unit.

In FIG. 40, the direction of the signal flow is opposite to the path of signal reception processing in FIG. 38, but the functions of processing are the same.

Specifically, the front end 121 corresponds to the DQPSK demodulator 109 in FIG. 38.

The multiplexer 126 multiplexes the signals output from each of the clock and data recovery 123 and the clock and data recovery 124 at a multiplexing ratio of 2:1.

The de-serializer (DES) 128 converts the input signals into 16 parallel signals each at 2.7 Gbps.

The framer LSI 129 receives 16 parallel signals each at 2.7 Gbps, and has the same de-mapping functions as the framer 100 in FIG. 38.

The in-phase signal component $I_k$ and the quadrature-phase signal component $Q_k$ are output from a port A and a port B of the front end 121. However, when DQPSK optical signals are transmitted through an optical transmission path, waveforms of the optical signals may be degraded because of influences of wavelength dispersion and the non-linear effect of the optical fiber in use. In addition, because the two interferometers of the front end 121 are independent from each other, if the optimum operating points of the two interferometers change with age or due to temperature changes, probably, the signal $I_k$ and the signal $Q_k$ satisfying desired logical relations cannot be obtained.

FIG. 41 is a block diagram illustrating principal portions of an optical signal receiver side and an optical signal transmitter side of the optical transponder as shown in FIG. 38.

The structure shown in FIG. 41 includes a transmission processing unit 421 (indicated as "OTN LSI" in FIG. 41), an optical modulation processing unit 422 (indicated as "43 G NB Mod (Tx side)"), an optical signal reception processing unit 423 (indicated as "43 G NB Mod (Rx side)"), and a reception processing unit 424 (indicated as "OTN LSI").

In FIG. 41, an SFI-5 interface is a parallel signal interface for connecting the transmission processing unit 421 and the optical modulation processing unit 422, and for connecting the optical signal reception processing unit 423 and the reception processing unit 424; the SFI-5 interface is in compliance with a 40 Gbps Serdes Framer Interface standard established by OIF-SFI5-01.02 of OIF (Optical Interface Forum).

It should be noted that the parallel signal interface for connecting the transmission processing unit 421 and the optical modulation processing unit 422, and for connecting the optical signal reception processing unit 423 and the reception processing unit 424 is not limited to the SFI-5 interface, but can be other similar signal interfaces.

The transmission processing unit 421 includes a framer and others, and the optical modulation processing unit 422 includes a serializer (SER), a de-multiplexer (1:2 DEMUX), a driver which receives data $\eta_k$ and $\rho_k$ for controlling a phase modulator, a DFB-LD (Distributed Feedback Semiconductor Laser), and an intensity modulator. RZ-DQPSK optical signals output from the intensity modulator are transmitted as data at time k, k+1, k+2, . . . along the time axis, and are indicated as $\{I_k, Q_k\}$, $\{I_{k+1}, Q_{k+1}\}$, . . . .

The optical signal reception processing unit 423 includes a π/4 delay interferometer, a −π/4 delay interferometer, photo-diodes (PDs) acting as opto-electric conversion elements, amplifiers (amp), a multiplexing processing unit CDR+2: 1MUX for reproducing clocks and data and for multiplexing, and a de-serializer (DES), which corresponds to the structure in FIG. 38 including the π/4 delay interferometer 116, the −π/4 delay interferometer 117, the photo-diodes (PDs), the amplifiers (amp), the multiplexer (MUX) 108, and the de-serializer (DES) 107.

Each of the multiplexing processing unit CDR+2:1MUX and the de-serializer (DES) is an integrated circuit.

The reception processing unit 424 corresponds to the framer 100 and the DQPSK optical sender 106 in FIG. 38.

In the optical signal reception processing unit 423, signals $A_k, A_{k+1}, \ldots$ obtained by opto-electric conversion from the π/4 delay interferometer, and signals $B_k, B_{k+1}, \ldots$ obtained by opto-electric conversion from the −π/4 delay interferometer are multiplexed by the multiplexing processing unit CDR+2:1MUX, resulting in signals $A_k, B_k, A_{k+1}, B_{k+1}, \ldots$, and the signals $A_k, B_k, A_{k+1}, B_{k+1}, \ldots$ are transmitted to the de-serializer (DES); the de-serializer (DES) converts the signals $A_k, B_k, A_{k+1}, B_{k+1}, \ldots$ into 16 parallel signals, and transmits the 16 parallel signals to the reception processing unit 424 including a framer via the SFI-5 interface. Depending on the timing of the serial-parallel conversion, the order of the 16 parallel signals may be determined according to a combination of a case 1 and a case 2 as shown in FIG. 41, or a combination of a case 3 and a case 4 as shown in FIG. 41.

FIG. 42A through FIG. 42C are tables illustrating reception states in portions (a), (b), and (c) in FIG. 41.

FIG. 42A illustrates reception states of the optical signal reception processing unit 423 with A channel (Ach) signals and B channel (Bch) signals under various conditions.

In the table in FIG. 42A, for example, a double circle indicates an object signal reception state, single circles indicate that either the A channel signal or the B channel signal or both of them are in a logical inversion state relative to the object signal reception state, triangles indicate a state generated by logical inversion and bit swap, a diamond indicates a state of bit swap, and crosses indicates states not allowing signal reception such as synchronization pull-in state.

FIG. 42B and FIG. 42C illustrate reception states of a 16-parallel signal interface between the de-serializer (DES) and the reception processing unit 424.

Depending on the opto-electric conversion, clock/data regeneration (clock and data recovery) and multiplexing, and the order of signals output from the de-serializer (DES), the reception state becomes one of case 1 through case 4, and the case 3 and case 4 correspond to one-bit shifted situation relative to the case 1 and case 2. For this reason, FIG. 42B represents reception states corresponding to the case 1 and case 2, and FIG. 42C represents reception states corresponding to the case 3 and case 4. In FIG. 42B and FIG. 42C, if double circles indicate object signal reception states, as in FIG. 42A, reception states represented by single circles, triangles, diamonds, and crosses occur.

As described above, in the object signal reception state, which is represented by the double circle, an optical signal reception process can be performed normally, and frame synchronization can be established. However, in states other than the object signal reception state, the frame pull-in process cannot be performed, and hence, a normal signal reception process cannot be performed.

In addition, even when functions of components of the device are specified in detail to designate the object signal reception state when initially starting the device, operation conditions of the components may change with age or with temperature changes, and in this case, one has to set the conditions of the components again.

SUMMARY OF THE INVENTION

Accordingly, it is a general object of the present invention to solve one or more of the above problems of the related art.

A more specific object of the present invention is to provide an optical signal reception device that determines reception states of optical signals modulated by a DQPSK (Differential Quadrature Phase Shift Keying) modulation scheme or a DPSK (Differential Phase Shift Keying) modulation scheme, performs control so that demodulated signals to satisfy a predetermined logical relation, and allows signal reception with a normal logical relation being satisfied even when changes with age temperature changes occur.

Another specific object of the present invention is to an optical signal reception device and a method of controlling reception of optical signals capable of automatic control to maintain to an object signal reception state.

According to a first aspect of the present invention, there is provided a signal reception device for receiving and demodulating an optical signal modulated by a Differential Quadrature Phase Shift Keying (DQPSK) modulation scheme, said signal reception device comprising: a front end including two delay interferometers and opto-electric conversion elements that receives the DQPSK optical signal and converts the DQPSK optical signal into an in-phase signal and a quadrature-phase signal; a clock and data recovery that regenerates a clock and data signal based on the in-phase signal and the quadrature-phase signal; a multiplexer that multiplexes the in-phase signal and the quadrature-phase signal output from the clock and data recovery; a reception frame processing unit that detects frame synchronization based on the signal multiplexed by the multiplexer; and a controller that, based on a detection result from the reception frame processing unit indicating an out-of-frame-synchronization state, controls logical inversion operations in the clock and data recovery, controls a multiplexing timing in the multiplexer, and controls the delay interferometers in the front end.

As an embodiment, the reception frame processing unit comprises: a frame processor that performs a frame synchronization pull-in operation and a frame de-mapping operation; a frame synchronization circuit including a plurality of frame synchronization units, each of said frame synchronization units receiving a synchronization bit string in the multiplexed signal and performing frame synchronization detections corresponding to respective combinations of plural of the synchronization bit strings; and an identification section that identifies a signal reception state depending on which one of the frame synchronization units a detection signal is output from, and notifies the controller of information of the signal reception state identification.

As an embodiment, the reception frame processing unit comprises: a frame processor that performs a frame synchronization pull-in operation and a frame de-mapping operation; a frame synchronization circuit that detects a synchronization bit string in the multiplexed signal obtained by multiplexing the in-phase signal and the quadrature-phase signal in the multiplexer, and performs frame synchronization detections; a register that stores combinations of plural of the synchronization bit strings; and an identification section that, based on the synchronization bit strings of the multiplexed signal and the synchronization bit strings stored in the register, identifies a signal reception state, and notifies the controller of the signal reception state.

As an embodiment, the controller, based on the signal reception state identification information, determines whether a detected signal reception state is an object state, whether the detected signal reception state is a state convertible to the object state by the logical inversion control, or whether the detected signal reception state is a state convertible to the object state by the logical inversion control and the multiplexing timing control; the controller does not perform control operations when the detected signal reception state is the object state; the controller controls the clock and data recovery to perform the logical inversion control when the detected signal reception state is a state convertible to the object state by the logical inversion control; and the controller controls the clock and data recovery to perform the logical inversion control and controls the multiplexer to perform the multiplexing timing control when the detected signal reception state is a state convertible to the object state by the logical inversion control and the multiplexing timing control.

As an embodiment, the signal reception device further comprises an in-phase detector configured to detect whether a quadrature phase relation holds based on exclusive OR logic between the in-phase signal and the quadrature-phase signal input to the multiplexer; wherein the controller shifts a phase of the delay interferometers by $\pi/2$ or $-\pi/2$ based on detection results of the in-phase detector.

According to a second aspect of the present invention, there is provided a signal reception device for receiving and demodulating an optical signal modulated by a Differential Quadrature Phase Shift Keying (DQPSK) modulation scheme, said signal reception device comprising: a front end including a polarization controller that converts the DQPSK optical signal into a line-polarized optical signal, a delay interferometer that receives the line-polarized optical signal, a polarizing beam splitter that splits optical signals output from the delay interferometer, and a differential light receiver that has two light-receiving elements for converting the optical signals split by the polarizing beam splitter into an in-phase signal and a quadrature phase signal, respectively; a clock and data recovery that regenerates a clock and data signal based on the in-phase signal and the quadrature-phase signal; a multiplexer that multiplexes the in-phase signal and the quadrature-phase signal output from the clock and data recovery; a reception frame processing unit that detects frame synchronization and identifies a reception state based on the signal multiplexed by the multiplexer, and de-maps received frames; and a controller that controls logical inversion operations in the clock and data recovery, controls a multiplexing timing in the multiplexer, and controls the delay interferometers in the front end based on a detection result indicating an out-of-frame-synchronization state and reception state identification information from the reception frame processing unit.

According to a third aspect of the present invention, there is provided a signal reception device for receiving and demodulating an optical signal modulated by a Differential Quadrature Phase Shift Keying (DQPSK) modulation scheme, said signal reception device comprising: a front end including two delay interferometer and opto-electric conversion elements that receive the DQPSK optical signal and convert the DQPSK optical signal into an in-phase signal and a quadrature-phase signal; a clock and data recovery that regenerates a clock and data signal based on the in-phase signal and the quadrature-phase signal; a multiplexer that multiplexes the in-phase signal and the quadrature-phase signal output from the clock and data recovery; a reception frame processing unit that detects frame synchronization based on the signal multiplexed by the multiplexer; a controller that controls the delay interferometers in the front end; and an in-phase detector that detects whether a quadrature phase relation holds based on exclusive OR logic between the in-phase signal and the quadrature-phase signal input to the multiplexer, wherein the controller shifts a phase of the delay interferometers by $\pi/2$ or $-\pi/2$ based on detection results of the in-phase detector.

According to a fourth aspect of the present invention, there is provided a signal reception device that receives and demodulates an optical signal, which optical signal is modulated by a Differential Quadrature Phase Shift Keying (DQPSK) modulation scheme and has a modulated intensity, said signal reception device comprising: an optical coupler that splits the DQPSK modulated optical signal; a front end including two delay interferometers and an opto-electric conversion elements that receives the split DQPSK modulated optical signal and converts the split DQPSK modulated optical signal into an in-phase electric signal and a quadrature-phase electric signal; a clock recovery that receives the split DQPSK modulated optical signal, and regenerates a clock signal based on an intensity-modulated component of the split DQPSK modulated optical signal; a multiplexer that multiplexes the in-phase signal and the quadrature-phase signal output from the front end in accordance with the clock signal from the clock recovery; a reception frame processing unit that detects frame synchronization based on the signal multiplexed by the multiplexer; and a controller that, based on a frame-synchronization detection result from the reception frame processing unit indicating whether an object reception state is detected, controls a multiplexing timing in the multiplexer, and controls the delay interferometers in the front end.

As an embodiment, the reception frame processing unit comprises at least one of a logic inversion circuit that performs logic inversion of input data according to a logic inversion control signal from the controller, and a neighboring bit exchanging circuit that exchanges neighboring bits of the input data.

As an embodiment, according to a logic inversion control signal from the controller, the reception frame processing unit performs logic inversion control on an in-phase signal component and a quadrature-phase signal component output from the front end, independently.

According to a fifth aspect of the present invention, there is provided a signal reception device for receiving and demodulating an optical signal modulated by a Differential Phase Shift Keying (DPSK) modulation scheme, said signal reception device comprising: a front end including a delay interferometer and opto-electric conversion elements that receives the DPSK optical signal and converts the DPSK optical signal into an electric signal; a clock and data recovery that regenerates a clock and data signal based on an output signal from the front end; a de-serializer that receives the clock signal from the clock and data recovery and data from the front end and converts the clock signal and the data into parallel signals; a reception frame processing unit that receives the parallel data from the de-serializer and detects frame synchronization; and a controller that, based on a detection result from the reception frame processing unit indicating an out-of-frame-synchronization state, inputs a logical inversion control signal to the clock regenerator and inputs a control signal to the delay interferometer in the front end.

According to a sixth aspect of the present invention, there is provided a signal reception device for receiving and demodulating an optical signal modulated by a Differential Phase Shift Keying (DPSK) modulation scheme, said signal reception device comprising: a front end including a delay interferometer and an opto-electric conversion element that receive the DPSK optical signal and convert the DPSK optical signal into an electric signal; a clock and data recovery that regenerates a clock signal based on an output signal from the front end; a de-serializer that receives the clock signal from the clock and data recovery and data from the front end and converts the clock signal and the data into parallel signals; a reception frame processing unit that includes a frame synchronization circuit and a logic inversion circuit; and a controller that, based on a detection result from the reception frame processing unit indicating an out-of-frame-synchronization state, inputs a logical inversion control signal to the logical inversion circuit and inputs a control signal to the delay interferometer in the front end.

According to a seventh aspect of the present invention, there is provided a signal reception device that receives and demodulates an optical signal, which optical signal is modulated by a Differential Phase Shift Keying (DPSK) modulation scheme and has a modulated intensity, said signal reception device comprising: an optical coupler that splits the DPSK modulated optical signal; a front end including a delay interferometer and opto-electric conversion elements that receive the split DPSK modulated optical signal and convert the split DPSK modulated optical signal into an electric signal; a clock recovery that regenerates a clock signal based on an intensity-modulated component of the split DPSK modulated optical signal; a de-serializer that converts data from the front end into parallel signals according to the clock signal from the clock recovery; a reception frame processing unit that detects frame synchronization based on the parallel signals obtained in the de-serializer; and a controller that, based on a frame-synchronization detection result from the reception frame processing unit indicating whether an object reception state is detected, inputs a logical inversion control signal to the clock recovery and controls the delay interferometer in the front end.

According to an eighth aspect of the present invention, there is provided a signal reception device that receives and demodulates an optical signal, which optical signal is modulated by a Differential Phase Shift Keying (DPSK) modulation scheme and has a modulated intensity, said signal reception device comprising: an optical coupler that splits the DPSK modulated optical signal; a front end including a delay interferometer and opto-electric conversion elements that receive the split DPSK modulated optical signal and convert the split DPSK modulated optical signal into an electric signal; a clock recovery that regenerates a clock signal based on an intensity-modulated component of the split DPSK modulated optical signal; a de-serializer that converts data from the front end into parallel signals according to the clock signal from the clock recovery; a reception frame processing unit including a logic inversion circuit that performs logic inversion of the parallel signals obtained in the de-serializer, and a frame synchronization circuit that performs frame synchronization detection; and a controller that, based on a frame-synchronization detection result from the reception frame processing unit indicating whether an object reception state is detected, inputs a logical inversion control signal to the logic inversion circuit of the reception frame processing unit and controls the delay interferometer in the front end.

According to a ninth aspect of the present invention, there is provided a signal reception device for receiving and demodulating an optical signal modulated by a Differential Quadrature Phase Shift Keying (DQPSK) modulation scheme, said signal reception device comprising: a reception demodulation unit that includes a plurality of delay interferometers and a plurality of opto-electric conversion elements for receiving the DQPSK optical signal and converting the DQPSK optical signal into an in-phase signal and a quadrature-phase signal; a multiplexer that multiplexes the in-phase signal and the quadrature-phase signal; a de-serializing unit that converts the multiplexed signals from the multiplexer into parallel signals; and a reception processing unit that receives the parallel signals from the de-serializing unit, and performs frame processing including frame synchronization processing, wherein the reception processing unit includes a frame synchronization circuit that establishes frame synchronization, a reception state identification circuit that identifies reception states based on the parallel signals, and a logic processing circuit that performs logic inversion, bit delay, and bit swap corresponding to a reception state other than an object reception state identified by the reception state identification circuit, and corresponding to a reception state related to a de-serializing timing in the de-serializing unit.

As an embodiment, the logic processing circuit of the reception processing unit includes: a logic inversion circuit that controls, corresponding to a reception state identified by the reception state identification circuit, whether to perform logic inversion on the received parallel signals from the de-serializing unit, a one-bit delay circuit that has a selector and a delay circuit to control whether or not to delay the received parallel signals by one bit, and a bit swap circuit that has a switching circuit for exchanging bits between adjacent channels of the received parallel signals.

As an embodiment, the reception state identification circuit compares a parallel frame synchronization pattern received from the de-serializing unit to a reception-state-corresponding comparison pattern to identify a reception state, and the reception processing unit further includes a controller that controls at least one of the logic inversion circuit, the one-bit delay circuit, and the bit swap circuit in response to identification results of a reception state other than the object reception state given by the reception state identification circuit, and controls at least one of the logic inversion circuit, the one-bit delay circuit, and the bit swap circuit in response to a reception state related to the de-serializing timing in the de-serializing unit when the frame synchronization is not established by the frame synchronization circuit.

As an embodiment, the reception demodulation unit includes a $\pi/4$ delay interferometer and a $-\pi/4$ delay interferometer, the reception state identification circuit of the reception processing unit has four reception-state-corresponding comparison patterns so as to maintain a phase difference of the $\pi/4$ delay interferometer and the $-\pi/4$ delay interferometer to be $\pi/2$, said four reception-state-corresponding comparison patterns including the object reception state, and the reception processing unit further includes a controller that controls at least one of the logic inversion circuit, the one-bit delay circuit, and the bit swap circuit according to a reception state identified by comparing a parallel frame synchronization pattern received from the de-serializing unit to the four reception-state-corresponding comparison patterns, and controls at least one of the logic inversion circuit, the one-bit delay circuit, and the bit swap circuit in response to a reception state related to the de-serializing timing in the de-serializing unit when the frame synchronization is not established by the frame synchronization circuit.

According to a 10th aspect of the present invention, there is provided a method of controlling signal reception for receiving and demodulating an optical signal modulated by a Differential Quadrature Phase Shift Keying (DQPSK) modulation scheme, said method comprising: receiving the DQPSK optical signal and converting the DQPSK optical signal into an in-phase signal and a quadrature-phase signal by a reception demodulation unit; multiplexing the in-phase signal and the quadrature-phase signal by a multiplexer and transmitting the resulting signals to a de-serializing unit; converting the multiplexed signals into parallel signals by a de-serializing unit and transmitting the parallel signals to a reception processing unit; comparing, in the reception processing unit, the parallel signals to a comparison pattern to identify a reception state, and performing at least one of logic inversion, one-bit delay, and bit swap in response to a reception state other than the object reception state, and in response to a reception state related to the de-serializing timing in the de-serializing unit, and repeating the step of comparing until the frame synchronization is established.

As an embodiment, the reception processing unit compares a parallel frame synchronization pattern received from the de-serializing unit to a reception-state-corresponding comparison pattern to identify a reception state, performs at least one of logic inversion, one-bit delay, and bit swap in response to identification results of a reception state other than the object reception state, and in response to a reception state related to the de-serializing timing in the de-serializing unit, and performs at least one of logic inversion, one-bit delay, and bit swap in response to a reception state related to the de-serializing timing in the de-serializing unit when the frame synchronization is not established, and repeats the steps of comparing and performing until the frame synchronization is established.

According to the present invention, when the reception frame processing unit detects out-of-frame-synchronization (LOF (Loss of Frame) or OOF (Out of Frame)), the controller controls logical inversion operations in the clock and data recovery, a multiplexing timing in the multiplexer, and controls the delay interferometer in the front end; thereby, it is possible to perform frame synchronization pull-in operations to attain an object signal reception state.

In addition, by providing a frame synchronization circuit in the reception frame processing unit that includes plural frame synchronization units corresponding to combinations of plural synchronization bit strings, it is possible to quickly identify the signal reception state, and it is possible to perform the frame synchronization pull-in operations quickly to attain the object signal reception state.

In addition, because an in-phase detector is provided to detect whether a quadrature phase relation holds based on exclusive OR logic between the in-phase signal and the quadrature-phase signal input to the multiplexer, and the controller shifts the phase of the delay interferometers by $\pi/2$ or $-\pi/2$ based on the result of exclusive OR logic between the in-phase signal and the quadrature-phase signal, it is possible to perform frame synchronization pull-in operations to attain an object signal reception state by controlling logical inversion operations in the clock and data recovery and the multiplexing timing in the multiplexer, and by controlling the delay interferometers in the front end.

According to the present invention, because the front end includes a polarization controller, a delay interferometer, a polarizing beam splitter, and a differential light receiver, the signal reception device includes only one delay interferometer; hence it is possible to make the signal reception device compact and simplify control of the signal reception device.

According to the present invention, because an in-phase detector is provided to detect whether a quadrature phase relation holds based on exclusive OR logic between the in-phase signal and the quadrature-phase signal input to the multiplexer, and the controller shifts the phase of the delay interferometers by $\pi/2$ or $-\pi/2$ based on the result of exclusive OR logic between the in-phase signal and the quadrature-phase signal, it is possible to attain an object signal reception state by controlling the delay interferometers in the front end.

According to the present invention, optical signals are received and modulated to produce an in-phase signal and a quadrature-phase signal, and the in-phase signal and the quadrature-phase signal are multiplexed and transmitted to a de-serializing unit, the multiplexed signals are converted into parallel signals and transmitted to a reception processing unit.

When performing a reception process of the optical signals, because it cannot be determined which of a reception state 1 and a reception state 2 is being processed from a relation between the order of multiplexing the in-phase signal and the quadrature-phase signal and the de-serializing timing of the multiplexed signals, in the present invention, for example, it is determined whether frame synchronization is possible after identifying a reception state corresponding to the reception state 1, and carrying out logic inversion, one-bit delay, and bit swap; when frame synchronization cannot be established, the logic inversion, one-bit delay, and bit swap are performed assuming the state is the reception state 2. In this way, it is possible to perform control to automatically obtain the object reception state corresponding to various reception conditions.

These and other objects, features, and advantages of the present invention will become more apparent from the following detailed description of the preferred embodiments given with reference to the accompanying drawings.

BRIEF DESCRIPTION OF THE DRAWINGS

FIG. 2A and FIG. 2B are diagrams and waveforms explaining the logical inversion control in the clock and data recovery 3 or 4 according to the first embodiment;

FIG. 4 is a block diagram illustrating a principal portion of an optical signal receiver according to a second embodiment of the present invention;

FIG. 5 is a table corresponding to the table in FIG. 2 showing reception states of DQPSK signals, with 16 different combinations of OA1 and OA2 being indicated in the second embodiment;

FIG. 15 is a block diagram illustrating another example of the reception frame processing unit 9 (framer LSI) according to the seventh embodiment;

FIG. 16 is a block diagram illustrating still another example of the reception frame processing unit 9 (framer LSI) according to the seventh embodiment;

FIG. 23A is a block diagram illustrating a principal portion of an optical signal receiver according to a 10th embodiment of the present invention used in an optical communication system for transmitting DPSK (Differential Phase Shift Keying) optical signals;

FIG. 23B is a table illustrating a correspondence relation between DPSK signal reception states and FAS bytes;

FIG. 30 is a table illustrating the reception states and control operations as described with reference to FIG. 28 and FIG. 29;

FIG. 32 is a table illustrating reception states and control operations corresponding to operations shown in FIG. 31;

FIG. 33A through FIG. 33D are tables illustrating reception states of an optical signal receiver according to a 15th embodiment of the present invention, which is used in an optical communication system for transmitting DQPSK optical signals;

FIG. 34 is a table illustrating reception states and control operations corresponding to the above-described four states in FIG. 33A through FIG. 33D;

In FIG. 35, the same reference numbers are assigned to the same elements as those shown previously;

FIG. 36 is a table illustrating reception states and control operations when the phase difference between the π/4 delay interferometer and the −π/4 delay interferometer (as shown in FIG. 28) is maintained to be π/2.

DESCRIPTION OF THE PREFERRED EMBODIMENTS

Below, preferred embodiments of the present invention are explained with reference to the accompanying drawings.

First Embodiment

Figures 1A, 1B:
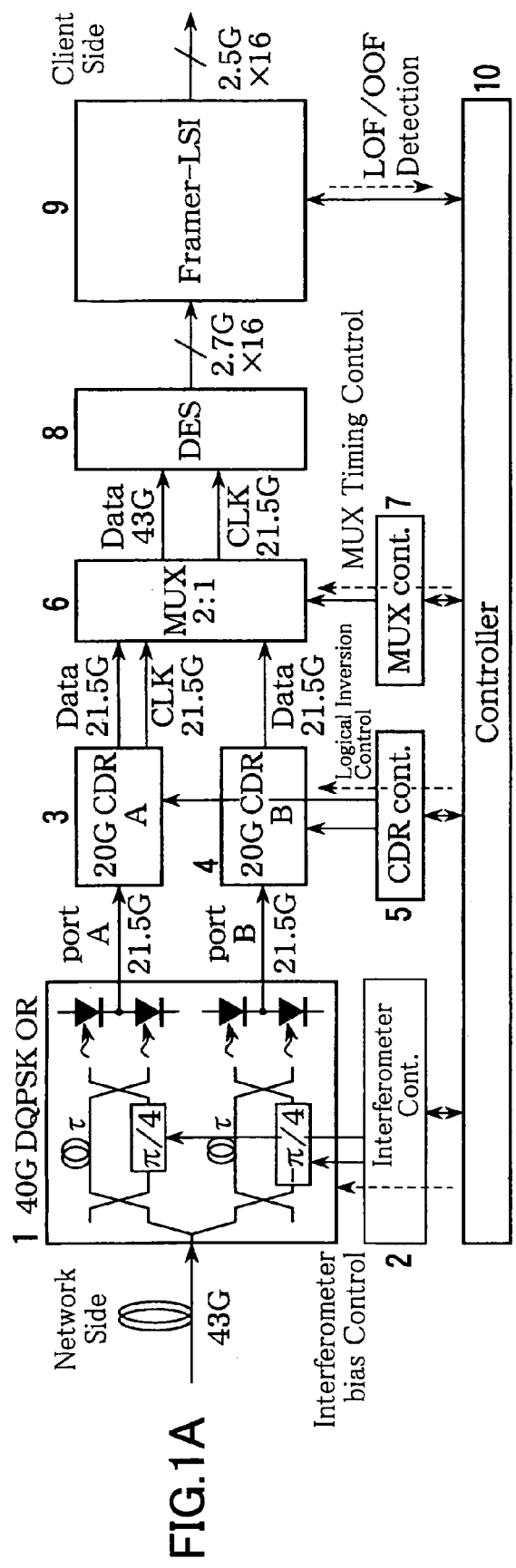
FIG. 1A is a block diagram illustrating a principal portion of an optical signal receiver according to a first embodiment of the present invention, used in an optical communication system for transmitting DQPSK optical signals.
FIG. 1B is a table illustrating reception states of DQPSK signals in the signal reception device of the first embodiment.

FIG. 1A is a block diagram illustrating a principal portion of an optical signal receiver according to a first embodiment of the present invention, used in an optical communication system for transmitting the DQPSK optical signals.

The optical signal receiver illustrated in FIG. 1A includes a front end 1 that has two delay interferometers and opto-electric conversion elements that receives DQPSK optical signals and converts the DQPSK optical signals into in-phase signals I and quadrature-phase signals Q; clock and data recovery 3 and 4 that regenerate clock and data signals based on the in-phase signals I and the quadrature-phase signals Q; a multiplexer 6 that multiplexes the in-phase signals I and the quadrature-phase signals Q output from the clock and data recoveries 3 and 4; a reception frame processing unit 9 that detects frame synchronization based on the signals multiplexed by the multiplexer 6; and a controller 10 that, based on an out-of-frame-synchronization detection result (LOF (Loss of Frame) or OOF (Out of Frame)) from the reception frame processing unit 9, controls logical inversion operations in the clock and data recoveries 3 and 4, or controls a multiplexing timing in the multiplexer 6, or controls the delay interferometers in the front end 1.

Specifically, the optical signal receiver illustrated in FIG. 1A includes the front end 1 (40 G DQPSK OR) that receives and demodulates the DQPSK optical signals, the delay interferometer controller 2, the clock and data recovery (20 G CDR A) 3, the clock and data recovery (20 G CDR B) 4, a clock and data recovery controller (CDR controller) 5, the multiplexer (MUX) 6 with a multiplexing ratio of 2:1, a multiplexer controller 7, a de-serializer (DES) 8, a reception frame processing unit (framer-LSI) 9, and a controller 10.

The reception frame processing unit 9 has the functions of signal reception processing of DQPSK optical signals the same as the framer in the related art. In addition, the reception frame processing unit 9 at least has functions of detecting synchronization of received frames and detecting LOF and OOF. The detected results are sent to the controller 10 as indicated by a dashed-line arrow in FIG. 1A.

In FIG. 1A, it is illustrated that the reception frame processing unit 9 processes 16-channel parallel data; certainly, the number of channels of the parallel data can be reduced to increase operating speed of the circuit. On the other hand, the number of channels of the parallel data can also be increased along with an increase of capacity of the transmission line.

Until the LOF/OOF detection information (indicated by the dashed-line arrow from the reception frame processing unit 9 in FIG. 1A.) disappears, the controller 10 controls a bias voltage or the temperature of the delay interferometers through the delay interferometer controller 2 (this operation is indicated as "interferometer bias control" in FIG. 1A with a dashed-line arrow), performs logical inversion operations on data signals through the clock and data recovery controller 5 (this operation is indicated as "logical inversion control" in FIG. 1A with a dashed-line arrow), or controls the multiplexing sequence with a multiplexing ratio of 2:1 through the multiplexer controller 7 (this operation is indicated as "MUX timing control" in FIG. 1A with a dashed-line arrow).

Specifically, (a) the clock and data recovery controller 5 controls the logical inversion operations in the clock and data recoveries 3 and 4, (b) the multiplexer controller 7 controls multiplexing times of the multiplexer 6, and (c) the delay interferometer controller 2 controls the bias voltage or the temperature so as to adjust a $\pi/4$ delay interferometer and a $-\pi/4$ delay interferometer of the front end 1 to operate at optimum operation points. In addition, phase control is performed to shift the phase by $+\pi/2 \pm n\pi$ or $-\pi/2 \pm n\pi$ (n is an integer). Here, the delay interferometer controller 2 can perform the above controls by employing any well-known method.

The above control operations (a), (b), and (c) are repeated until the LOF/OOF detection information from the reception frame processing unit 9 disappears.

FIG. 1B is a table illustrating reception states of DQPSK signals in the signal reception device of the first embodiment.

The table in FIG. 1B shows whether signal reception is allowed of a logically inverted state and a logically non-inverting state of the quadrature-phase signal Q and the in-phase signal I from a port A and a port B of the front end 1, respectively.

In the table in FIG. 1B, for example, a double circle indicates an object DQPSK signal reception state, single circles indicate states able to be received after logical inversion control, triangles indicate states able to be received after a combination of a time shift operation and the logical inversion control, and crosses indicates states that cannot be received directly.

Assume in the object reception state, the quadrature-phase signal Q is from the port A of the front end 1, and the in-phase signal I is from the port B of the front end 1, and the reception frame processing unit 9 performs frame synchronization pull-in operations to approach this object reception state.

First, consider the reception states indicated by single circles in the table in FIG. 1B. In these reception states, the phase of the signal from the port A or the phase of the signal from the port B is inverted; thus it is possible to obtain the phase relation of the object reception state by the logical inversion control in the clock and data recoveries 3 and 4.

Next, consider the reception states indicated by triangles in the table. In these reception states, both the signal from the port A and the signal from the port B are different from the object reception state, including phase inverted states. In this case, by a combination of a time shift operation and the logical inversion control, it is possible to obtain the phase relation of the object reception state, in which the frame synchronization can be attained.

Next, consider the reception states indicated by crosses in the table. These reception states correspond to states that cannot be received directly. However, by repeating the above-mentioned control operations (a), (b), and (c) to adjust the delay interferometers to operate at optimum operating points, and by the logical inversion control of the regenerated clock signals and the multiplexing timing control, it is possible to transition to the object reception state.

FIG. 2A and FIG. 2B are diagrams and waveforms explaining the logical inversion control in the clock and data recovery 3 or 4 according to the present embodiment, including a CDR function section and a CDR LSI, as shown in FIG. 2A and FIG. 2B, where FIG. 2A illustrates the usual state of the clock and data recovery 3 or 4, and FIG. 2B illustrates a logical inversion state of the clock and data recovery 3 or 4.

In the usual state, a switch sw is set to operate such that data are input at 21.5 Gbps from the port A or the port B of the front end 1, and a clock signal at 21.5 Gbps and data at 21.5 Gbps are output. In this state, when the clock and data recovery controller 5 performs the logical inversion control, the switch SW is switched to the inversion circuit "not"; hence, logic of the output data is inverted.

Figures 3A, 3B:
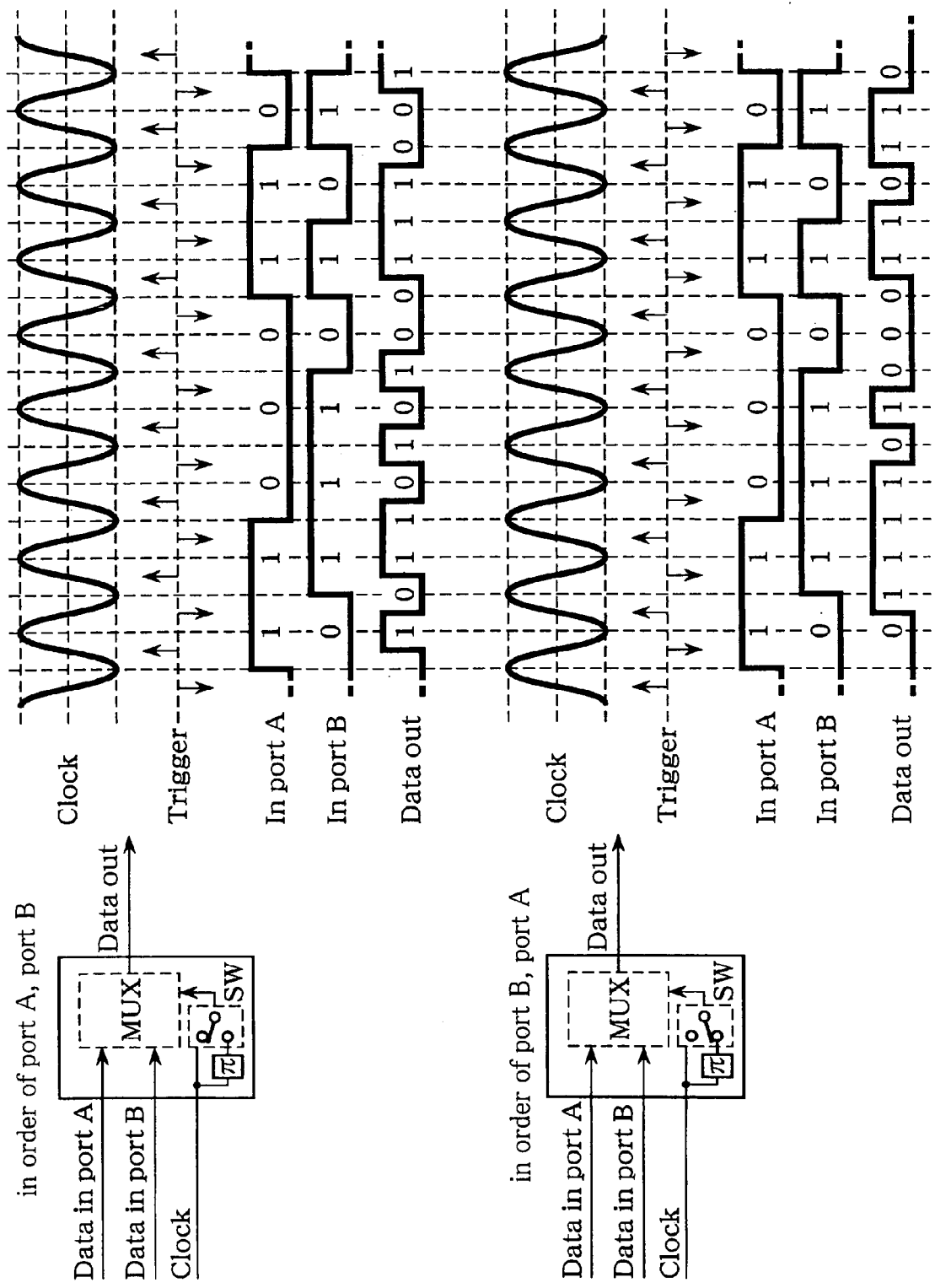
FIG. 3A and FIG. 3B are diagrams and waveforms explaining the timing control in the multiplexer (MUX) 6 with a multiplexing ratio of 2:1 according to the first embodiment.

FIG. 3A and FIG. 3B are diagrams and waveforms explaining the timing control in the multiplexer (MUX) 6 with a multiplexing ratio of 2:1 according to the present embodiment, where "Data in port A" indicates data input to the multiplexer (MUX) 6 from the port A of the front end 1 through the clock and data recovery 3 or 4, "Data in port B" indicates data input to the multiplexer (MUX) 6 from the port B of the front end 1 through the clock and data recovery 3 or 4, the clock signal from the clock and data recovery 3 or 4 is indicated by "Clock", and the multiplexed data output from the multiplexer 6 are indicated by "Data out". Also illustrated in FIG. 3A and FIG. 3B are a phase shifter denoted by "$\pi$" and a switch sw, in addition to the multiplexer (MUX) 6.

When the data from the port A are multiplexed first, and the data from the port B are multiplexed later (it is indicated as "port A→port B" in FIG. 3A), the switch sw switches the Clock signal into the multiplexer (MUX) 6, multiplexing is performed by the multiplexer (MUX) 6, and the corresponding state is shown by the waveforms of the Clock signal, the Trigger signal, the In port A signal, the In port B signal, and Data out signal. Here, the Trigger signal controls the In port A data signal to be output as the Data out signal at the rising time of the Clock signal, and controls the In port B data signal to be output as the Data out signal at the falling time of the Clock signal. Thereby, data "Data out" multiplexed at a ratio of 2:1 are obtained.

When the data from the port B are multiplexed first, and the data from the port A are multiplexed later (it is indicated as "port B→port A" in FIG. 3B), the switch SW switches the Clock signal into the side of the phase shifter "π", and the phase of the Clock signal is inverted compared to the port A→port B case by a phase shift of 180 degrees.

As a result, the multiplexing sequence of the port A and port B are reversed, and it is possible to control the multiplexed data "Data out" to switch from a sequence of port A→port B to a sequence of port B→port A.

Second Embodiment

FIG. 4 is a block diagram illustrating a principal portion of an optical signal receiver according to a second embodiment of the present invention; specifically, FIG. 4 illustrates a principal portion of the reception frame processing unit 9 (framer LSI) as shown in FIG. 1A.

As illustrated in FIG. 4, the reception frame processing unit 9 includes a frame processor 21, a frame synchronization circuit 22, and a signal reception state identifier 23 for identifying signal reception states of DQPSK signals.

In addition, 16 parallel signals each at 2.7 Gbps are input to the reception frame processing unit 9.

The frame synchronization circuit 22 includes 16 frame synchronizers FSC01 through FSC16, which perform frame synchronization detection on different combinations of synchronization bit strings. In an OTN (Optical Transport Network) signal, as recommended by ITU-T G.709, it is known that a header of a frame is identified by detecting a Frame Alignment Signal (FAS) used for frame synchronization in the overhead of a frame. When the Frame Alignment Signal is received to be in a manner of OA1, OA1, OA1, OA2, OA2, OA2 (here, OA1 represents "11110110", and OA2 represents "00101000"), it is decided that a frame synchronization state is attained, and a frame synchronization signal is sent to the frame processor 21.

Because FAS corresponds to the synchronization bytes A1, A2 of the overhead of a frame in SONET (Synchronous Optical Network) signals or SDH (Synchronous Digital Hierarchy) signals, the above method is also applicable to SONET (Synchronous Optical Network) signals or SDH (Synchronous Digital Hierarchy) signals.

In the frame synchronization using OA1 and OA2 of FAS, the frame synchronization circuit 22 has 16 frame synchronizers FSC01 through FSC16 corresponding to 16 different combinations of the in-phase signal I and the quadrature-phase signal Q, including logical inversion states thereof.

The DQPSK signal reception state identifier 23 receives detection signals from the 16 frame synchronizers FSC01 through FSC16, identifies the signal reception state by using a detection signal from any one of the frame synchronizers FSC01 through FSC16, and notifies the controller 10 (refer to FIG. 1) of the signal reception state identification information.

The frame processor 21 has the functions of frame synchronization pull-in operations, frame de-mapping, and transmitting detection results of LOF (Loss of Frame) or OOF (Out of Frame) to the controller 10.

FIG. 5 is a table corresponding to the table in FIG. 1B showing reception states of DQPSK signals, with 16 different combinations of OA1 and OA2 being indicated.

These 16 different combinations are detected in parallel, respectively, by the 16 frame synchronizers FSC01 through FSC16 in the frame synchronization circuit 22 as shown in FIG. 4. For example, the object signal reception state is indicated by the double circle, corresponding to $OA1_{QI}$="11110110", and $OA2_{QI}$="00101000", and a detection signal from the frame synchronizer FSC01 is input to the DQPSK signal reception state identifier 23. The DQPSK signal reception state identifier 23 notifies the controller 10 of the information of the frame synchronization state. In this case, the controller 10 is notified that the object reception state is present. When the object reception state is not present, the controller 10 controls the components thereof to generate the object reception state, or maintains control conditions.

When a detection signal from one of the frame synchronizers FSC02 through FSC04 is input to the DQPSK signal reception state identifier 23, it is determined that the logical state of either the in-phase signal I or the quadrature-phase signal Q is inverted relative to the object signal reception state indicated by the double circle. The DQPSK signal reception state identifier 23 notifies the controller 10 of the information of the reception state. Receiving this information, as illustrated in FIG. 2, the controller 10 may control the clock and data recoveries 3 and 4 to execute logical inversion so as to generate the in-phase signal I and the quadrature-phase signal Q of the object signal reception state.

When a detection signal from one of the frame synchronizers FSC05 through FSC08 is input to the DQPSK signal reception state identifier 23, it is determined that the detected reception state corresponds to one of the reception states indicated by triangles in FIG. 1B. The DQPSK signal reception state identifier 23 notifies the controller 10 of the reception state information. Receiving this information, the controller 10 controls the clock and data recoveries 3 and 4 to execute logical inversion, as illustrated in FIG. 2, and controls the multiplexer 6 to execute multiplexing timing control to change the multiplexing order, as illustrated in FIG. 3.

When a detection signal from one of the frame synchronizers FSC09 through FSC16 is input to the DQPSK signal reception state identifier 23, it is determined that the detected reception state corresponds to one of the reception states indicated by the crosses in FIG. 1B. The DQPSK signal reception state identifier 23 notifies the controller 10 of the reception state information. Because the reception states indicated by the crosses in FIG. 1B correspond to states that cannot be received directly, the controller 10 may terminate reception processing, or repeat the control operations (a), (b), and (c) as described in the previous embodiment.

In the present embodiment, because the frame synchronizers FSC01 through FSC16 of the reception frame processing unit 9 handle the DQPSK signal reception states in parallel, it is possible to quickly perform the frame synchronization state pull-in step compared to the method of repeating the control operations (a), (b), and (c) sequentially, as described in the previous embodiment.

Third Embodiment

Figure 6:
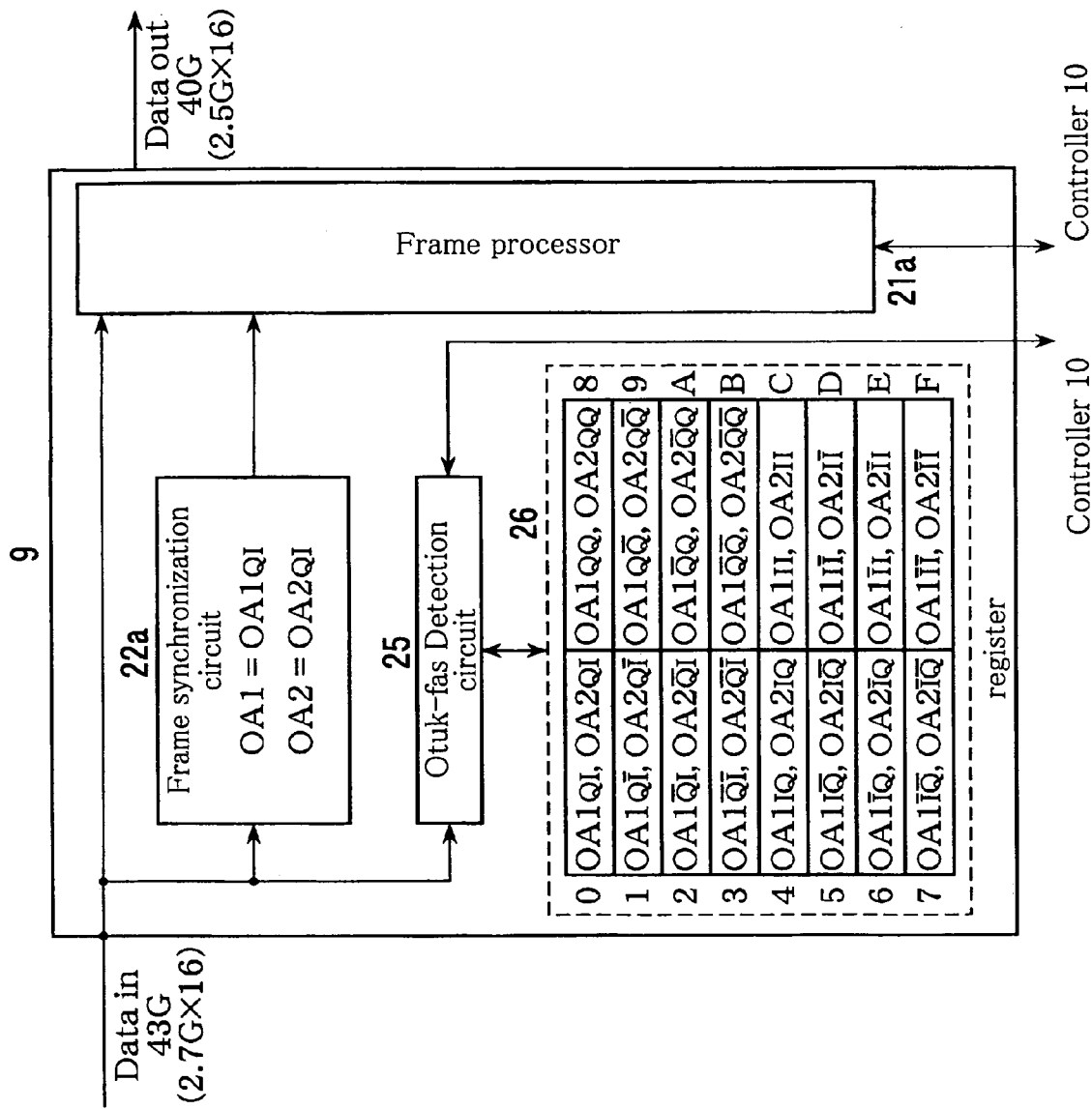
FIG. 6 is a block diagram illustrating a principal portion of an optical signal receiver according to a third embodiment of the present invention.

FIG. 6 is a block diagram illustrating a principal portion of an optical signal receiver according to a third embodiment of the present invention; specifically, FIG. 6 illustrates a principal portion of the reception frame processing unit 9 (framer LSI) as shown in FIG. 1A.

As illustrated in FIG. 6, the reception frame processing unit 9 includes a frame processor 21a, a frame synchronization circuit 22a, an OTUk-FAS detection circuit 25, and registers 26. The same as FIG. 4, 16 parallel signals each at 2.7 Gbps from the de-serializer (DES) 8 are input to the reception frame processing unit 9.

The frame synchronization circuit 22a detects predetermined synchronization bits to detect frame synchronization, and sends a frame synchronization signal to the frame processor 21.

In OTN (Optical Transport Network) systems, as recommended by ITU-T G.709, Frame Alignment Signal (FAS) bytes are defined as the frame synchronization bits in an overhead section of an OTU signal, and when the Frame Alignment Signal is received to be in a manner of OA1, OA1, OA1, OA2, OA2, OA2 (here, OA1 represents "11110110", and OA2 represents "00101000"), it is decided that a frame synchronization state is attained.

Because FAS corresponds to the synchronization bytes A1, A2 of the overhead of a frame in SONET (Synchronous Optical Network) signals or SDH (Synchronous Digital Hierarchy) signals, in the case of SONET signals or SDH signals, the OTUk-FAS detection circuit 25 serves as a detection circuit for detecting the synchronization bytes A1, A2 in SONET signals or SDH signals.

The registers 26 retain 16 different combinations of OA1 and OA2 of FAS as shown in FIG. 5, corresponding to variations of the reception states of the in-phase signal I and the quadrature-phase signal Q. Here, it is assumed that the registers 26 can be rewritten without any limitations.

The OTUk-FAS detection circuit 25, serving as a frame synchronization detection circuit, reads in the 16 different combinations of FAS retained in the registers 26 sequentially, detects which combination of OA1 and OA2 corresponds to a successful frame synchronization detection, and notifies the controller 10 of the information of the detected combination of OA1 and OA2. As described above, the controller 10 controls the components thereof to attain the object reception state.

Figure 7:
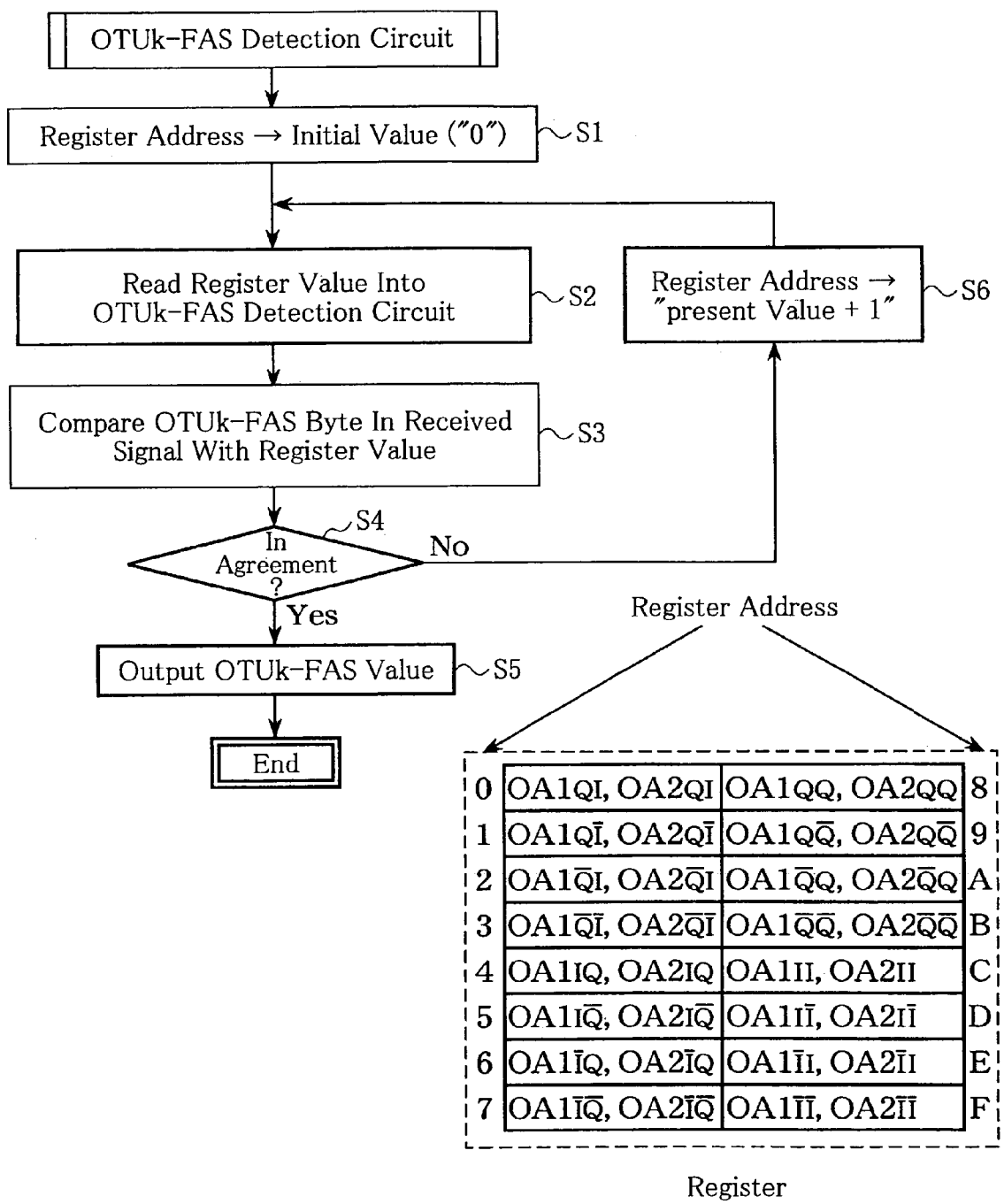
FIG. 7 is a flowchart illustrating operations of the OTUk-FAS detection circuit 25 in the third embodiment.

FIG. 7 is a flowchart illustrating operations of the OTUk-FAS detection circuit 25.

In step S1, when the frame synchronization circuit 22a detects an LOF (Loss of Frame) or OOF (Out of Frame) state, the OTUk-FAS detection circuit 25 sets an initial value of a register address to be "0".

In step S2, the OTUk-FAS detection circuit 25 reads in one of the 16 combinations of OA1 and OA2 of FAS retained at the register address in the registers 26.

In step S3, the OTUk-FAS detection circuit 25 compares the thus obtained register value to a received OTUk-FAS byte.

If it is determined that the register value is in agreement with the received OTUk-FAS byte in step S4, the value of the OTUk-FAS is output and sent to the controller 10 in step S5.

If it is determined that the register value is not in agreement with the received OTUk-FAS byte in step S4, the register address is incremented by one in step S6, and the routine returns to step S2 to repeat the operations from step S2 to step S4.

That is, the OTUk-FAS detection circuit 25 reads in the next combination of OA1 and OA2 of FAS retained at the new register address in the registers 26, and compares the newly obtained register value to the received OTUk-FAS byte. This routine is repeated until the register value is in agreement with the received OTUk-FAS byte. When agreement is detected, the value of the OTUk-FAS is sent to the controller 10. Receiving the OTUk-FAS value, the controller 10 determines the DQPSK signal reception state as shown in FIG. 1B, and if the object reception state is not attained, the controller 10 controls the components thereof to transition to the object reception state.

Fourth Embodiment

Figures 8A, 8B:
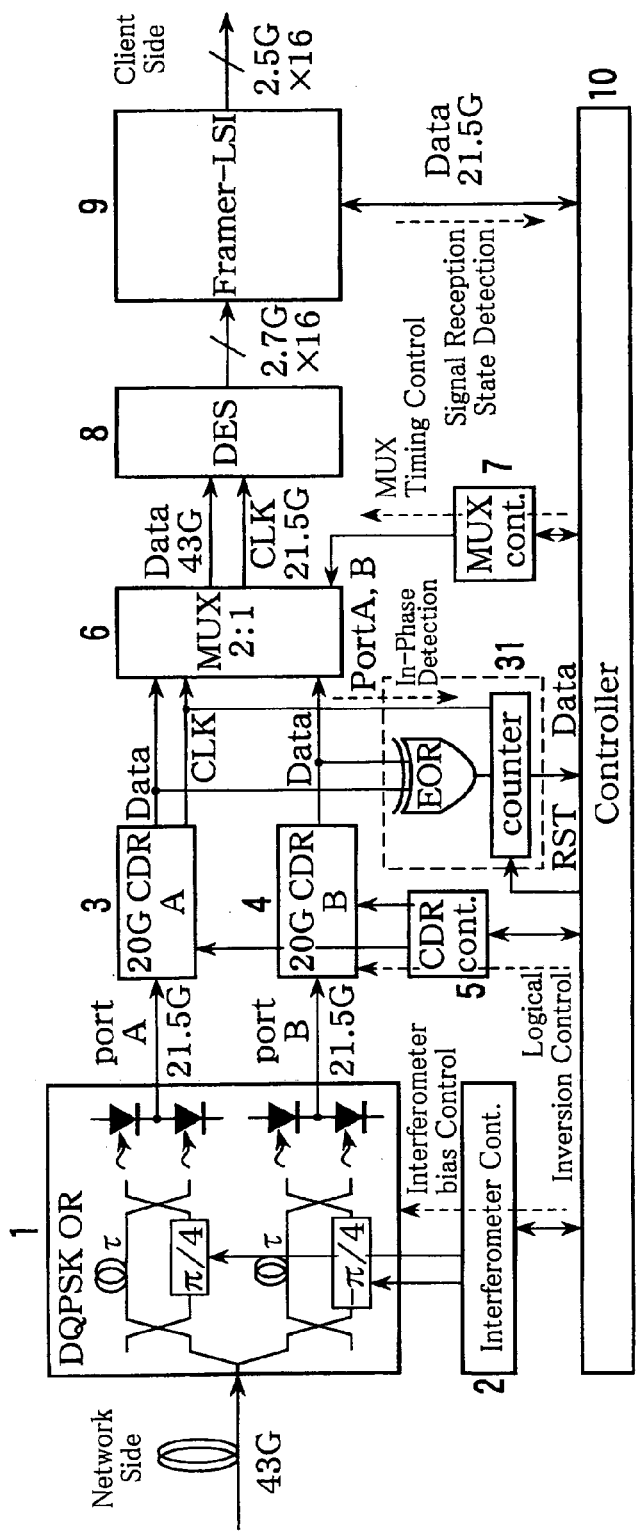
FIG. 8A is a block diagram illustrating a principal portion of an optical signal receiver according to a fourth embodiment of the present invention used in an optical communication system for transmitting the DQPSK optical signals.
FIG. 8B is a table illustrating reception states of DQPSK signals in the signal reception device of the fourth embodiment.

FIG. 8A is a block diagram illustrating a principal portion of an optical signal receiver according to a fourth embodiment of the present invention used in an optical communication system for transmitting the DQPSK optical signals.

In the present embodiment, the same reference numbers are assigned to the same elements as those shown in FIG. 1A.

The optical signal receiver in FIG. 8A further includes an in-phase detection circuit 31 having an exclusive OR logical circuit EOR and a counter.

FIG. 8B is a table illustrating reception states of DQPSK signals in the signal reception device of the present embodiment.

As shown in the table in FIG. 8B, the same as the table in FIG. 1B, with symbols of double circle, single circles, triangles, and crosses, the table in FIG. 8B shows conditions for logical inversion control and a logical non-inversion control of the quadrature-phase signal Q and the in-phase signal I from the port A and the port B, respectively.

In addition, a reset signal RST generated by the controller 10 in each frame period or in correspondence to a low frequency clock signal is input to the counter of the in-phase detection circuit 31 to reset the counter and to start counting up in-phase detection signals from the exclusive OR logical circuit EOR. The count prior to the next RST signal is indicated by "Data" in FIG. 8A, and the count "Data" is input to the controller 10.

The in-phase detection circuit 31 is able to detect the DQPSK signal reception states indicated by crosses in the table in FIG. 8B, namely, the reception states in which both the signal from the port A and the signal from the port B are the in-phase signal I or the quadrature-phase signal Q, or logical inversion of the in-phase signal I or the quadrature-phase signal Q.

When the DQPSK signal reception states indicated by crosses are detected, the controller 10 directs the delay interferometer controller 2 to shift the phase of one interferometer in the front end 1 by $\pi/2$ or $-\pi/2$. Specifically, as described above, phase control is performed to shift the phase by $+\pi/2 \pm n\pi$ or $-\pi/2 \pm n$ (n is an integer). Then, the controller 10 controls the components so that a normal reception state is obtained after repeatedly executing the aforesaid control operations (a), (b), and (c).

The same as described with reference to FIG. 1A, and FIG. 1B, until the LOF/OOF detection information (indicated by the dashed-line arrow from the reception frame processing unit 9 in FIG. 1A.) disappears, the controller 10 controls the bias voltage or the temperature of the delay interferometers through the delay interferometer controller 2 (indicated as "interferometer bias control"), performs logical inversion operations on data signals through the clock and data recovery controller 5 (indicated as "logical inversion control"), or controls the multiplexing sequence with a multiplexing ratio of 2:1 through the multiplexer controller 7 (indicated as "MUX timing control"). Further, the in-phase detection circuit 31 having an exclusive OR logical circuit EOR and a counter performs in-phase detection and notifies the controller 10 of the results (this operation is indicated as "in-phase detection" in FIG. 8A with a dashed-line arrow).

Figures 9A, 9B:
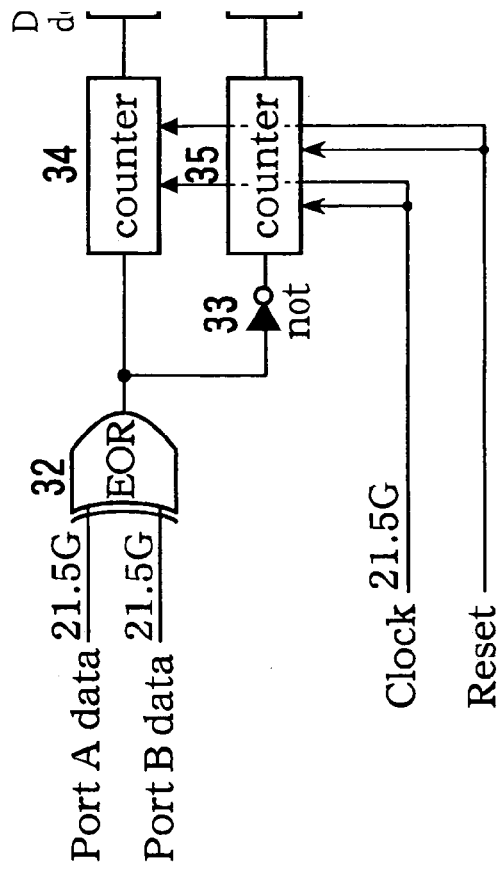
FIG. 9A is a block diagram illustrating a configuration of the in-phase detection circuit 31 in the fourth embodiment.
FIG. 9B is a table illustrating relations between states of signals "Port A Data", "Port B Data", and signals "Output i", "Output j" from the discrimination decision circuits 36, 37 in the fourth embodiment.

FIG. 9A is a block diagram illustrating a configuration of the in-phase detection circuit 31 in the present embodiment.

As illustrated in FIG. 9A, the in-phase detection circuit 31 includes an exclusive OR logical circuit (EOR) 32, an inversion circuit (NOT) 33, counters 34, 35, and discrimination decision circuits 36, 37.

Signals from the port A and the port B of the front end 1 at 21.5 Gbps (indicated by "Port A data" and "Port B data", respectively) are input to the exclusive OR logical circuit 32 via the clock and data recoveries 3 and 4.

The controller 10 outputs a reset signal RST in each frame period or in correspondence to a low frequency clock signal. The reset signal RST resets the counters 34, 35. Output signals from the exclusive OR logical circuit EOR are input to the counter 34, and input to the counter 35 via the inversion circuit 33. The counters 34, 35 count up the input signals according to the clock signal "Clock".

The counts obtained by the counters 34 and 35 in each preset interval, such as a frame period, are input to the discrimination decision circuits 36, 37, and are compared to a reference value. The identification circuit 36 and 37 output signals indicating comparison results. Specifically, the identification circuit 36 or the identification circuit 37 outputs a signal at a high level (H) if the count is greater than the reference value, and outputs a signal at a low level (L) if the count is less than or equal to the reference value. The output signals from the discrimination decision circuits 36, 37 are indicated by "Output i", "Output j", respectively in FIG. 9A.

The discrimination decision circuits 36, 37 output the signals "Output i" and "Output j" to the controller 10.

FIG. 9B is a table illustrating relations between states of signals "Port A Data", "Port B Data", and levels (H or L) of signals "Output i", "Output j" from the discrimination decision circuits 36, 37.

As illustrated in FIG. 9B, when the signal "Port A Data" and the signal "Port B Data" have the same phase, the output signals from the exclusive OR logical circuit 32 are at the low level (L), whereas when the signal "Port A Data" and the signal "Port B Data" have different phases, the output signals from the exclusive OR logical circuit 32 are at the high level (H).

Because the counters 34, 35 are configured to count up a high level signal at the timing of the clock signal "Clock", when the input signals to the counters 34, 35 have the same phase, it turns out that one of the counters, for example, the counter 34, has a count close to zero, and the other one of the counters, for example, the counter 35 has a count close to a maximum. To the contrary, when the input signals to the counters 34, 35 have different phases, one of the counters, for example, the counter 34, has a count close to the maximum, and the other one of the counters, for example, the counter 35 has a count close to zero. Hence, if the output signal "Output i" from the identification circuit 36 is at the low level L, and the output signal "Output j" from the identification circuit 37 is at the high level H, it can be determined that the two input signals have the same phase. On the other hand, if the output signal "Output i" from the identification circuit 36 and the output signal "Output j" from the identification circuit 37 are both at the high level H or at the low level L, it can be determined that the phase relation between the two input signals is random, that is, the phase relation is undetermined.

Fifth Embodiment

Figures 10A, 10B:
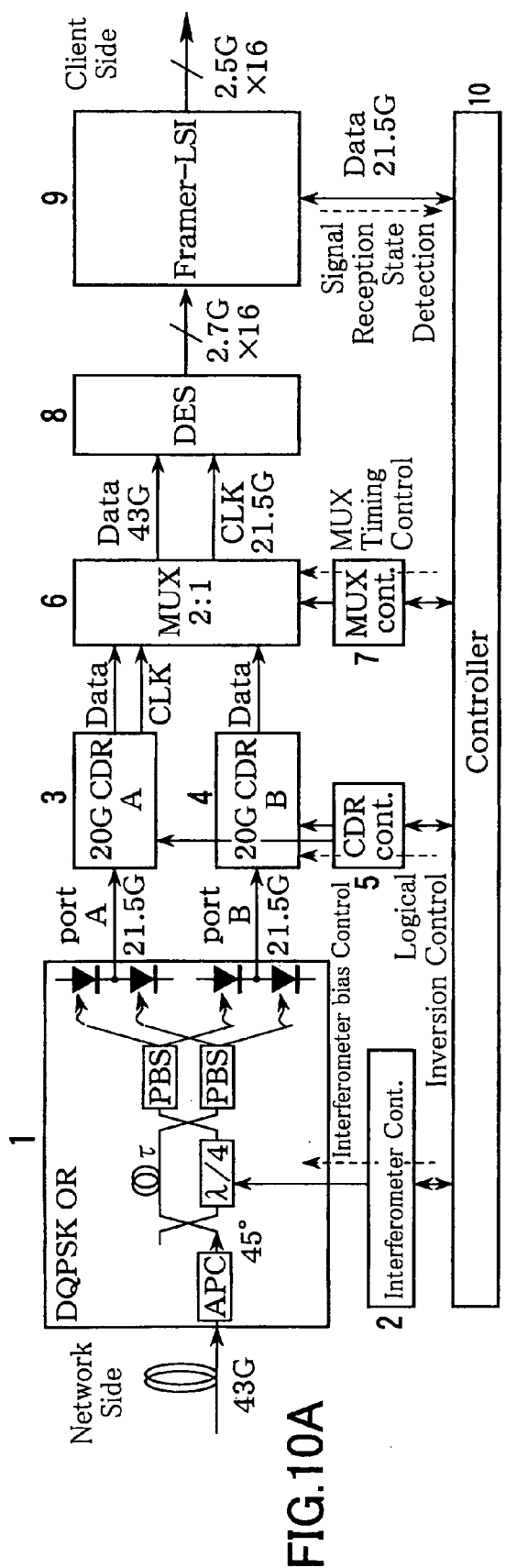
FIG. 10A is a block diagram illustrating a principal portion of an optical signal receiver according to a fifth embodiment of the present invention used in an optical communication system for transmitting the DQPSK optical signals.
FIG. 10B is a table illustrating reception states of DQPSK signals in the signal reception device of the fifth embodiment.

FIG. 10A is a block diagram illustrating a principal portion of an optical signal receiver according to a fifth embodiment of the present invention used in an optical communication system for transmitting the DQPSK optical signals.

In the present embodiment, the same reference numbers are assigned to the same elements as those shown in FIG. 1A.

As illustrated in FIG. 10A, the front end 1 includes an auto polarization controller APC, a delay interferometer, a polarizing beam splitter PBS, and opto-electrical conversion elements.

The auto polarization controller APC generates a polarized optical signal with a polarization plane at 45 degrees, a polarization maintaining fiber transmits the optical signal while maintaining such a polarization plane, and then the polarized optical signal is input to the delay interferometer.

FIG. 10B is a table illustrating reception states of DQPSK signals in the signal reception device of the present embodiment.

As illustrated in FIG. 10B, because of the front end 1 as shown in FIG. 10A, DQPSK signal reception states indicated by a double circle, a single circle, and triangles are generated, but other states are not generated. That is, there are only four possible combinations that generate logic states.

Then, according to the reception state detection information indicated by the dashed-line arrow from the reception frame processing unit 9 to the controller 10, the controller 10 controls the bias voltage or the temperature of the delay interferometer through the delay interferometer controller 2 (indicated as "interferometer bias control"), performs logical inversion operations on data signals through the clock and data recovery controller 5 (indicated as "logical inversion control"), or controls the multiplexing sequence with a multiplexing ratio of 2:1 through the multiplexer controller 7 (indicated as "MUX timing control").

Figure 11:
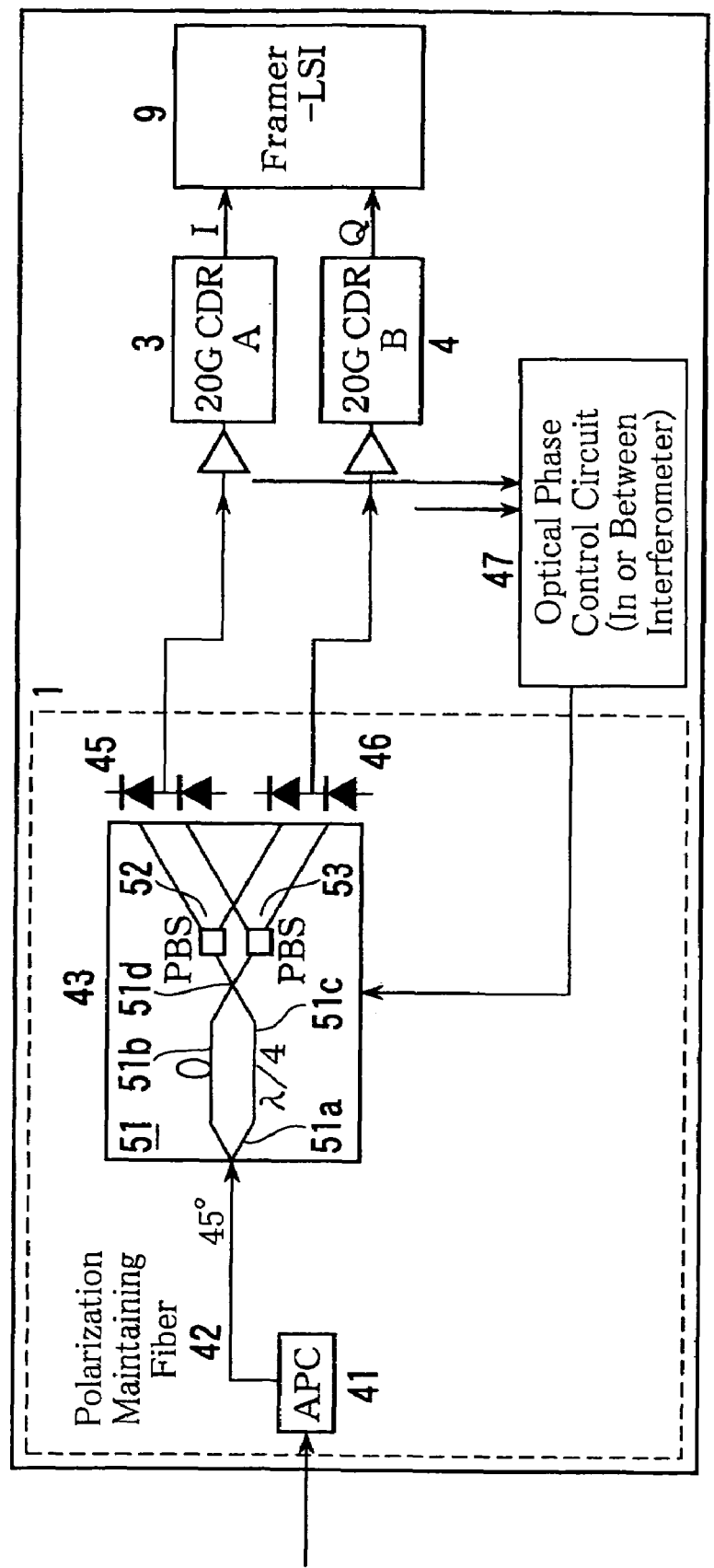
FIG. 11 is a block diagram illustrating a specific configuration of a principal portion of the optical signal receiver in the fifth embodiment.

FIG. 11 is a block diagram illustrating a specific configuration of a principal portion of the optical signal receiver in the present embodiment.

Shown in FIG. 11 are the front end 1, the clock and data recoveries 3, 4, the reception frame processing unit 9, and an optical phase control circuit 47 having functions of the delay interferometer controller 2 and the controller 10.

As illustrated in FIG. 11, the front end 1 includes an auto polarization controller (APC) 41, a polarization maintaining fiber 42, an optical wave circuit 43, differential light receiving circuits 45, 46, each of which has a pair of opto-electric conversion elements, a delay interferometer 51, an input-side optical coupler 51a, arms 51b, 51c, an output-side optical coupler 51d, and polarizing beam splitters (PBS) 52, 53.

The auto polarization controller 41 is configured to be able to change a polarization state of a DQPSK optical signal arbitrarily.

The auto polarization controller 41 monitors and automatically controls the polarization state of the DQPSK optical signal inside so as to generate a linearly-polarized light beam having a polarization plane inclined by 45 degrees relative to a birefringence axis of the lower arm 51c below the delay interferometer 51.

The delay interferometer 51 may be a Mach-Zehnder light guide including the input-side optical coupler 51a serving as a branching portion, the upper arm 51b, the lower arm 51c, and the output-side optical coupler 51d serving as a combining portion. Optical path lengths of the two arms 51b and 51c are designed to be different from each other so as to generate a relative time delay $\tau$ equivalent to one symbol of the QOPSK optical signal between light beams propagating through the arms 51b and 51c.

For example, by setting the total length of the upper arm 51b longer than that of the lower arm 51c, the time delay $\tau$ is induced which depends on the length of the delay line but is independent of the polarization state.

In addition, the arm 51c below the delay interferometer 51 has a cross-sectional structure different from other components, or the additives in the substrate of the arm 51c are different from other components. Due to this, the arm 51c operates as a light guide having birefringence and functioning as a ¼ wavelength plate (λ/4), and is able to generate a birefringence difference equaling to π/2 between the TE mode and the TM mode for the corresponding one of the two light beams branched to the arm 51c by the input-side optical coupler 51a.

The light beams formed by splitting performed by the input-side optical coupler 51a and propagating through the upper arm 51b and the lower arm 51c, respectively, are combined by the output-side optical coupler 51d first, and are then branched (split) again into two complementary signals. One of the two complementary signals is input to the polarizing beam splitter 52, and the other one of the two complementary signals is input to the polarizing beam splitter 53.

Each of the polarizing beam splitters 52, 53 has an optical axis parallel to the birefringence axis of the lower arm 51c below the delay interferometer 51, and splits the light beam from the delay interferometer 51 into a TE mode light beam and a TM mode light beam.

The TE mode light beams split by the polarizing beam splitters 52, 53 propagate through respective output light guides extending to the end of the substrate of the optical wave circuit 43, and enter into the differential light receiving circuits 45 and 46 arranged near the end of the output light guides.

Similarly, the TM mode light beams split by the polarizing beam splitters 52, 53 also propagate through respective output light guides extending to the end of the substrate of the optical wave circuit 43, and enter into the differential light receiving circuits 45 and 46 arranged near the end of the output light guides.

In FIG. 11, the output light guides extending from the polarizing beam splitters 52, 53 to the differential light receiving circuits 45, 46 are arranged to intersect with each other, but the output light guides may also be arranged to involve less cross-talk.

The optical wave circuit 43 is controlled by the optical phase control circuit 47, for example, to adjust the temperature of the substrate near the light guide or the electrical field near the light guide to perform optical phase control in the optical wave circuit 43.

For example, the TE mode light beams split by the polarizing beam splitters 52, 53 are input to the pair of light receiving elements in the differential light receiving circuit 45, which outputs a signal I obtained by demodulating the in-phase component of the DQPSK optical signal.

Meanwhile, the TM mode light beams split by the polarizing beam splitters 52, 53 are input to the pair of light receiving elements in the differential light receiving circuit 46, which outputs a signal Q obtained by demodulating the quadrature-phase component of the DQPSK optical signal.

The signal I and the signal Q from the differential light receiving circuits 45, 46, respectively, are input to the clock and data recoveries 3, 4 to regenerate the clock signal.

According to the present embodiment, the auto polarization controller 41 of the front end 1 changes a polarization state of the input DQPSK optical signal into a linearly-polarized light beam, specifically, having a polarization plane inclined by 45 degrees relative to the birefringence axis; the linearly-polarized light beam propagates through the polarization maintaining fiber 42 and is input to the optical wave circuit 43; and the optical wave circuit 43 splits the input linearly-polarized light beam into the in-phase signal I and the quadrature-phase signal Q. In the previous embodiments, the front end has two delay interferometers. In contrast, in the present embodiment the optical wave circuit 43 has only one delay interferometer 51. Hence it is possible to make the signal reception device compact and simplify the structure of the signal reception device.

In addition, because a delay time difference equivalent to one symbol of the DQPSK optical signal and independent of the polarization state is generated by a light guide formed from a delay line, and at the same time a phase difference is generated between the TE mode light beam and the TM mode light beam by the upper arm only, thereby shifting the interference operation point by exactly π/2, it is not necessary to control the phase difference between the in-phase component and the quadrature-phase component. As a result, as illustrated by the DQPSK signal reception states in the table in FIG. 10B, it is sufficient to detect four reception states, and perform the logical conversion control and the multiplexing timing control.

Therefore, the frame synchronization circuit 22 illustrated in FIG. 4 in the reception frame processing unit 9 can be configured to include the frame synchronizer FSC01 for detecting the signal reception state indicated by the double circle, the frame synchronizer FSC04 for detecting the signal reception state indicated by the single circle, and the frame synchronizers FSC05, FSC08 for detecting the signal reception state indicated by the triangles. Hence, it is possible to simplify the structure of the frame synchronization circuit 22.

Sixth Embodiment

Figure 12:
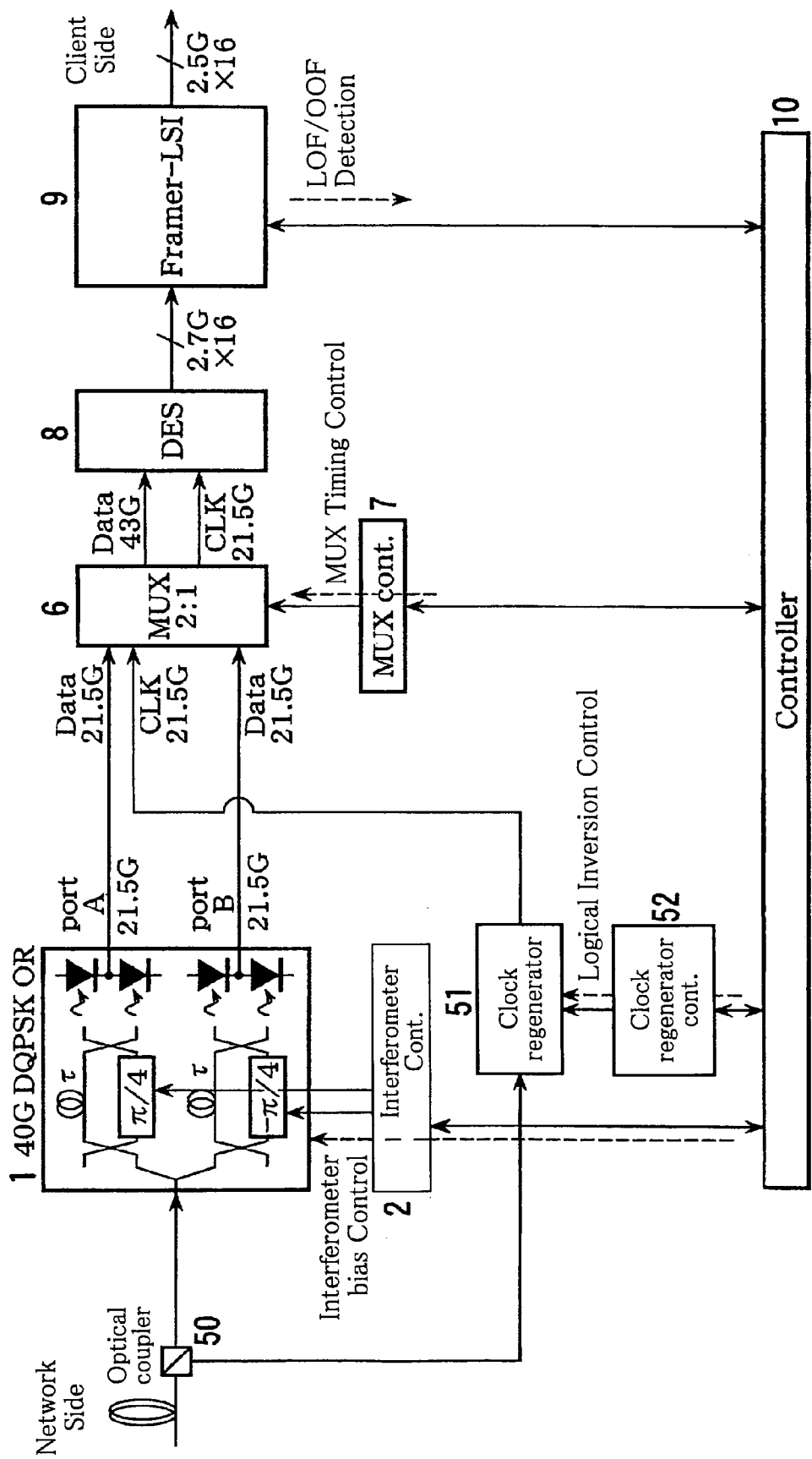
FIG. 12 is a block diagram illustrating a principal portion of an optical signal receiver according to a sixth embodiment of the present invention used in an optical communication system for transmitting the DQPSK optical signals.

FIG. 12 is a block diagram illustrating a principal portion of an optical signal receiver according to a sixth embodiment of the present invention used in an optical communication system for transmitting the DQPSK optical signals.

In the present embodiment, the same reference numbers are assigned to the same elements as those shown in FIG. 1A.

The optical signal receiver in FIG. 12 further includes a clock recovery 51, and a clock regeneration controller 52.

Figure 38:
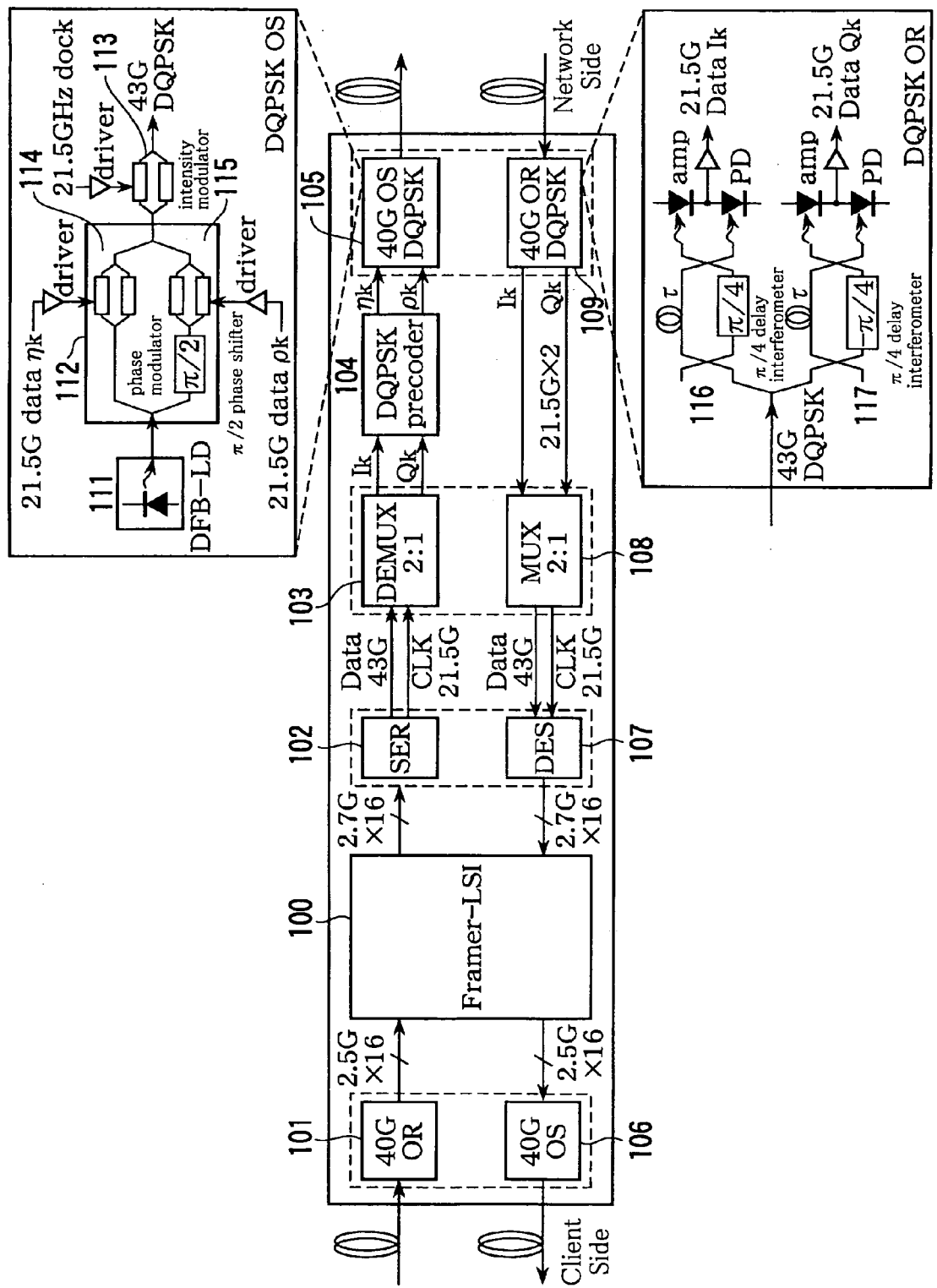
FIG. 38 is a block diagram illustrating an optical transponder (an optical sender and an optical receiver) employing the IM-DQPSK modulation scheme in the related art.
Figure 39:
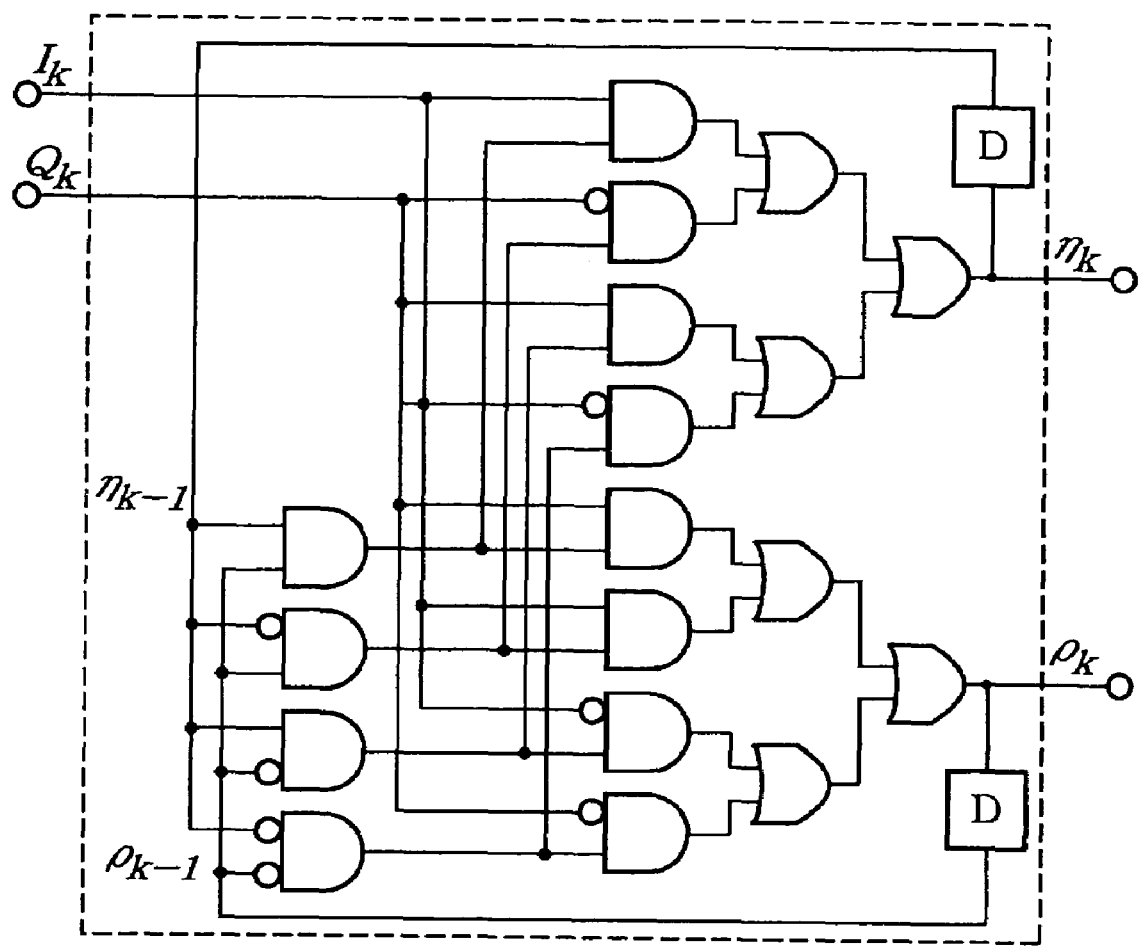
FIG. 39 is a circuit diagram illustrating an example of a configuration of a DQPSK precoder in the related art.
Figure 40:
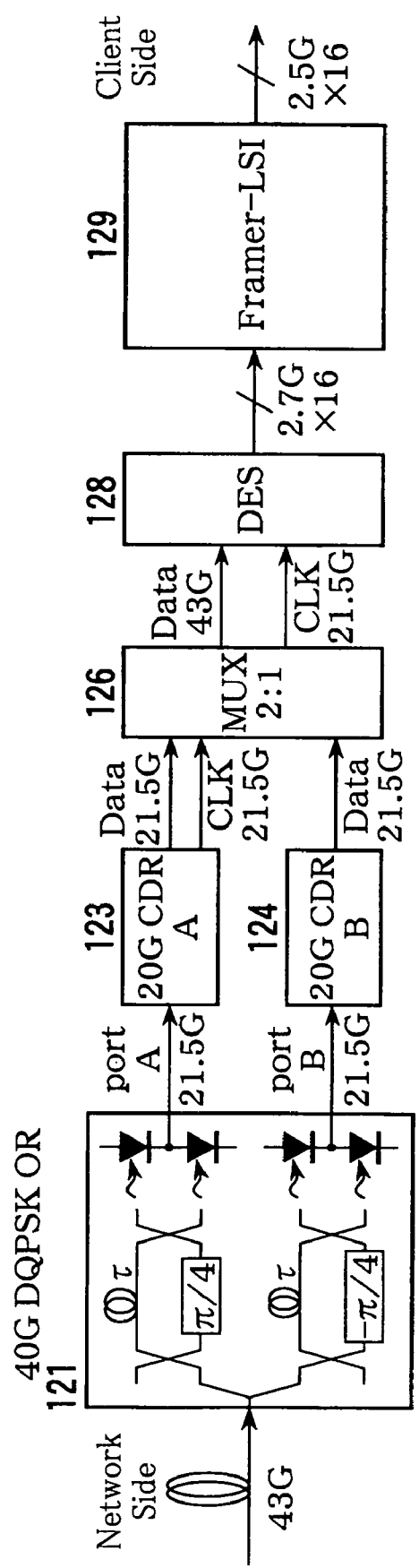
FIG. 40 is a block diagram illustrating a principal portion of an optical signal receiver used in an optical communication system for transmitting the DQPSK optical signals in the related art.

For example, as illustrated in FIG. 38, when a phase-modulated optical signal is intensity-modulated by an intensity modulator in accordance with a clock signal to transmit an IM-DQPSK optical signal, the received modulated optical signal is split by an optical coupler 50, and the split signals are input to the front end 1 (40 G DQPSK OR) and the clock recovery 51, respectively. The clock recovery 51 regenerates the clock signal CLK from the intensity-modulated received optical signal including a clock signal component, and regenerated clock signal CLK is input to the multiplexer 6 (MUX 2:1).

The front end 1, the multiplexer 6, the de-serializer (DES) 8, and the reception frame processing unit (framer-LSI) 9 have the same structures and operate in the same way as those described in the previous embodiments.

That is, the LOF/OOF detection signal (indicated by a dashed-line arrow from the reception frame processing unit 9 in FIG. 12) is input to the controller 10, and in order for the LOF/OOF detection signal to disappear, the controller 10 controls the multiplexing sequence in the multiplexer 6 through the multiplexer controller 7 (indicated as "MUX timing control"), and controls the clock recovery 51 through the clock regeneration controller 52 to perform a logical inversion operation (indicated as "logical inversion control") As described above with reference to FIG. 2 and FIG. 3, the logical inversion operation is performed so that the quadrature-phase signal Q and the in-phase signal I attain the object reception state.

In the present embodiment, because only a single clock recovery 51 is provided instead of the clock and recoveries 3 and 4 in the previous embodiments, which are provided corresponding to the port A and port B of the front end 1, respectively, it is possible to simplify the structure of the device.

Seventh Embodiment

Figures 13A, 13B:
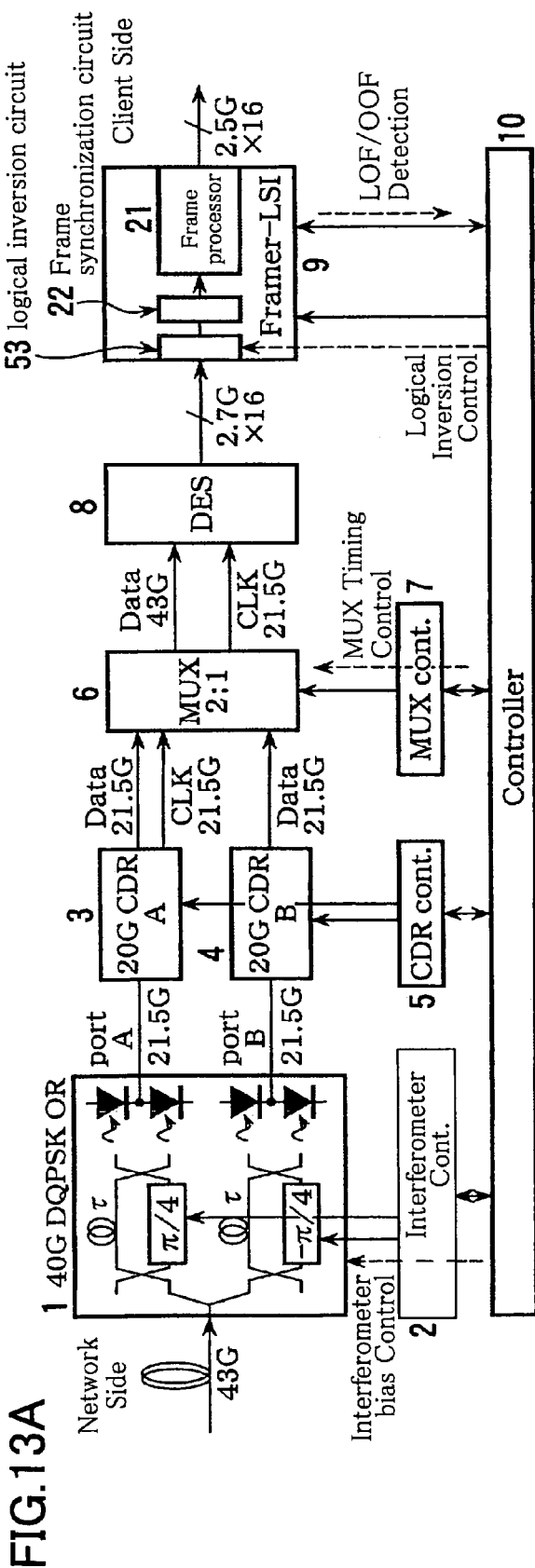
FIG. 13A is a block diagram illustrating a principal portion of an optical signal receiver according to a seventh embodiment of the present invention used in an optical communication system for transmitting the DQPSK optical signals.
FIG. 13B is a table illustrating reception states of DQPSK signals in the signal reception device of the seventh embodiment.

FIG. 13A is a block diagram illustrating a principal portion of an optical signal receiver according to a seventh embodiment of the present invention used in an optical communication system for transmitting the DQPSK optical signals.

FIG. 13B is a table illustrating reception states of DQPSK signals in the signal reception device of the present embodiment.

In the present embodiment, the same reference numbers are assigned to the same elements as those shown in FIG. 1A and FIG. 4.

The optical signal receiver in FIG. 13A further includes a logical inversion circuit 53.

The logical inversion circuit 53 has the same function as the logical inversion control in the clock and data recoveries 3 and 4, as described with reference to FIG. 1A and FIG. 2B, to control logical inversion and non-inversion of the quadrature-phase signal Q and the in-phase signal I.

The logical inversion circuit 53, the frame synchronization circuit 22, and the frame processor 21 are integrated to be a 16-channel parallel processing integrated circuit, constituting the reception frame processing unit (framer-LSI) 9.

The LOF/OOF detection signal (indicated by a dashed-line arrow from the reception frame processing unit 9 in FIG. 13) is input to the controller 10, and in order for the LOF/OOF detection signal to disappear, the controller 10 controls the logical inversion circuit 53 via the logical inversion control indicated by a dashed-line arrow, or controls the multiplexing sequence in the multiplexer (MUX 2:1) 6 through the multiplexer controller 7 by MUX timing control indicated by a dashed-line arrow, or controls a bias voltage or the temperature of the delay interferometer in the front end 1 through the delay interferometer controller 2 by the interferometer bias control indicated as a dashed-line arrow.

Figures 14A, 14B:
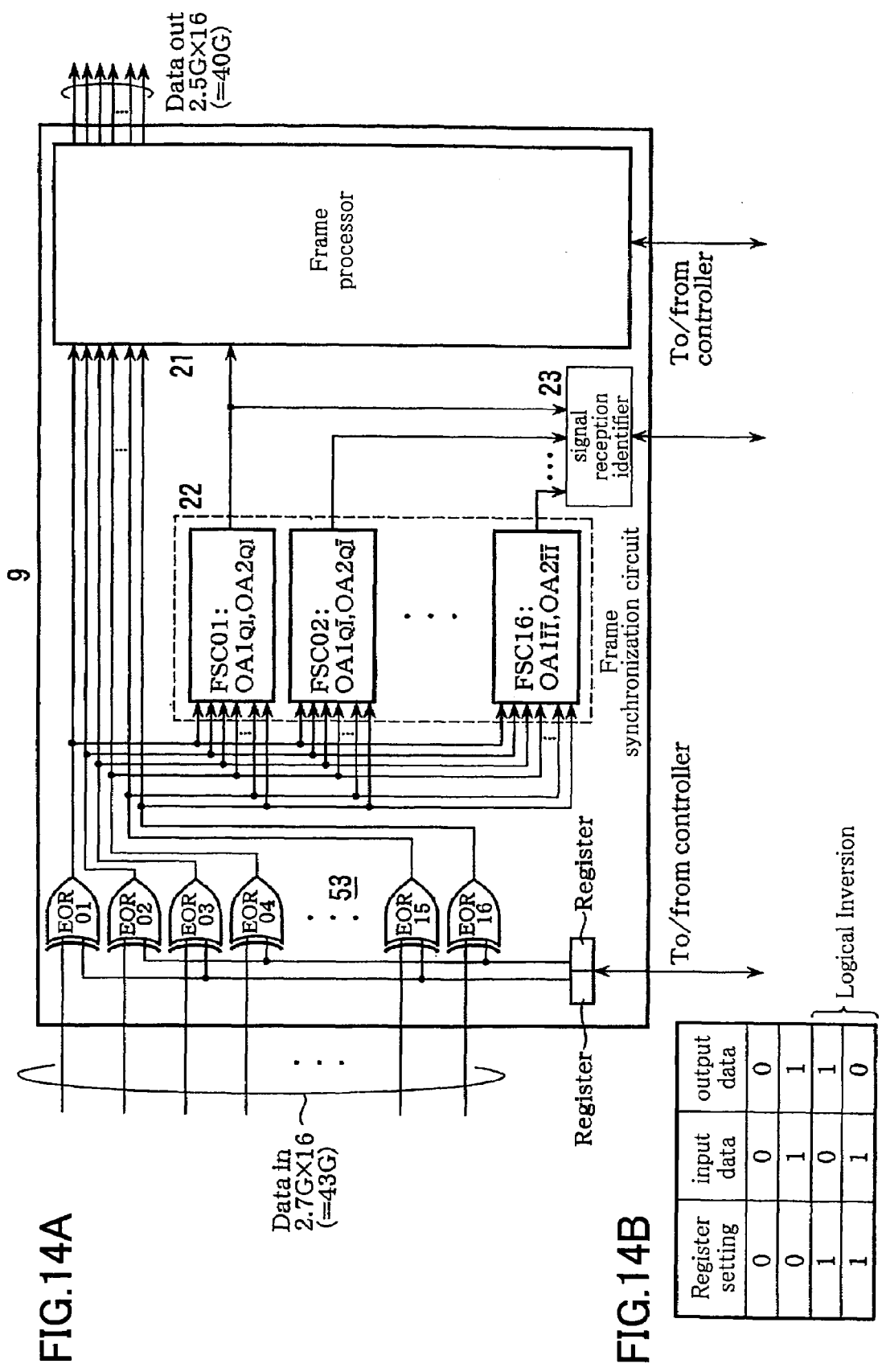
FIG. 14A is a block diagram illustrating an example of the reception frame processing unit 9 (framer LSI) according to the seventh embodiment.
FIG. 14B is a table illustrating settings of registers in the logical inversion circuit 53.

FIG. 14A is a block diagram illustrating an example of the reception frame processing unit 9 (framer LSI) according to the present embodiment.

FIG. 14B is a table illustrating settings of registers in the logical inversion circuit 53.

In FIG. 14A, the same reference numbers are assigned to the same elements as those shown in FIG. 4.

As illustrated in FIG. 14A, the logical inversion circuit 53 processes 16-channel parallel input data, thus illustrated as 2.7 G×16 (=43 G). The logical inversion circuit 53 constitutes a 16-channel parallel processing circuit from exclusive OR logical circuits EOR01 through EOR16. In addition, the logical inversion circuit 53 includes registers for setting the logical inversion control signal from the controller 10 (refer to FIG. 13A) to odd-numbered ones and even-numbered ones of the exclusive OR logical circuits EOR01 through EOR16. The exclusive OR logical circuits EOR01 through EOR16 and the registers constitute an integrated circuit as the reception frame processing unit (framer-LSI) 9.

The odd-numbered exclusive OR logical circuits and the even-numbered exclusive OR logical circuits are configured to independently perform logical inversion control and logical non-inversion control on the quadrature-phase signal Q and the in-phase signal I from the front end 1.

For example, the frame processor 21, the frame synchronization circuit 22, and the signal reception identifier 23 may have the same structures as those shown in FIG. 4.

The table in FIG. 14B presents logical relation between the logical inversion control signal to be set in the registers of the logical inversion circuit 53, logical inversion of data, and logical non-inversion of data, being respectively represented as "register setting", "input data", and "output data".

As shown in the table in FIG. 14B, when the register setting is 1, the logical inversion control is performed.

FIG. 15 is a block diagram illustrating another example of the reception frame processing unit 9 (framer LSI) according to the present embodiment.

In FIG. 15, the same reference numbers are assigned to the same elements as those shown in FIG. 14A.

As illustrated in FIG. 15, the logical inversion circuit 53 includes logic inversion gates (NOT gate) for 16-channel parallel input data, switches SW1 through SW16, switch controllers (indicated as "SW cont." in FIG. 15) for odd-numbered ones and even-numbered ones of the switches SW1 through SW16. The exclusive OR logical circuits EOR01 through EOR16 and the registers constitute an integrated circuit as the reception frame processing unit (framer-LSI) 9. The odd-numbered switches and the even-numbered switches are configured to independently perform logical inversion control and logical non-inversion control on the quadrature-phase signal Q and the in-phase signal I from the front end 1.

FIG. 16 is a block diagram illustrating still another example of the reception frame processing unit 9 (framer LSI) according to the present embodiment.

In FIG. 16, the same reference numbers are assigned to the same elements as those shown in FIG. 14A and FIG. 15.

Similar to FIG. 4, in FIG. 16, 16-channel parallel signals each at 2.7 Gbps (indicated at 2.7 Gbps×16) from the deserializer (DES) 8 are input to the reception frame processing unit 9. The 16-channel parallel signals are input to the frame synchronization circuit 22a via exclusive OR logical circuits EOR01 through EOR16. The exclusive OR logical circuits EOR01 through EOR16 perform the logical inversion control so that the logical inversion control signal from the controller 10 is set in registers corresponding to the odd-numbered ones and even-numbered ones of the exclusive OR logical circuits EOR01 through EOR16, and the frame synchronization is established. Here, the odd-numbered exclusive OR logical circuits and the even-numbered exclusive OR logical circuits are configured to independently perform logical inversion control and logical non-inversion control on the quadrature-phase signal Q and the in-phase signal I from the front end 1.

As described above, the frame synchronization circuit 22a is configured to detect predetermined synchronization bits to perform frame synchronization detection, and supplies a frame synchronization detection signal to the frame processor 21a. For example, In the OTN (Optical Transport Network) signal, as recommended by ITU-T G.709, the Frame Alignment Signal (FAS) is defined in the overhead of an OTN frame and is used as frame synchronization bits. When OA1 ("11110110") and OA2 ("00101000") are received in a manner of OA1, OA1, OA1, OA2, OA2, OA2, it is decided that a frame synchronization state is attained, and a frame synchronization signal is sent to the frame processor 21a.

Because FAS corresponds to the synchronization bytes A1, A2 of the overheads of frames in SONET (Synchronous Optical Network), SDH (Synchronous Digital Hierarchy), in cases of SONET and SDH frames, the OTUk-FAS detection circuit 25 serves as a detection circuit for detecting the synchronization bytes A1, A2 in SONET signals or SDH signals.

The registers 26 retain 16 different combinations of OA1 and OA2 of FAS as shown in FIG. 5, corresponding to variations of the reception states of the in-phase signal I and the quadrature-phase signal Q. The OTUk-FAS detection circuit 25, serving as a frame synchronization detection circuit, reads in the 16 different combinations of FAS retained in the registers 26 sequentially, detects which combination of OA1 and OA2 corresponds to a successful frame synchronization detection, and notifies the controller 10 of the information of the detected combination of OA1 and OA2. As described above, the controller 10 controls the components thereof to attain the object reception state.

Eighth Embodiment

Figure 17:
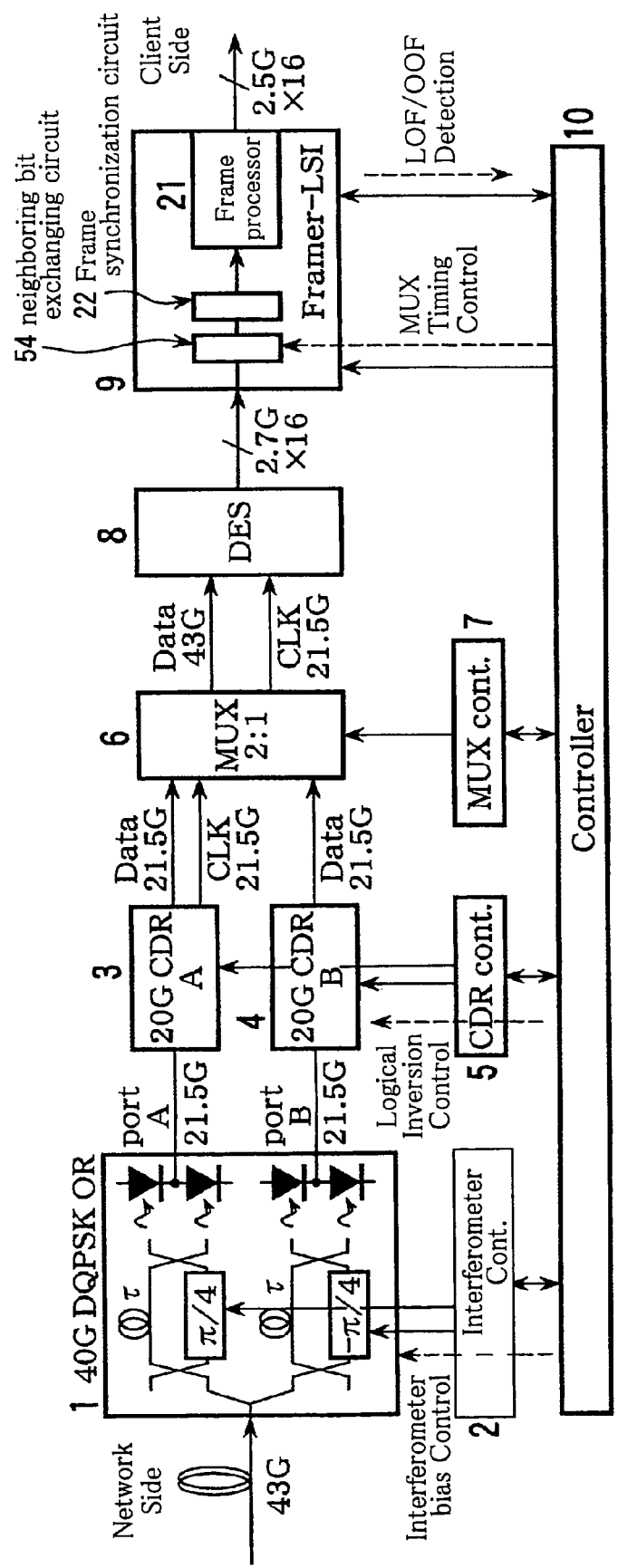
FIG. 17 is a block diagram illustrating a principal portion of an optical signal receiver according to an eighth embodiment of the present invention used in an optical communication system for transmitting the DQPSK optical signals.

FIG. 17 is a block diagram illustrating a principal portion of an optical signal receiver according to an eighth embodiment of the present invention used in an optical communication system for transmitting the DQPSK optical signals.

In the present embodiment, the same reference numbers are assigned to the same elements as those shown in FIG. 13.

The optical signal receiver in FIG. 17 further includes a neighboring bit exchanging circuit 54. The neighboring bit exchanging circuit 54, the frame synchronization circuit 22, and the frame processor 21 are integrated to be an integrated circuit, forming the reception frame processing unit (framer-LSI) 9.

The LOF/OOF detection signal (indicated by a dashed-line arrow from the reception frame processing unit 9 in FIG. 17) is input to the controller 10, and in order for the LOF/OOF detection signal to disappear, the controller 10 controls the neighboring bit exchanging circuit 54, as the MUX timing control indicated by a dashed-line arrow, to exchange neighboring bits in the 16 channel parallel data, and the controller 10 performs the logical inversion and non-inversion control in the clock and data recoveries 3, 4 through the clock and data recovery controller 5, as the logical inversion control indicated in FIG. 17 with a dashed-line arrow, and controls a bias voltage or the temperature of the delay interferometer in the front end 1 through the delay interferometer controller 2, as the interferometer bias control indicated in FIG. 17 with a dashed-line arrow.

Figure 18:
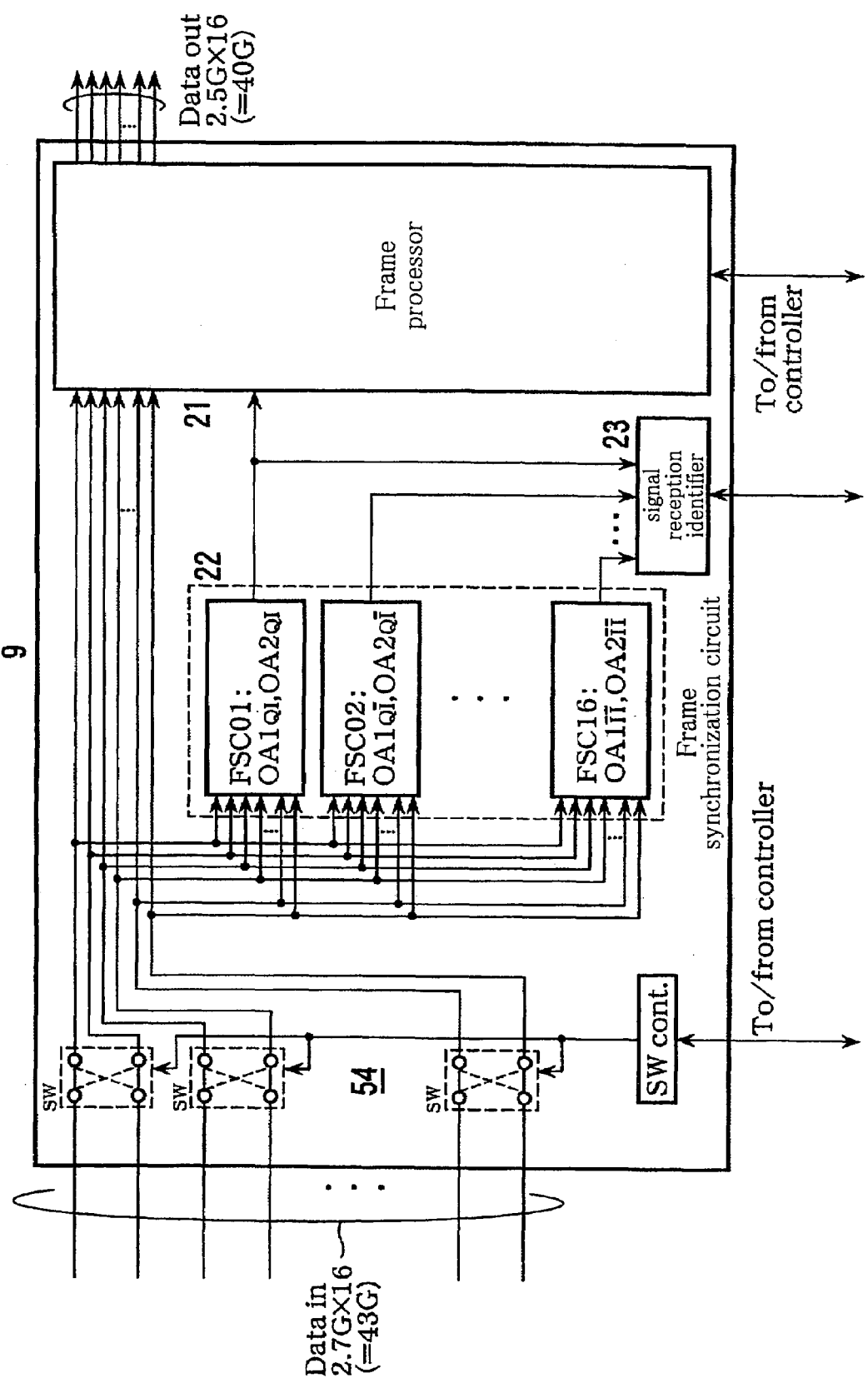
FIG. 18 is a block diagram illustrating an example of the reception frame processing unit 9 (framer LSI) according to the present embodiment.

FIG. 18 is a block diagram illustrating an example of the reception frame processing unit 9 (framer LSI) according to the present embodiment.

In FIG. 18, the same reference numbers are assigned to the same elements as those shown in FIG. 15.

As illustrated in FIG. 18, the neighboring bit exchanging circuit 54 includes switches SW for exchanging neighboring bits in the 16 channel parallel data (this is referred to as "bit-swap"), and a switch controller (indicated as "SW cont." in FIG. 18).

A timing control signal from the controller 10 is set in the switch controller to control the switching operations of the switches SW. Similar to the switching operations in the multiplexing sequence as described in FIG. 3, the in-phase signal I and the quadrature-phase signal Q in their object reception states can be input to the frame processor 21 and the frame synchronization circuit 22.

The switches SW and the switch controller can be formed by semiconductor elements, and they can be further integrated with the frame processor 21 and the frame synchronization circuit 22 to be an integrated circuit to serve as the reception frame processing unit (framer-LSI) 9.

Figure 19:
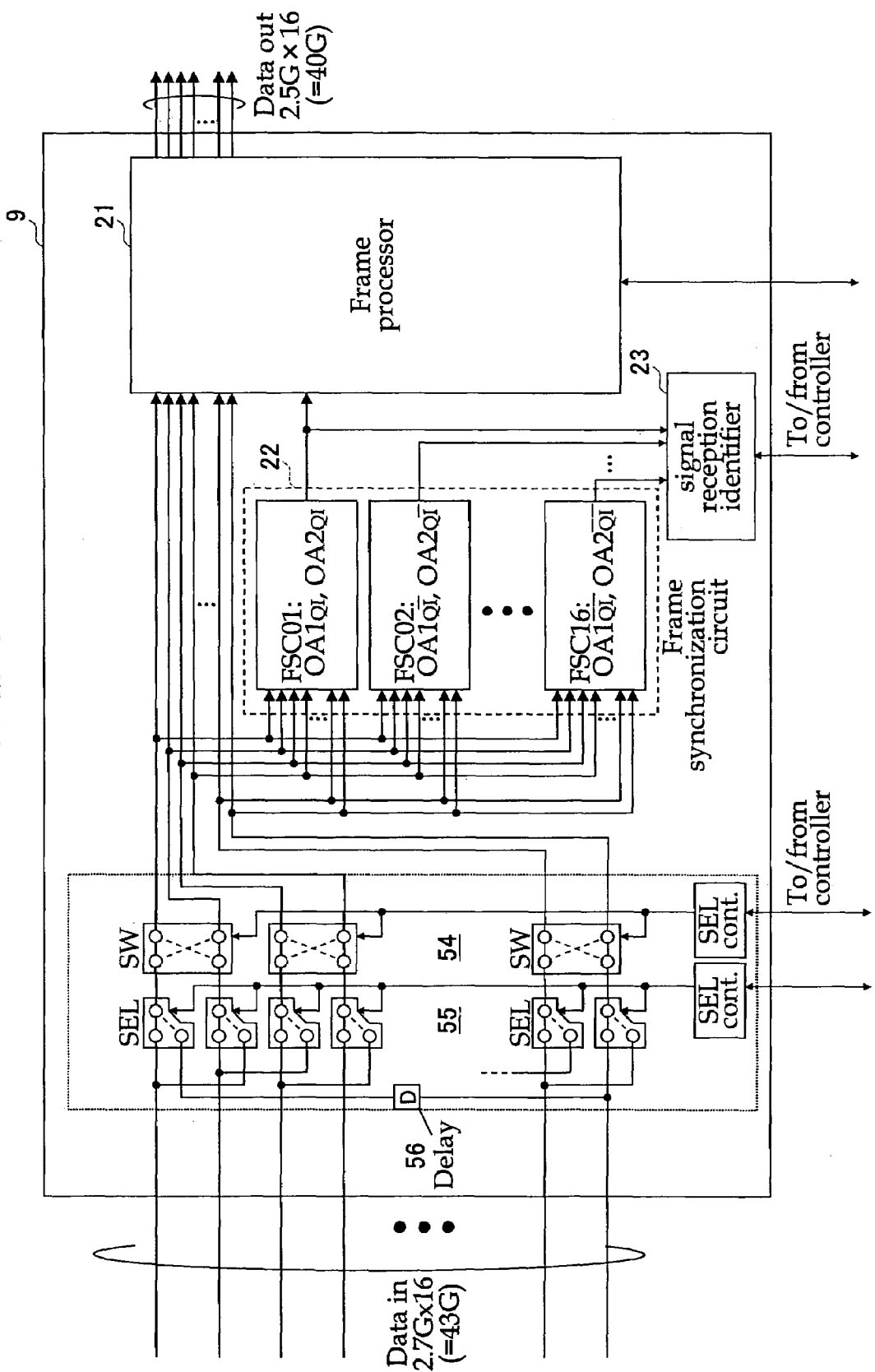
FIG. 19 is a block diagram illustrating another example of the reception frame processing unit 9 (framer LSI) according to the present embodiment having a function of one-bit shift.

FIG. 19 is a block diagram illustrating another example of the reception frame processing unit 9 (framer LSI) according to the present embodiment.

In FIG. 19, the same reference numbers are assigned to the same elements as those shown in FIG. 18, and overlapping descriptions are omitted appropriately.

As illustrated in FIG. 19, in addition to the components in the reception frame processing unit 9 (framer LSI) shown in FIG. 17 and FIG. 18, the reception frame processing unit 9 (framer LSI) shown in FIG. 19 further includes a one-bit shifter circuit 55, a controller of the one-bit shifter circuit 55, and a one-bit delay element 56. The controller of the one-bit shifter circuit 55 is indicated as "SEL cont." in FIG. 19, and the one-bit delay element 56 is indicated as "D" in FIG. 19.

The one-bit shifter circuit 55 and the controller thereof are arranged in front of the neighboring bit exchanging circuit 54 to shift the input data by one bit.

The one-bit shifter circuit 55 includes 16 optical selectors, which, indicated by "SEL" in FIG. 19, are connected to the 16 switches SW of the neighboring bit exchanging circuit 54.

Ninth Embodiment

Figure 20:
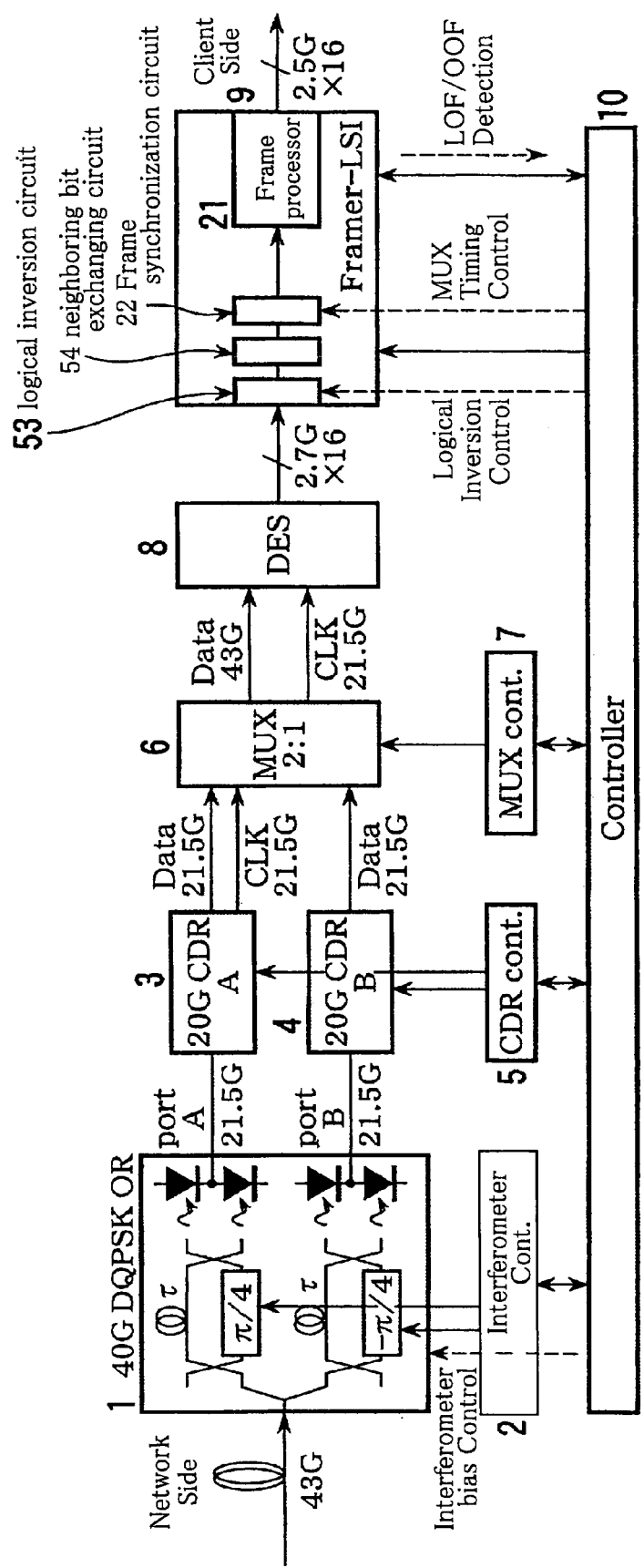
FIG. 20 is a block diagram illustrating a principal portion of an optical signal receiver according to a ninth embodiment of the present invention used in an optical communication system for transmitting the DQPSK optical signals.

FIG. 20 is a block diagram illustrating a principal portion of an optical signal receiver according to a ninth embodiment of the present invention used in an optical communication system for transmitting the DQPSK optical signals.

In the present embodiment, the same reference numbers are assigned to the same elements as those shown in FIG. 13 and FIG. 17.

The logical inversion circuit 53 and the neighboring bit exchanging circuit 54 are integrated with the frame processor 21 and the frame synchronization circuit 22 to be an integrated circuit serving as the reception frame processing unit (framer-LSI) 9.

The LOF/OOF detection signal (indicated by a dashed-line arrow from the reception frame processing unit 9 in FIG. 20) is input to the controller 10, and in order for the LOF/OOF detection signal to disappear, the controller 10 controls the neighboring bit exchanging circuit 54, as the MUX timing control indicated by a dashed-line arrow, controls the logical inversion circuit 53 to perform the logical inversion control as indicated in FIG. 20 with a dashed-line arrow, and controls a bias voltage or the temperature of the two delay interferometers in the front end 1 through the delay interferometer controller 2, as the interferometer bias control indicated in FIG. 20 with a dashed-line arrow.

Figure 21:
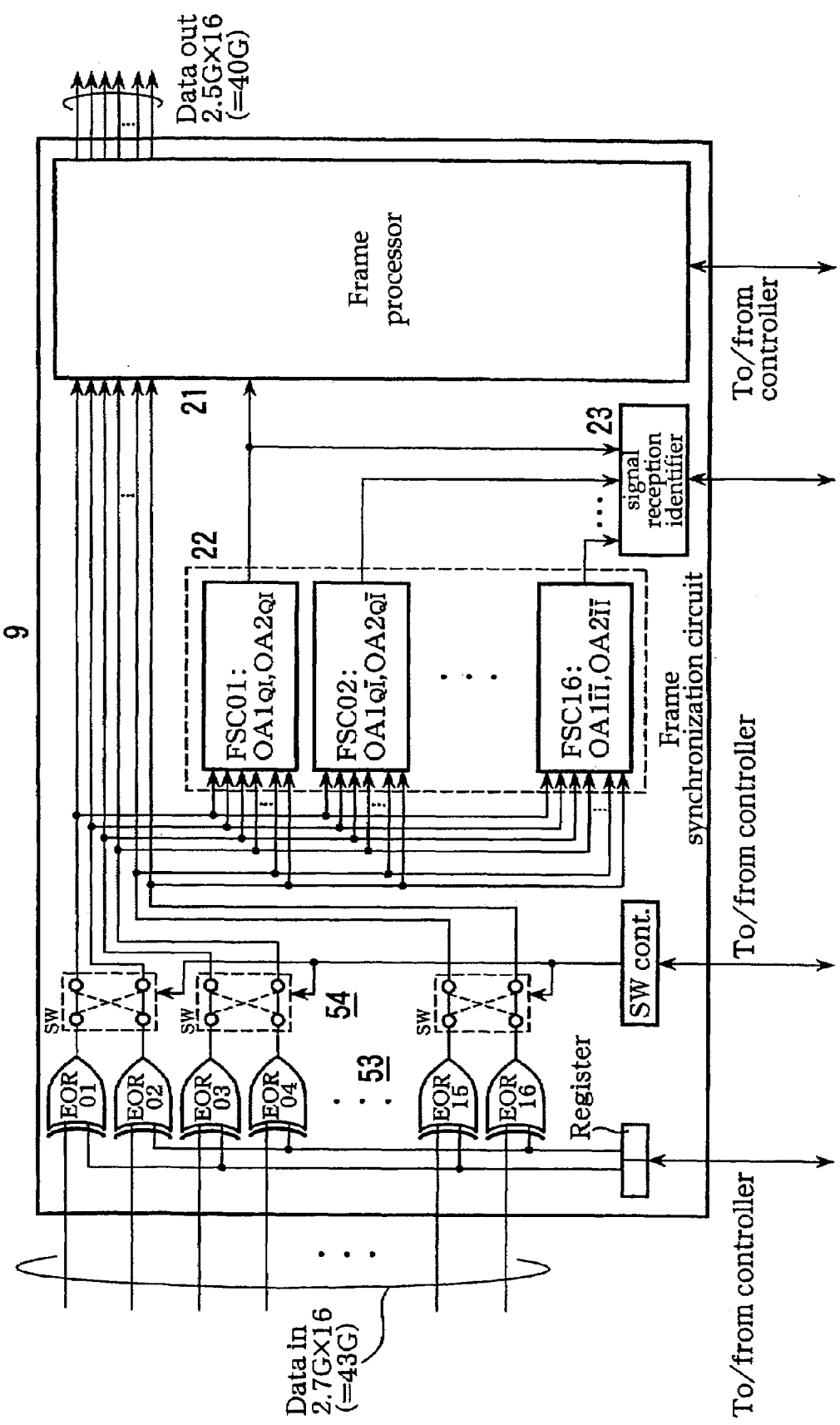
FIG. 21 is a block diagram illustrating still another example of the reception frame processing unit 9 (framer LSI) according to the ninth embodiment.

FIG. 21 is a block diagram illustrating still another example of the reception frame processing unit 9 (framer LSI) according to the present embodiment.

The frame processor 21, the frame synchronization circuit 22, the logical inversion circuit 53 and the neighboring bit exchanging circuit 54 are integrated to be a 16-channel parallel processing integrated circuit.

The logical inversion circuit 53 includes exclusive OR logical circuits EOR01 through EOR16 and registers. The neighboring bit exchanging circuit 54 includes switches SW and a switch controller (indicated as "SW cont." in FIG. 21).

Figure 22:
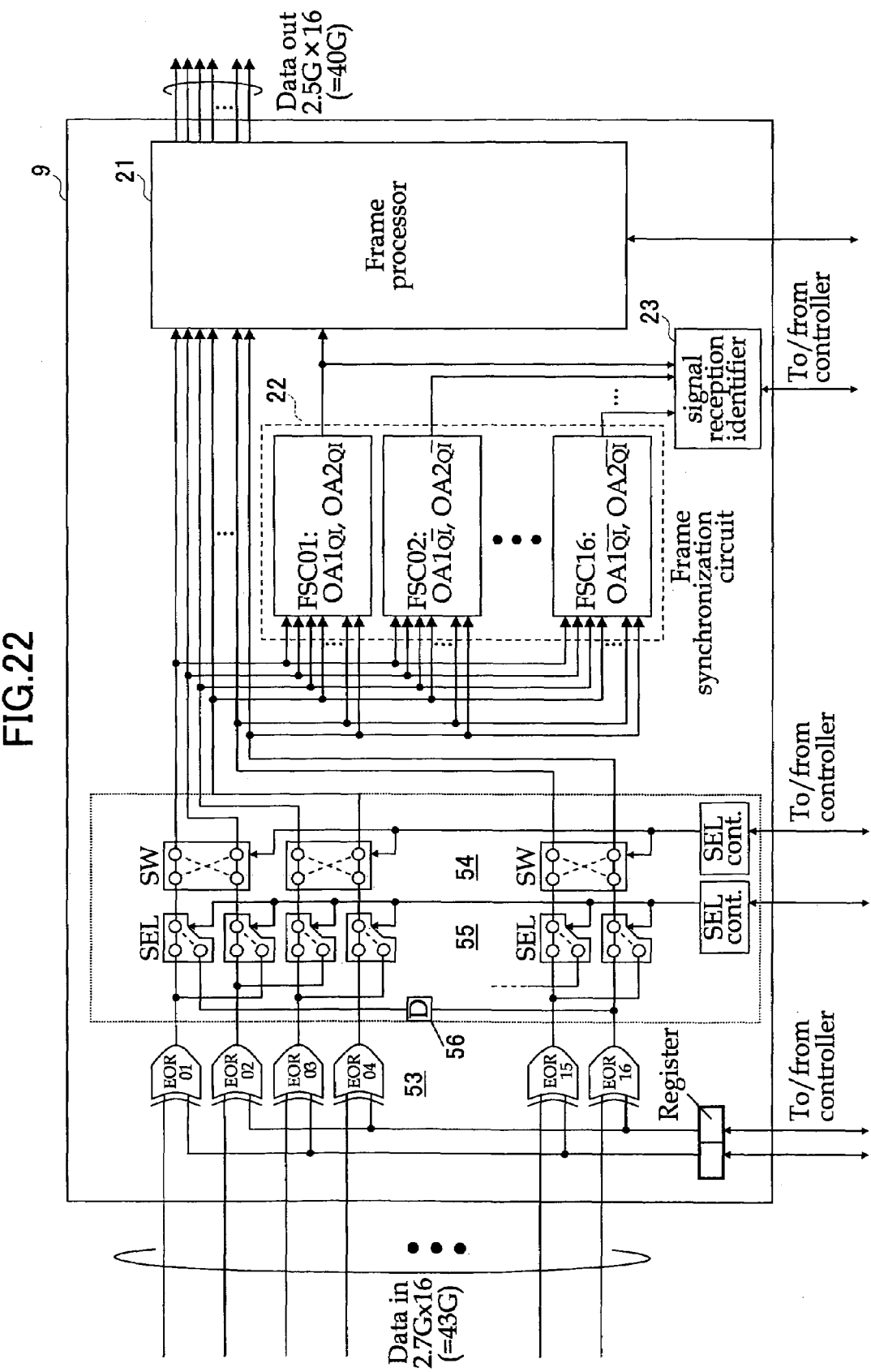
FIG. 22 is a block diagram illustrating another example of the reception frame processing unit 9 (framer LSI) according to the present embodiment having a function of one-bit shift.

FIG. 22 is a block diagram illustrating another example of the reception frame processing unit 9 (framer LSI) according to the present embodiment.

In FIG. 22, the same reference numbers are assigned to the same elements as those shown in FIG. 21, and overlapping descriptions are omitted appropriately.

As illustrated in FIG. 22, in addition to the components in the reception frame processing unit 9 (framer LSI) shown in FIG. 20 and FIG. 21, the reception frame processing unit 9 (framer LSI) shown in FIG. 22 further includes a one-bit shifter circuit 55, a controller of the one-bit shifter circuit 55, and a one-bit delay element 56. The controller of the one-bit shifter circuit 55 is indicated as "SEL cont." in FIG. 22, and the one-bit delay element 56 is indicated as "D" in FIG. 22.

The one-bit shifter circuit 55 and the controller thereof are arranged in front of the neighboring bit exchanging circuit 54 and behind the logical inversion circuit 53 to shift the data from the logical inversion circuit 53 by one bit.

The one-bit shifter circuit 55 includes 16 optical selectors, which, indicated by "SEL" in FIG. 22, are connected to the 16 exclusive OR logical circuits EOR01 through EOR16 of the logical inversion circuit 53 and the 16 switches SW of the neighboring bit exchanging circuit 54.

10th Embodiment

FIG. 23A is a block diagram illustrating a principal portion of an optical signal receiver according to a 10th embodiment of the present invention used in an optical communication system for transmitting DPSK (Differential Phase Shift Keying) optical signals.

FIG. 23B is a table illustrating a correspondence relation between DPSK signal reception states and FAS bytes.

The optical signal receiver illustrated in FIG. 23A includes a front end (DPSK OR) 201 that receives and demodulates DPSK optical signals, an interferometer controller 202, a clock and data recovery (43 G CDR) 203, a clock and data recovery controller (CDR cont.) 205, a de-serializer (DES) 208, a reception frame processing unit (framer-LSI) 209, a controller 210, a frame processor 221, a frame synchronization circuit 222, and a logical inversion circuit 225.

The table in FIG. 23B illustrates a correspondence relation between DPSK signal reception states and FAS (Frame Alignment Signal) bytes, and an object signal reception state is indicated by a double circle.

In the DQPSK modulation scheme, as described above, there are sixteen possible reception states, while in the DPSK modulation scheme, there are two possible reception states. For this reason, the logical inversion circuit 225 is provided to perform logic inversion and non-inversion operations, and the logical inversion circuit 225, the frame synchronization circuit 222, and the frame processor 221 are integrated to be an integrated circuit, serving as the reception frame processing unit (framer-LSI) 209.

Further, the logical inversion circuit 225, as a separate circuit, may be provided at an earlier stage of the reception frame processing unit (framer-LSI) 209, which is formed from the frame synchronization circuit 222 and the frame processor 221.

A DPSK modulation optical signal at a bit rate of 43 Gbps is input to the front end 201, and is converted into an electrical signal at a bit rate of 43 Gbps. The electrical signal is input to the clock and data recovery 203, and the clock and data recovery 203 outputs data at 43 Gbps (hence, abbreviated to be "Data 43 G") and a clock signal at 21.5 Gbps (abbreviated to be "CLK 21.5 G").

The data (Data 43 G and the clock signal (CLK 21.5 G) are input to the de-serializer (DES) 208. The de-serializer (DES) 208 converts the input signals to 16 parallel signals each at a bit rate of 2.7 Gbps (2.7 G×16), and outputs the 16-channel parallel signals to the reception frame processing unit 209.

By LOF/OOF detections, the reception frame processing unit 209 notifies the controller as indicated by a dashed line in FIG. 23A. In order for the LOF/OOF detection signal to disappear, the controller 210 controls components of the device. Specifically, the controller 210 controls to have logical inversion operations performed in the logical inversion circuit 225 of the reception frame processing unit 209 (this operation is indicated as "logical inversion control" in FIG. 23A with a dashed-line arrow) to obtain the object reception state.

In addition, the controller 210 controls a bias voltage or the temperature of the interferometers through the interferometer controller 202 (this operation is indicated as "interferometer bias control" in FIG. 23A with a dashed-line arrow).

Figures 24A, 24B:
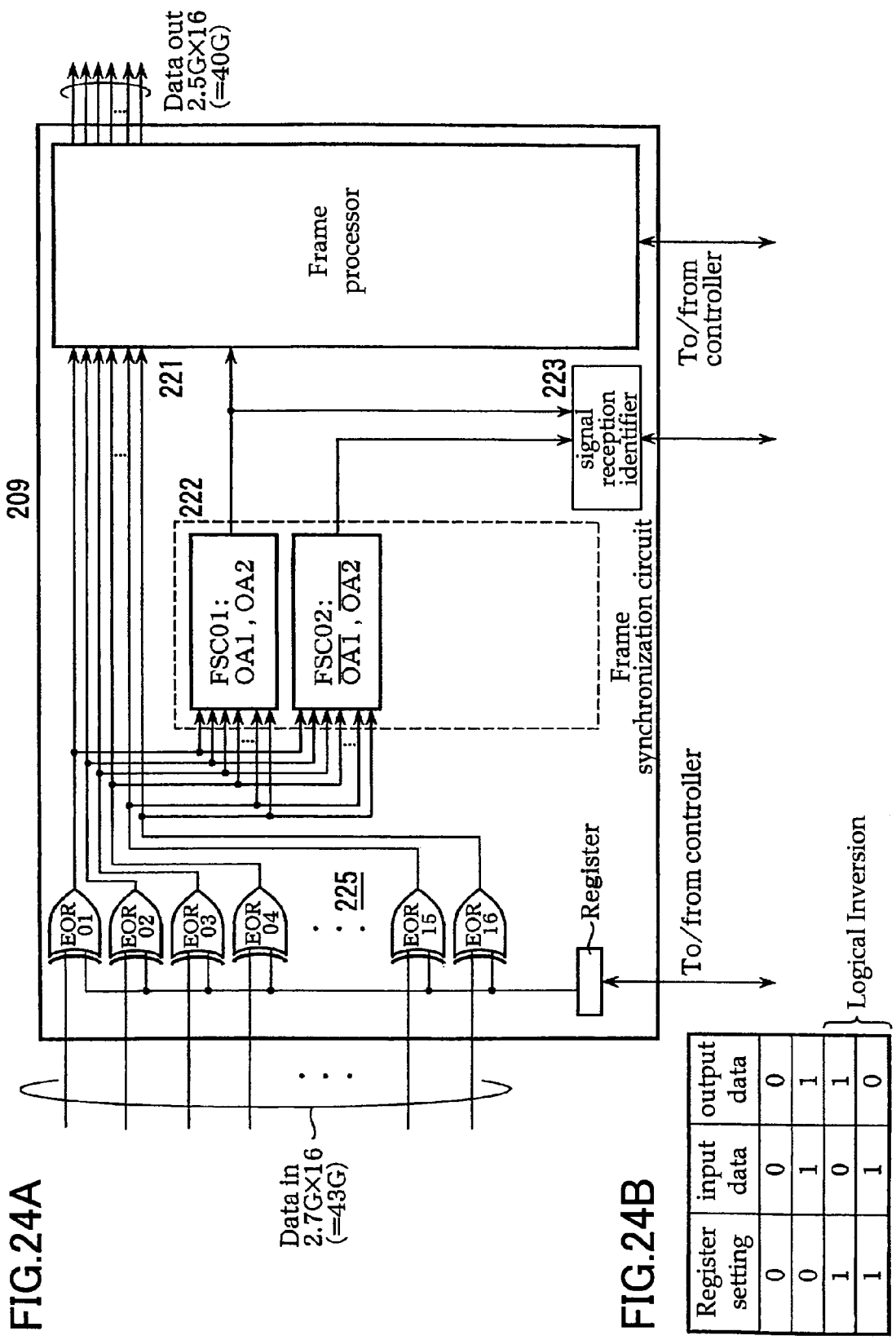
FIG. 24A is a block diagram illustrating an example of the reception frame processing unit 209 (framer LSI) according to the 10th embodiment.
FIG. 24B is a table illustrating settings of registers in the logical inversion circuit 53.

FIG. 24A is a block diagram illustrating an example of the reception frame processing unit 209 (framer LSI) according to the present embodiment.

FIG. 24B is a table illustrating settings of registers in the logical inversion circuit 53.

In FIG. 24A, the same reference numbers are assigned to the same elements as those shown in FIG. 23A.

As illustrated in FIG. 24A, the reception frame processing unit 209 is an integrated circuit including the frame processor 221, the frame synchronization circuit 222, a signal reception state identifier 223, and the logical inversion circuit 225. The logical inversion circuit 225 includes exclusive OR logical circuits EOR01 through EOR16, and a register.

The reception frame processing unit 209 has the same structure as the reception frame processing unit 9 illustrated in FIG. 14A, however, in the reception frame processing unit 209, the register is shared by the exclusive OR logical circuits EOR01 through EOR16, which are arranged in a manner of 16-channel parallel processing.

The table in FIG. 24B presents a logic relation between the settings in the registers from the controller 210 and the input data and output data. As shown in the table in FIG. 24B, when the register setting is 1, the logical inversion control is performed.

Figure 25:
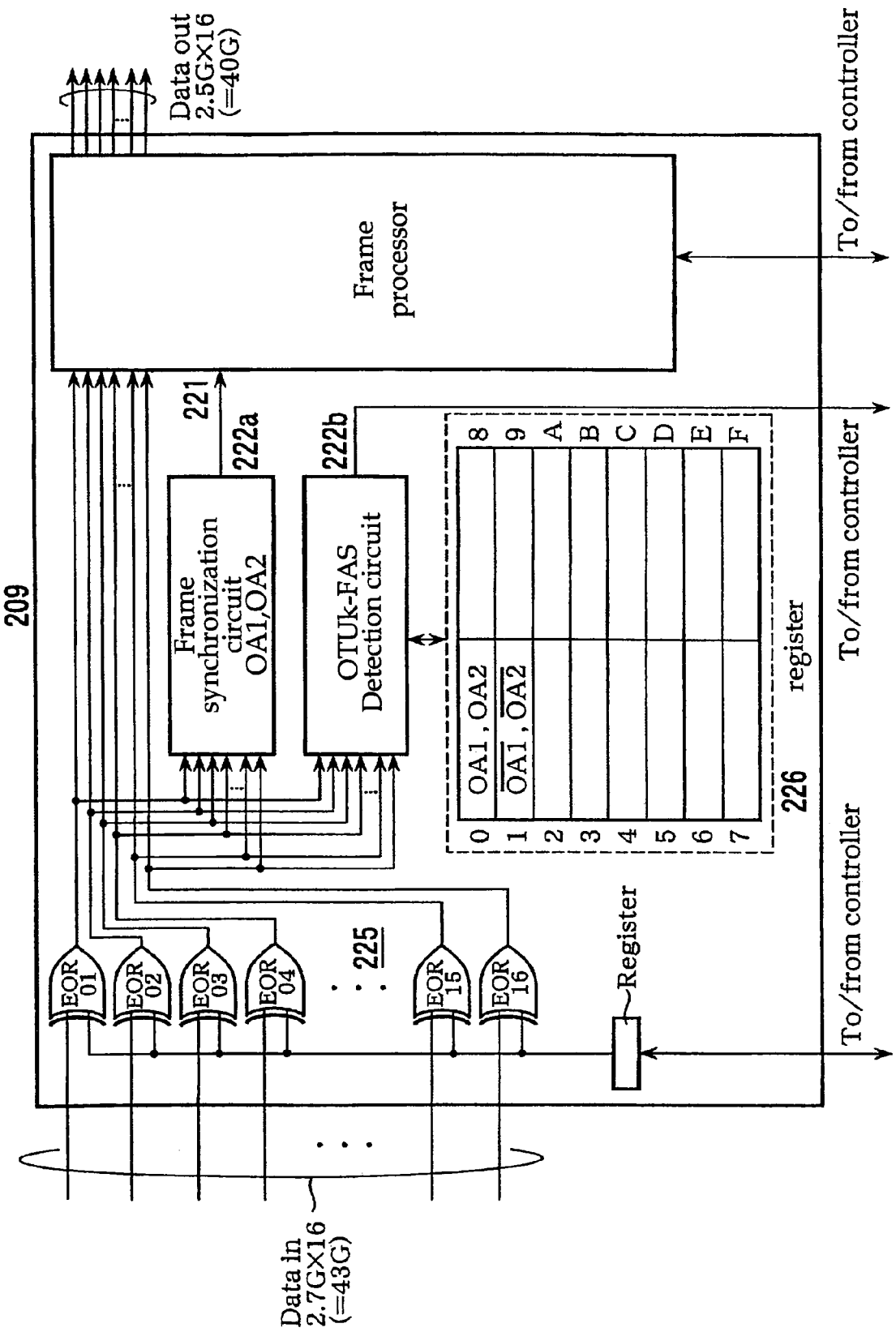
FIG. 25 is a block diagram illustrating still another example of the reception frame processing unit 209 according to the 10th embodiment.

FIG. 25 is a block diagram illustrating still another example of the reception frame processing unit 209 according to the present embodiment.

In FIG. 25, the reception frame processing unit 209 is an integrated circuit including the frame processor 221, the frame synchronization circuit 222*a*, an OTUk-FAS detection circuit 222*b*, and the logical inversion circuit 225.

The 16-channel parallel signals each at 2.7 Gbps (indicated at 2.7 Gbps×16) from the de-serializer (DES) 208 in FIG. 23A are input to the reception frame processing unit 209.

The frame synchronization circuit 222*a* detects predetermined synchronization bits to perform frame synchronization detection, and supplies a frame synchronization detection signal to the frame processor 221.

In the OTN (Optical Transport Network) signal, as recommended by ITU-T G.709, Frame Alignment Signal (FAS) is defined in the overhead of an OTN frame and is used as frame synchronization bits. When OA1 ("11110110") and OA2 ("00101000") are received in a manner of OA1, OA1, OA1, OA2, OA2, OA2, it is decided that a frame synchronization state is attained, and a frame synchronization signal is sent to the frame processor 221.

Because FAS corresponds to the synchronization bytes A1, A2 of the overheads of frames in SONET (Synchronous Optical Network), SDH (Synchronous Digital Hierarchy), in cases of SONET, SDH frames, the OTUk-FAS detection circuit 22*b* serves as a detection circuit for detecting the synchronization bytes A1, A2 in SONET signals or SDH signals.

The registers 226 retain two different combinations of OA1 and OA2 of FAS which varies depending on the reception states of the DPSK modulation signal.

Meanwhile, referring to FIG. 6, because the DPQSK modulation scheme is employed, the registers 26 retain 16 different combinations of OA1 and OA2 of FAS, and the registers 26 can be rewritten without any limitations.

The OTUk-FAS detection circuit 222b, serving as a frame synchronization detection circuit, reads in the two different combinations of FAS retained in the registers 226 sequentially, detects which combination of OA1 and OA2 corresponds to a successful frame synchronization detection, and notifies the controller 210 of the information of the detected combination of OA1 and OA2. As described above, the controller 210 controls the components to attain the object reception state.

As shown in FIG. 24A, the logical inversion circuit 225 includes exclusive OR logical circuits EOR01 through EOR16 and a register, and the controller 210 sets logic inversion and logic non-inversion information in the register.

11th Embodiment

Figure 26:
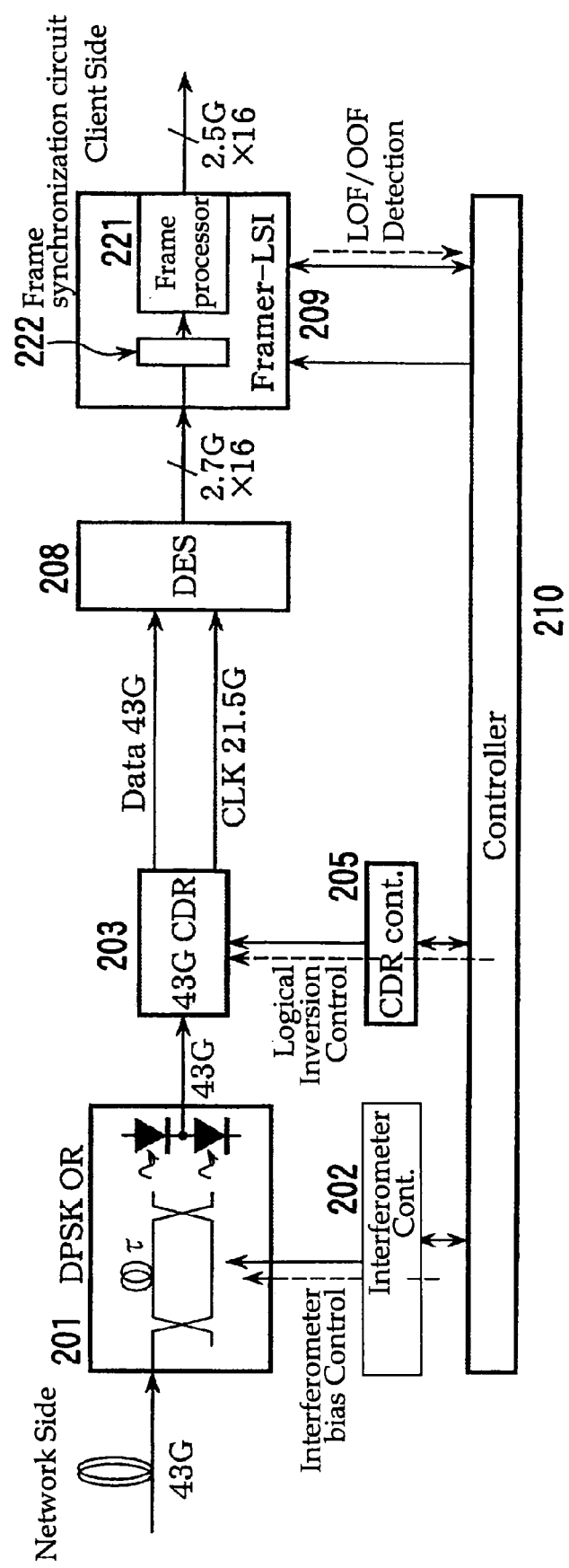
FIG. 26 is a block diagram illustrating a principal portion of an optical signal receiver according to an 11th embodiment of the present invention used in an optical communication system for transmitting DPSK (Differential Phase Shift Keying) optical signals.

FIG. 26 is a block diagram illustrating a principal portion of an optical signal receiver according to an 11th embodiment of the present invention used in an optical communication system for transmitting DPSK (Differential Phase Shift Keying) optical signals.

In FIG. 26, the same reference numbers are assigned to the same elements as those shown in FIG. 23.

In FIG. 26, the function of the logical inversion circuit 225 in the reception frame processing unit (framer-LSI) 209 shown in FIG. 23A is provided in the clock and data recovery (43 G CDR) 203.

The LOF/OOF detection signal (indicated by a dashed-line arrow from the reception frame processing unit 209 in FIG. 26) is input to the controller 210. In order for the LOF/OOF detection signal to disappear, the controller 210 inputs the logical inversion control signal (indicated as a dashed-line arrow) to the clock and data recovery (43 G CDR) 203 through the clock and data recovery controller (CDR cont.) 205 to perform logical inversion operations to obtain the object reception state.

In addition, the controller 210 inputs a interferometer bias control signal to the front end (DPSK OR) 201 through the interferometer controller 202 to control the bias voltage or the temperature of the interferometer of the front end (DPSK OR) 201.

12th Embodiment

Figure 27:
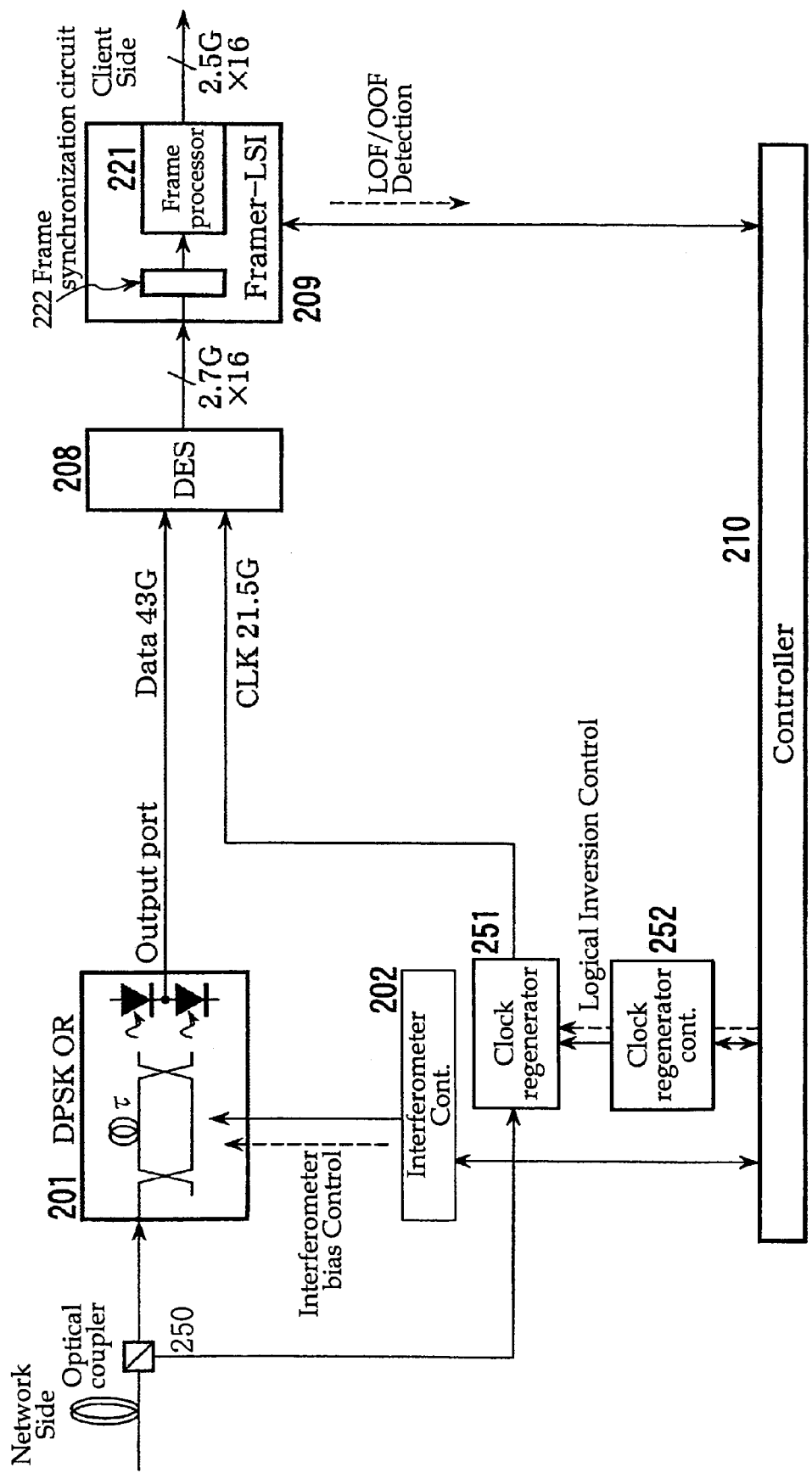
FIG. 27 is a block diagram illustrating a principal portion of an optical signal receiver according to a 12th embodiment of the present invention used in an optical communication system for transmitting DPSK (Differential Phase Shift Keying) optical signals.

FIG. 27 is a block diagram illustrating a principal portion of an optical signal receiver according to a 12th embodiment of the present invention used in an optical communication system for transmitting DPSK (Differential Phase Shift Keying) optical signals.

In FIG. 27, the same reference numbers are assigned to the same elements as those shown in FIG. 26.

In FIG. 27, the optical signal receiver in includes an optical coupler 250, a clock recovery 251, and a clock recovery controller 252.

The clock recovery 251 and the clock regeneration controller 252 have the same structures and the same functions as those of the clock recovery 51 and the clock recovery controller 52 in FIG. 12. When a phase-modulated optical signal is intensity-modulated by an intensity modulator in accordance with a clock signal to transmit an IM-DQPSK optical signal, the received modulated optical signal is split by the optical coupler 250, and the split signals are input to the front end 201 (40 G DPSK OR) and the clock recovery 251, respectively. The clock recovery 251 regenerates the clock signal CLK from the intensity-modulated received optical signal including a clock signal component, and the regenerated clock signal CLK is input to the de-serializer (DES) 208.

The front end 201, the de-serializer (DES) 208, and the reception frame processing unit (framer-LSI) 209 have the same structures and operate in the same way as those described in the previous embodiments.

The LOF/OOF detection signal (indicated by a dashed-line arrow from the reception frame processing unit 209 in FIG. 27) is input to the controller 210. In order for the LOF/OOF detection signal to disappear, the controller 210 inputs the logical inversion control signal (indicated as a dashed-line arrow) to the clock recovery 251 through the clock recovery controller 252 to performs logical inversion operations to obtain the object reception state.

In addition, the controller 210 inputs a interferometer bias control signal to the front end (DPSK OR) 201 through the interferometer controller 202 to control the bias voltage or the temperature of the interferometer of the front end (DPSK OR) 201 to obtain the object reception state.

13th Embodiment

Figure 28:
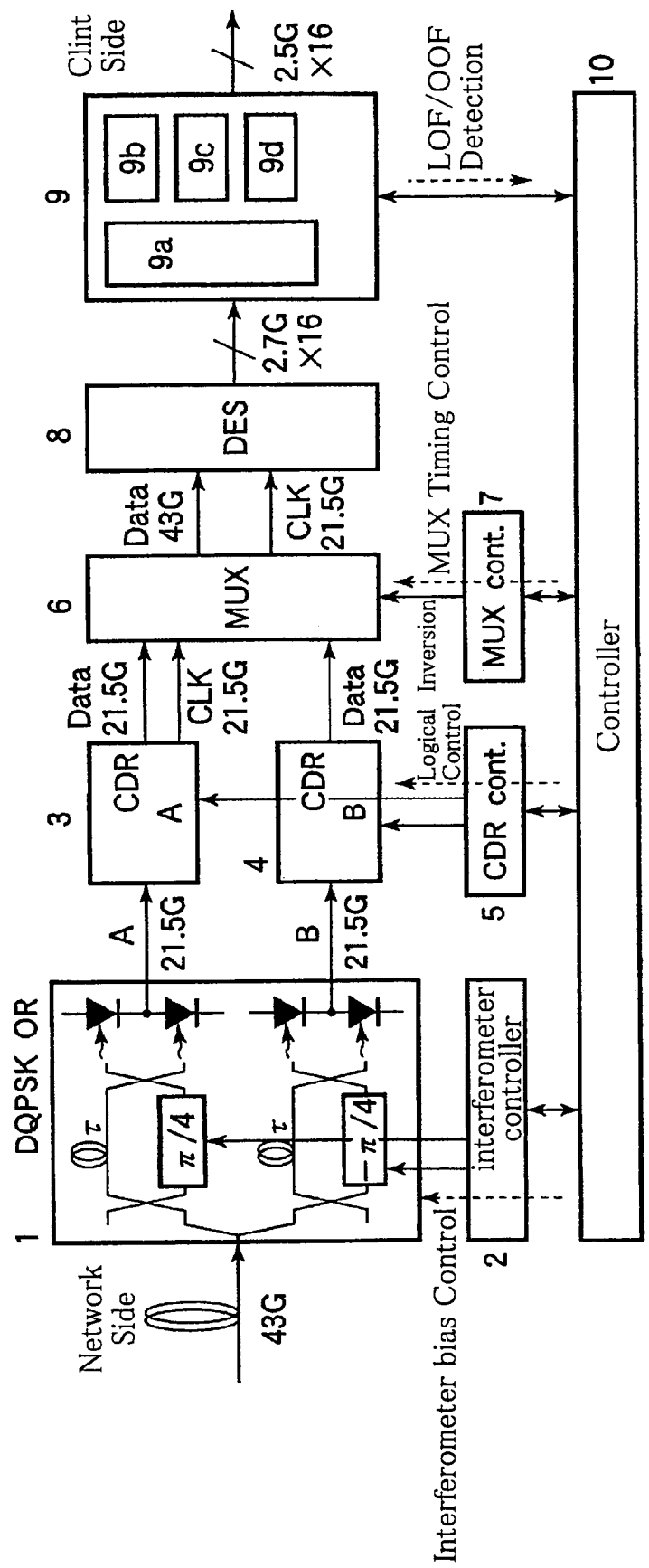
FIG. 28 is a block diagram illustrating a principal portion of an optical signal receiver according to a 13th embodiment of the present invention, used in an optical communication system for transmitting DQPSK optical signals.

FIG. 28 is a block diagram illustrating a principal portion of an optical signal receiver according to a 13th embodiment of the present invention, used in an optical communication system for transmitting DQPSK optical signals.

In FIG. 28, the same reference numbers are assigned to the same elements as those shown previously.

The optical signal receiver illustrated in FIG. 28 includes a reception demodulation unit 1 which has plural delay interferometers and plural opto-electric conversion elements for receiving DQPSK optical signals and converting each DQPSK optical signal into an in-phase electrical signal and a quadrature-phase electrical signal, a multiplexer 6 which multiplexes the in-phase signal and the quadrature-phase signal, a de-serializing unit (DES) 8 which converts the multiplexed signals from the multiplexer 6 into parallel signals, and a reception processing unit 9 which receives the parallel signals from the de-serializing unit 8, and performs frame processing including frame synchronization processing. The reception processing unit 9 includes a frame synchronization circuit 9c for establishing frame synchronization, a reception state identification circuit 9d for identifying reception states based on the parallel signals, and a logic processing circuit 9a which performs logic inversion, bit delay, and bit swap corresponding to the reception states other than an object reception state identified by the reception state identification circuit 9d, and corresponding to a reception state related to a de-serializing timing in the de-serializing unit 8.

In addition, the method of controlling optical signal reception according to the present embodiment includes steps of receiving DQPSK optical signals and converting each of the DQPSK optical signal into an in-phase signal and a quadrature-phase signal by the reception demodulation unit 1, multiplexing the in-phase signal and the quadrature-phase signal by the multiplexer 6 and transmitting the resulting signals to the de-serializing unit 8, converting the multiplexed signals into parallel signals by the de-serializing unit 8 and transmitting the parallel signals to the reception processing unit 9, and the reception processing unit 9 compares the parallel signals to a comparison pattern to identify a reception state, and performs at least one of logic inversion, one-bit delay, and bit swap corresponding to reception states other than the object reception state, and corresponding to a reception state related to the de-serializing timing in the de-serializing unit 8. The above steps are repeated until the frame synchronization is attained.

Specifically, as shown in FIG. 28, the optical signal receiver includes the reception demodulation unit (indicated as "DQPSK OR") 1 which receives the DQPSK optical signals and demodulates the DQPSK optical signals, an interferometer controller 2, clock and data recoveries 3 and 4 (indicated as "CDR A, CDR B"), a clock regeneration controller 5 (indicated as "CDR cont."), the multiplexer 6, which is a 2:1 multiplexer, a multiplexing controller 7 (indicated as "MUX cont."), the de-serializing unit (DES: De-Serializer) 8, the reception processing unit 9, the logic processing circuit 9a, a frame processing unit 9b, the frame synchronization circuit 9c, the reception state identification circuit 9d, and a controller 10.

It should be noted that although the DQPSK signal at 40 Gbps is used as an example in the present embodiment, it is certain that the present embodiment is applicable to DQPSK signals at other transmission rates.

The reception processing unit 9 includes the logic processing circuit 9a, the frame processing unit 9b, the frame synchronization circuit 9c, and the reception state identification circuit 9d, and is able to detect LOF (Loss of Frame or OOF (Out of Frame). The detected results of LOF/OOF are transmitted to the controller 10 along dashed-line arrow in FIG. 28.

In FIG. 28, it is illustrated that the reception processing unit 9 processes 16-channel parallel data; certainly, the number of channels of the parallel data can be reduced to increase operating speed of the circuit. On the other hand, the number of channels of the parallel data can also be increased along with an increase of capacity of the transmission line.

Until the LOF/OOF detection information (indicated by the dashed-line arrow from the reception frame processing unit 9 in FIG. 28) disappears, the controller 10 controls a bias voltage or the temperature of the delay interferometers through the delay interferometer controller 2 (this operation is indicated as "interferometer bias control" in FIG. 28 with a dashed-line arrow), performs logical inversion operations on data signals through the clock and data recovery controller 5 (this operation is indicated as "logical inversion control" in FIG. 28 with a dashed-line arrow), or controls the multiplexing sequence with a multiplexing ratio of 2:1 through the multiplexer controller 7 (this operation is indicated as "MUX timing control" in FIG. 1A with a dashed-line arrow).

Specifically, (a) the clock and data recovery controller 5 controls the logical inversion operations in the clock and data recoveries 3 and 4, (b) the multiplexer controller 7 controls multiplexing timings of the multiplexer 6, and (c) the delay interferometer controller 2 controls the bias voltage or the temperature so as to adjust a π/4 delay interferometer and a −π/4 delay interferometer of the DQPSK reception demodulation unit 1 to operate at optimum operation points. In addition, phase control is performed to shift the phase by +π/2±nπ or −π/2±nπ (n is an integer). Here, the delay interferometer controller 2 can perform the above controls by employing any well-known method.

The above control operations (a), (b), and (c) are repeated until the LOF/OOF detection information from the reception processing unit 9 disappears.

Refer to the table in FIG. 33A, which illustrates reception states of the DQPSK signals, considering the quadrature-phase signal Qk and the in-phase signal Ik from a channel A (Ach) and a channel B (Bch) of the reception demodulation unit 1, for example, a double circle indicates an object DQPSK signal reception state, single circles indicate states able to be received after logical inversion, triangles indicate states able to be received after a combination of bit swap and the logical inversion, diamonds indicate states able to be received after bit swap, and crosses indicates states that cannot be received directly. The reception state identification circuit 9d of the reception processing unit 9 identifies these reception states, and when the object reception state indicated by the double circle is identified, the frame synchronization circuit 9c of the reception processing unit 9 is able to perform frame synchronization pull-in. In this case, the controller 10 does not control components of the optical signal receiver.

When the reception states indicated by single circles in the table in FIG. 33A is identified, since the phase of the signal from the A channel or the phase of the signal from the B channel is inverted, in these the reception states, the frame synchronization circuit 9c of the reception processing unit 9 is able to perform frame synchronization pull-in. Hence, the controller 10 controls the clock and data recoveries 3 and 4 through the clock regeneration controller 5 to carry out logical inversion to return to the phase relation of the object reception state.

When the reception states indicated by triangles are identified, since these reception states are in a logical inversion state and in a bit swap state, it is possible to obtain the phase relation of the object reception state by performing both logical inversion control and bit swap.

When the reception states indicated by diamonds are identified, since these reception states are in a bit swap state, it is possible to obtain the phase relation of the object reception state by performing bit swap.

Next, when the reception states indicated by crosses are identified, frame synchronization pull-in cannot be performed at all. However, by repeating the above-mentioned control operations (a), (b), and (c), the controller 10, through the interferometer controller 2, can adjust the delay interferometers to operate at optimum operating points, and the controller 10 can control components of the optical signal receiver to obtain the object reception state. By these controls, the object reception state can be obtained, and the reception and demodulation of the DQPSK signals can be performed.

In the reception states indicated by crosses, at least control of the delay interferometer of the reception demodulation unit 1 is performed. When the π/4 delay interferometer and the −π/4 delay interferometer are operated such that the phase difference between the π/4 delay interferometer and the −π/4 delay interferometer is maintained to be π/2, the reception state cannot be the reception states indicated by crosses, thus, control during operations is easy.

Logic inversion in reception states other than the object reception state indicated by the double circle may be carried out by controlling the clock and data recoveries 3 and 4, but it can also be carried out in the logic processing circuit 9a of the reception processing unit 9. In addition, the logic processing circuit 9a can be configured to carry out bit swap and one-bit delay.

Figure 29:
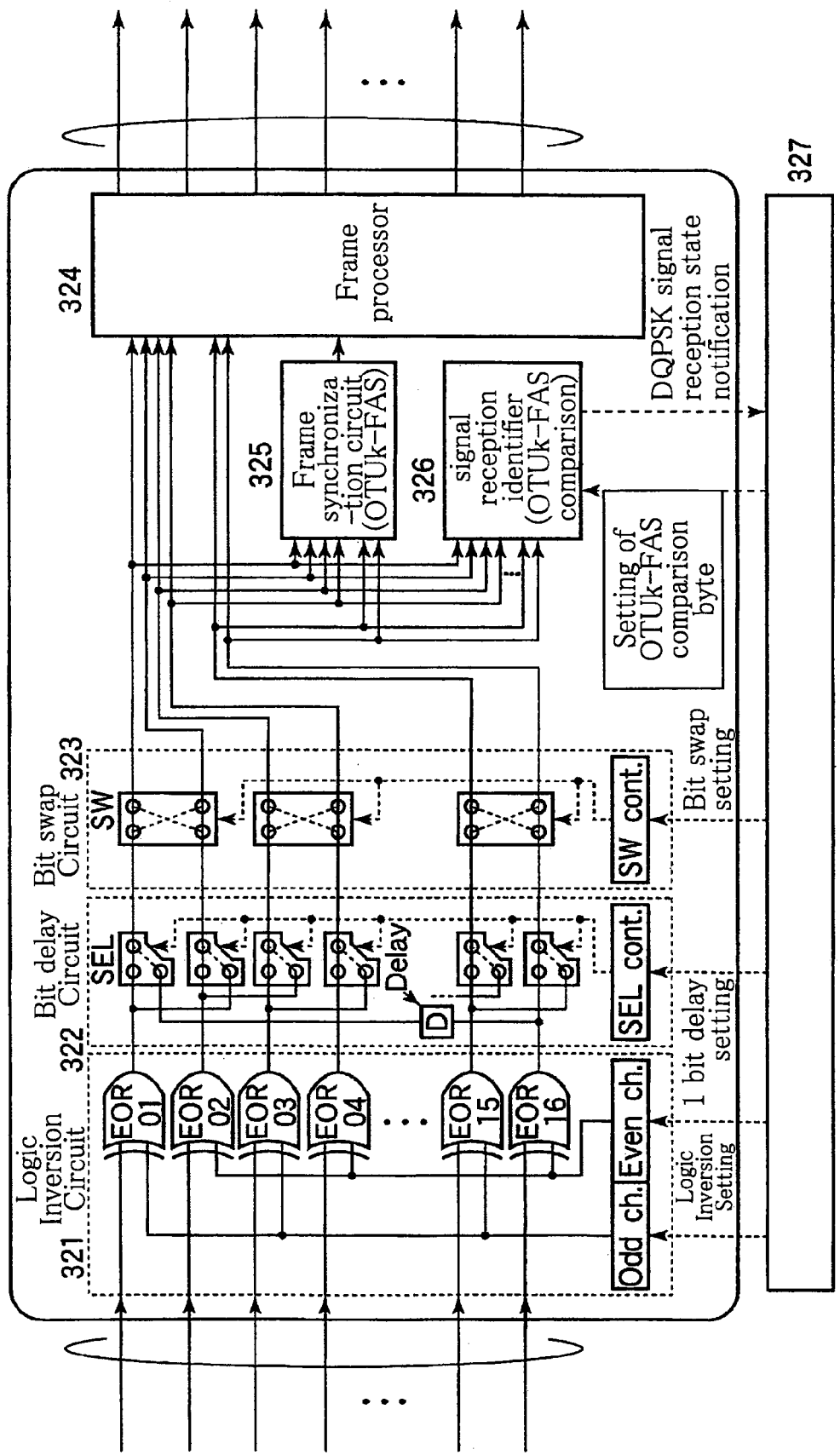
FIG. 29 is a block diagram illustrating a principal portion of the reception processing unit 9 according to the present embodiment.

FIG. 29 is a block diagram illustrating a principal portion of the reception processing unit 9 according to the present embodiment.

In FIG. 29, the same reference numbers are assigned to the same elements as those shown previously.

As illustrated in FIG. 29, the reception processing unit 9 includes a logical inversion circuit 321, a one-bit delay circuit 322, a bit swap circuit 323, a frame processor 324, a frame synchronization circuit 325, a DQPSK signal reception state identification circuit 326, and a controller 327.

The logical inversion circuit 321 includes exclusive OR logical circuits EOR01 through EOR16, a register "odd ch." for setting an odd number channel, and a register "Even ch." for setting an even number channel. The one-bit delay circuit 322 includes selectors SEL, a selector controller "SEL cont.", a delay circuit "D" "delay" for delaying one bit. The bit swap circuit 323 includes switching circuits SW, and a switching controller "SW cont.".

The logical inversion circuit 321, the one-bit delay circuit 322, and the bit swap circuit 323 correspond to the logic processing circuit 9a as shown in FIG. 28, and the de-serializing unit 8 outputs demodulated signals, which include 16 parallel in-phase signals and quadrature-phase signals (indicated by "2.7 G×16"), to the reception processing unit 9, and these signals are input to the frame processor 324, the frame synchronization circuit 325, and the DQPSK signal reception state identification circuit 326 through the logical inversion circuit 321, the one-bit delay circuit 322, and the bit swap circuit 323.

In the frame synchronization circuit 325, for example, in OTN (Optical Transport Network) systems, as recommended by ITU-T G.709, Frame Alignment Signal (FAS) bytes are defined as the frame synchronization bits in an overhead section of an OTU signal, and when the Frame Alignment Signal is received to be in a manner of OA1, OA1, OA1, OA2, OA2, OA2 (here, OA1 represents "11110110", and OA2 represents "00101000"), it is decided that a frame synchronization state is attained.

Because FAS corresponds to the synchronization bytes A1, A2 of the overhead of a frame in SONET (Synchronous Optical Network) signals or SDH (Synchronous Digital Hierarchy) signals, in the case of SONET signals or SDH signals, the frame synchronization circuit 325 based on OTUk-FAS detection serves as a detection circuit for detecting the synchronization bytes A1, A2 in SONET signals or SDH signals.

The DQPSK signal reception state identification circuit 326 receives the 16 parallel signals input to the frame synchronization circuit 325, and identifies the reception state according to the setting of the OTUk-FAS comparison byte from the controller 327. Alternatively, when the frame synchronization circuit 325 is configured to detect frame synchronization by parallel processing in 16 channels, it is possible to identify the reception state based on the detection results of the 16 channels, respectively. The DQPSK signal reception state identification circuit 326 notifies the controller 327 of identified information of the signal reception state. The controller 327 may be provided in the controller 10 as shown in FIG. 28 to control the components of the optical signal receiver based on the information of the signal reception state.

The controller 327 performs setting of logic inversion, one-bit delay, and bit swap according to notification of reception states from the DQPSK signal reception state identification circuit 326. For example, if logic "1" is set in the odd channel setting unit "odd ch.", logic inversion is allowed by the odd-numbered exclusive OR logical circuits. When one-bit delay is performed, the selector SEL is controlled by the selector controller "SEL cont." of the one-bit delay circuit 322, and after the signal serial sequence prior to conversion to 16 parallel signals is delayed by one bit, the signal serial sequence is converted into 16 parallel signals. Thus, the output signals of the exclusive OR logical circuits EOR01 through EOR16 become output signals EOR02 through EOR16, and EOR01, and are input to the bit swap circuit 323. At this moment, by the one-bit circuit D, the output signal of the exclusive OR logical circuit EOR16 is delayed by one bit, and is output to the output of the exclusive OR logical circuit EOR1.

The bit swap circuit 323 exchanges neighboring bits of the 16 parallel data. The bit swap circuit 323 performs controls equivalent to that controlling bit arrangement order by controlling multiplexing timing of the multiplexer 6 in FIG. 28, therefore, in a structure having the bit swap circuit 323, the multiplexing timing controller as shown in FIG. 28 can be omitted.

FIG. 30 is a table illustrating the reception states and control operations as described with reference to FIG. 28 and FIG. 29.

Figure 41:
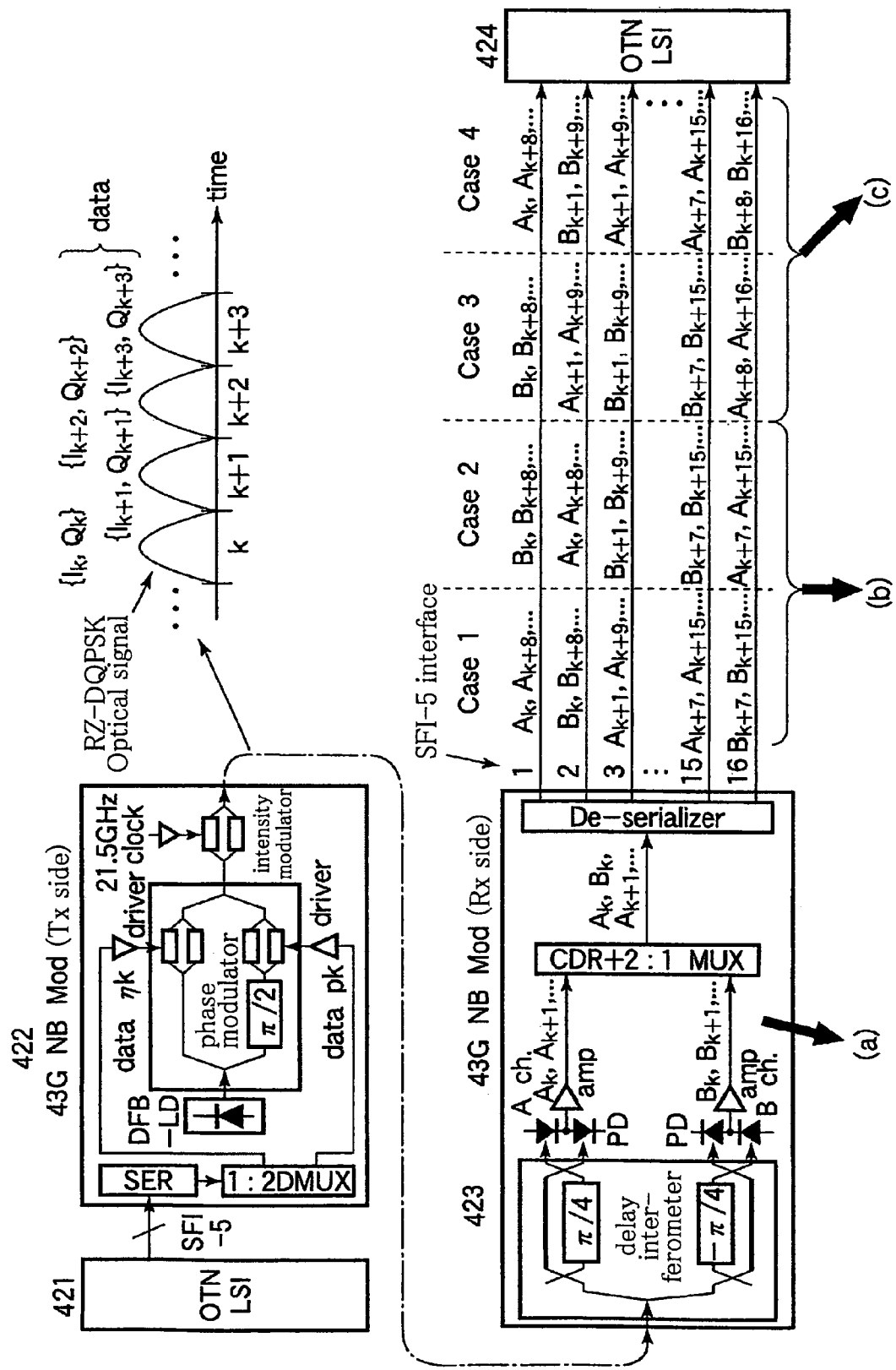

In FIG. 30, "BS" stands for bit swap control, "1D" stands for one bit delay control, MZI stands for interferometer control, and a check indicates the corresponding control is conducted. The 16-bit pattern, which is obtained by conversion to 16 channels in the de-serializing unit 8 and is input to the reception processing unit 9, is referred to as "DQPSK comparison pattern", and there are 16 patterns numbered from 1 to 16. For example, with the No. 13 DQPSK comparison pattern "1111 0110 0010 1000", if states of the reception state (1) and reception state (2) (refer to FIG. 41 and FIG. 42A through FIG. 42C) are the object DQPSK signal reception state indicated by the double circle, in the reception state (1), the signal sequence of the odd numbered signal and the even numbered signal consecutively is Ik, Qk, and in the reception state (2), the signal sequence of the odd numbered signal and the even-numbered signal consecutively is Qk, Ik+1 (please refer to the presentation on the time axis of the RZ-DQPSK optical signals in FIG. 41). In the case of the object DQPSK signal reception state, the frame synchronization pull-in can be performed, and frame synchronization signals from the frame synchronization circuit 325 can be input to the frame processor 324.

As for No. 2, 5, 6, 11, 12, 15, 16 comparison patterns, states of the reception state (1) and reception state (2) are indicated by crosses; since the interferometer control MZI is performed regardless of the reception state (1) or reception state (2), the controller 10 as shown in FIG. 28 controls the bias voltage or the temperature of the delay interferometers through the delay interferometer controller 2, thereby, the reception state is controlled to approach the state indicated by the triangle, the diamond, the single circle, and the double circle.

As for No. 3 comparison pattern, states of the reception state (1) and reception state (2) are indicated by triangles. If the reception state (1) is identified, even numbered logic inversion and bit swap BS are carried out. In this case, the even number channel setting register "Even ch." of the logical inversion circuit 321 is set to be "1", and logic inversion is performed by the exclusive logic OR circuit, and the switching circuit SW is controlled by the switching controller "SW cont.", thereby, the odd numbered channel and the even numbered channel are exchanged. If the reception state (2) is identified, odd numbered logic inversion, bit swap, and one-bit delay are carried out.

As for No. 4 comparison pattern, states of the reception state (1) and reception state (2) are indicated by diamonds. If the reception state (1) is identified, bit swap BS is carried out. If the reception state (2) is identified, bit swap and one-bit delay are carried out.

As for No. 9 comparison pattern, states of the reception state (1) and reception state (2) are indicated by single circles. If the reception state (1) is identified, odd numbered logic inversion is carried out. If the reception state (2) is identified, even numbered logic inversion is carried out.

As described above, by controlling components of the optical signal receiver of the present embodiment corresponding to the reception state (1) and reception state (2), it is possible to obtain the object reception state, hence, not only when starting operation of the optical signal receiver, but also in the course of operation of the optical signal receiver, it is possible determine the reception state even when various conditions change, and it is possible to obtain the object signal reception state by corresponding control.

14th Embodiment

Figure 31:
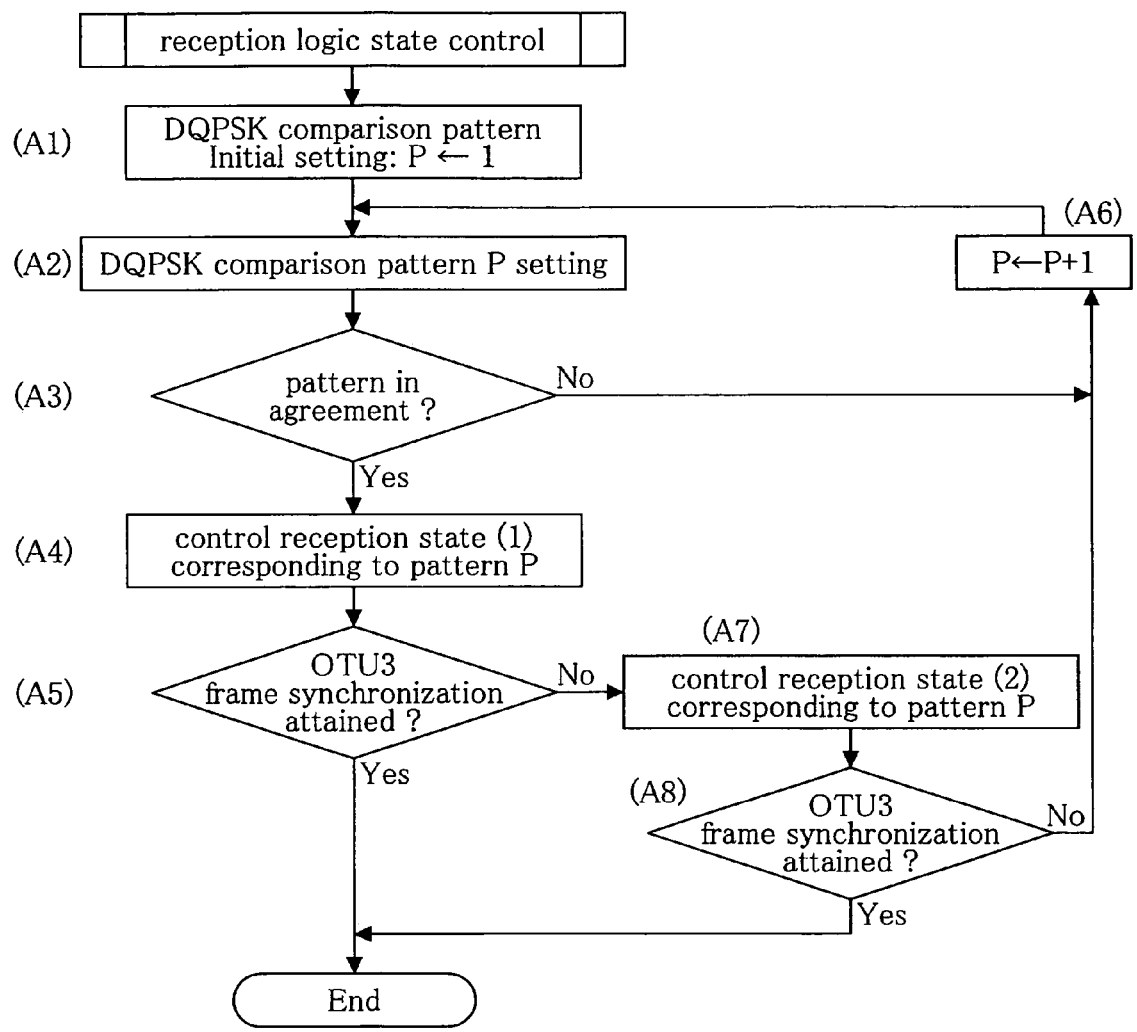
FIG. 31 is a flowchart illustrating operations of an optical signal receiver according to a 14th embodiment of the present invention, which is used in an optical communication system for transmitting DQPSK optical signals.

FIG. 31 is a flowchart illustrating operations of an optical signal receiver according to a 14th embodiment of the present invention, which is used in an optical communication system for transmitting DQPSK optical signals.

FIG. 32 is a table illustrating reception states and control operations corresponding to operations shown in FIG. 31.

In the operations shown in FIG. 31, the phase difference between the π/4 delay interferometer and the −π/4 delay interferometer (as shown in FIG. 28) is maintained to be π/2. In other words, it is not necessary to perform control on the delay interferometers, thus, the reception states indicated by crosses as shown in FIG. 30 can be excluded. Therefore, as shown in FIG. 32, there are only reception states indicated by double circles, single circles, triangles, and diamonds, and there are only eight types of control operations for the reception state (1) and reception state (2). In the table in FIG. 32, when the DQPSK comparison pattern is in agreement with "1111 0110 0010 1000", the object reception state (No. 7) indicated by the double circle is obtained.

Refer to the flowchart in FIG. 31, in step A1, a DQPSK comparison pattern P is initialized. Specifically, as shown by the symbol "P←1" in FIG. 31, the DQPSK comparison pattern P is set to be the first DQPSK comparison pattern (1010 1100 0100 0001) in the table in FIG. 32.

In step A2, in this way, the DQPSK comparison pattern P is set corresponding to the current order number in the table in FIG. 32.

In step A3, the controller 327, as shown in FIG. 29, sets the OTUk-FAS comparison byte in the DQPSK signal reception state identification circuit 326, and determines whether the pattern represented by the OTUk-FAS comparison byte in the DQPSK signal reception state identification circuit 326 is in agreement with the current DQPSK comparison pattern P.

If the pattern is in agreement with the DQPSK comparison pattern P, the routine proceeds to step A4; if the pattern is not in agreement with the DQPSK comparison pattern P, the routine proceeds to step A6 to set the current DQPSK comparison pattern to be the next DQPSK comparison pattern in the table in FIG. 32. Then, the routine proceeds to step A2 to repeat step A2 and step A3 until the pattern is in agreement with the current DQPSK comparison pattern.

For example, if the DQPSK comparison pattern P currently equals the first DQPSK comparison pattern (1010 1100 0100 0001) in the table in FIG. 32, then after step A6, the DQPSK comparison pattern P becomes the second DQPSK comparison pattern (1111 1001 0001 0100) in the table in FIG. 32.

In step A4, if the pattern is in agreement with the DQPSK comparison pattern P, control of the reception state (1) corresponding to the pattern P is performed. For example, when the pattern is in agreement with the first DQPSK comparison pattern in the table in FIG. 32, the reception states are indicated by triangles, and since it is predicted that the control operations on the reception state (1) include logic inversion of even channels and bit swap, the logical inversion circuit 321 is controlled to carry out logic inversion of even channels, and the bit swap circuit 323 is controlled to exchange bits of neighboring channels.

In step A5, it is determined whether OUT (Optical Transport Unit) 3 frame synchronization is attained. Specifically, the frame synchronization circuit 325 as shown in FIG. 29 determines whether frame synchronization is attained.

If the frame synchronization is attained, it indicates that the object reception state is obtained, hence the routine is finished.

If the frame synchronization is not attained, the routine proceeds to step A7.

In step A6, as shown by the symbol "P←P+1" in FIG. 31, the DQPSK comparison pattern P is set to be the next DQPSK comparison pattern in the table in FIG. 32. Then, the routine proceeds to step A2 to repeat operations in step A2 and step A3.

In step A7, since the frame synchronization circuit 325 determines that frame synchronization is not attained after pattern agreement determination and control of the reception state (1), control of the reception state (2) corresponding to the pattern P is performed.

In step A8, it is determined whether OUT (Optical Transport Unit) 3 frame synchronization is attained.

If the frame synchronization is attained, it indicates that the object reception state is obtained, hence the routine is finished.

If the frame synchronization is not attained, the routine proceeds to step A6 to set the DQPSK comparison pattern P to be the next DQPSK comparison pattern in the table in FIG. 32, and then, repeat operations in step A2 through step A8.

It should be noted that the order of the DQPSK comparison patterns in the tables in FIG. 30 and FIG. 32 is just an example, it is certain that the DQPSK comparison patterns can be arranged in different order.

In addition, it is described above that the DQPSK comparison patterns are selected sequentially to identify the reception state, but the first to eighth DQPSK comparison patterns in the tables in FIG. 32 may be stored in the DQPSK signal reception state identification circuit 326 in advance, and comparison may be made with each of the eight DQPSK comparison patterns to find the matching DQPSK comparison pattern, and thereby to identify the reception state.

15th Embodiment

FIG. 33A through FIG. 33D are tables illustrating reception states of an optical signal receiver according to a 15th embodiment of the present invention, which is used in an optical communication system for transmitting DQPSK optical signals.

Specifically, FIG. 33A illustrates reception states when the π/4 delay interferometer and the −π/4 delay interferometer of the reception processing unit 1 (as shown in FIG. 28) are controlled via the controller 10.

As described above, in the table in FIG. 33A, a double circle indicates an object DQPSK signal reception state, and there are totally 16 types of reception states indicated respectively by the double circle, single circles, triangles, a diamond, and crosses.

If the phase difference between the π/4 delay interferometer and the −π/4 delay interferometer is controlled to be about π/2, the reception states indicated by crosses disappear, and there are only four possible reception states.

FIG. 33B illustrates reception states when the phase difference between the π/4 delay interferometer and the −π/4 delay interferometer is controlled to be about π/2.

As shown in FIG. 33B, there are only four possible reception states indicated by open squares, including one reception state indicated by the double circle, one reception state indicated by the single circle, and two reception states indicated by the triangles.

In addition, if the phase of multiplexing in the multiplexer 6 (as shown in FIG. 28) is fixed completely, since the header position cannot be determined based on the frame synchronization when the de-serializing unit 8 converts the multiplexed signals from the multiplexer 6 into 16 parallel signals, as described above, there are the reception state (1) and reception state (2) in the reception processing unit 9. Thus, the 16 parallel signals input to the reception processing unit 9 correspond to the reception state (1) or the reception state (2).

FIG. 33C illustrates the reception states (1).

FIG. 33D illustrates the reception states (2).

As shown in FIG. 33C and FIG. 33D, there are only four possible reception states indicated by open squares, including one reception state indicated by the double circle, one reception state indicated by the single circle, and two reception states indicated by the triangles.

FIG. 34 is a table illustrating reception states and control operations corresponding to the above-described four states in FIG. 33A through FIG. 33D.

By selecting and setting the four types of DQPSK comparison patterns (No. 1 to No. 4) as shown in the table in FIG. 34, it is possible to identify the reception states, and the logical inversion circuit 321, the one-bit delay circuit 322, and the bit swap circuit 323 (as shown in FIG. 29) are controlled corresponding to the reception states.

For example, the No. 1 item in the table in FIG. 34 corresponds to the No. 3 item in the table in FIG. 30, the states of the reception state (1) and reception state (2) are indicated by triangles. If the reception state (1) is identified, even numbered logic inversion is carried out by the logical inversion circuit 321, and bit swap is carried out by the bit swap circuit 323. If the reception state (2) is identified, odd numbered logic inversion is carried out by the logical inversion circuit 321, bit swap is carried out by the bit swap circuit 323, and one-bit delay is carried out by the one-bit delay circuit 322. As a result, the object reception state indicated by the double circle is obtained.

The No. 3 item in the table in FIG. 34 corresponds to the No. 10 item in the table in FIG. 30, the states of the reception state (1) and reception state (2) are indicated by single circles. In the reception states (1) and (2), odd numbered logic inversion and even numbered logic inversion are carried out by the logical inversion circuit 321, respectively.

In the present embodiment, since it is possible to use four types of DQPSK comparison patterns, corresponding to one reception state indicated by the double circle, one reception state indicated by the single circle, and two reception states indicated by the triangles, for the reception state identification, it is sufficient for the DQPSK signal reception state identification circuit 326 (as shown in FIG. 29) to set four types of DQPSK comparison patterns for parallel comparison, thereby, it is possible to perform the reception state identification quickly.

15th Embodiment

Figure 35:
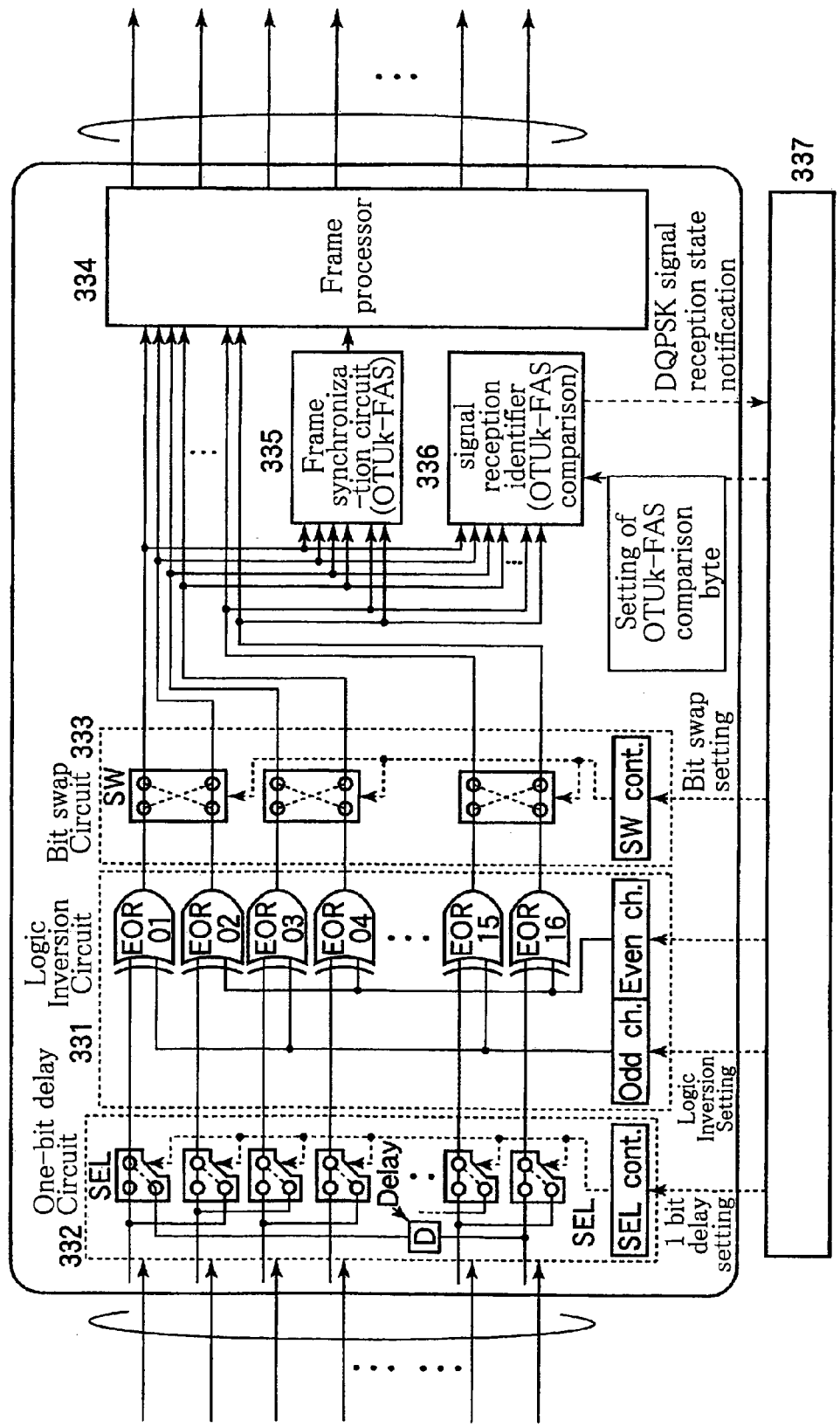
FIG. 35 is a block diagram illustrating a structure of the principal portion of the reception processing unit 9 according to a 15th embodiment.

FIG. 35 is a block diagram illustrating a structure of the principal portion of the reception processing unit 9 according to a 15th embodiment. In FIG. 35, the same reference numbers are assigned to the same elements as those shown previously.

As illustrated in FIG. 35, the reception processing unit 9 includes a logical inversion circuit 331, a one-bit delay circuit 332, a bit swap circuit 333, a frame processor 334, a frame synchronization circuit 335, a DQPSK signal reception state identification circuit 336, and a controller 337.

The logical inversion circuit 331 includes exclusive OR logical circuits EOR01 through EOR16, a register "Odd ch." for setting an odd number channel, and a register "Even ch." for setting an even number channel. The one-bit delay circuit 332 includes selectors SEL, a selector controller "SEL cont.", a delay circuit "D" "delay" for delaying one bit. The bit swap circuit 333 includes switching circuits SW, and a switching controller "SW cont.".

The one-bit delay circuit 332 and the bit swap circuit 333 correspond to the logic processing circuit 9a as shown in FIG. 28, The one-bit delay circuit 322, the logical inversion circuit 321, and the bit swap circuit 323 correspond to the logic processing circuit 9a as shown in FIG. 28, and the de-serializing unit 8 outputs demodulated signals, which include 16 parallel in-phase signals and quadrature-phase signals (indicated by "2.7 G×16"), to the reception processing unit 9, and these signals are input to the frame processor 334, the frame synchronization circuit 335, and the DQPSK signal reception state identification circuit 336 through the one-bit delay circuit 332, the logical inversion circuit 331, and the bit swap circuit 333.

FIG. 36 is a table illustrating reception states and control operations when the phase difference between the π/4 delay interferometer and the −π/4 delay interferometer (as shown in FIG. 28) is maintained to be π/2. As described above, in this case, it is not necessary to perform control on the delay interferometers, thus, the reception states indicated by crosses as shown in FIG. 30 can be excluded. Therefore, as shown in FIG. 36, there are only reception states indicated by double circles, single circles, triangles, and diamonds, and there are only eight types of control operations for the reception state (1) and reception state (3). In the table in FIG. 36, when the DQPSK comparison pattern is in agreement with "1111 0110 0010 1000", the object reception state (No. 7) indicated by the double circle is obtained.

For the reception state (1) the same as the reception state (1) in FIG. 32, the control operations are the same, for the reception state (3), which correspond to the reception state (2) in FIG. 32. However, as shown in FIG. 35, since the logical inversion circuit 331 is connected to the output end of the one-bit delay circuit 332, the control operations are different.

Figure 37:
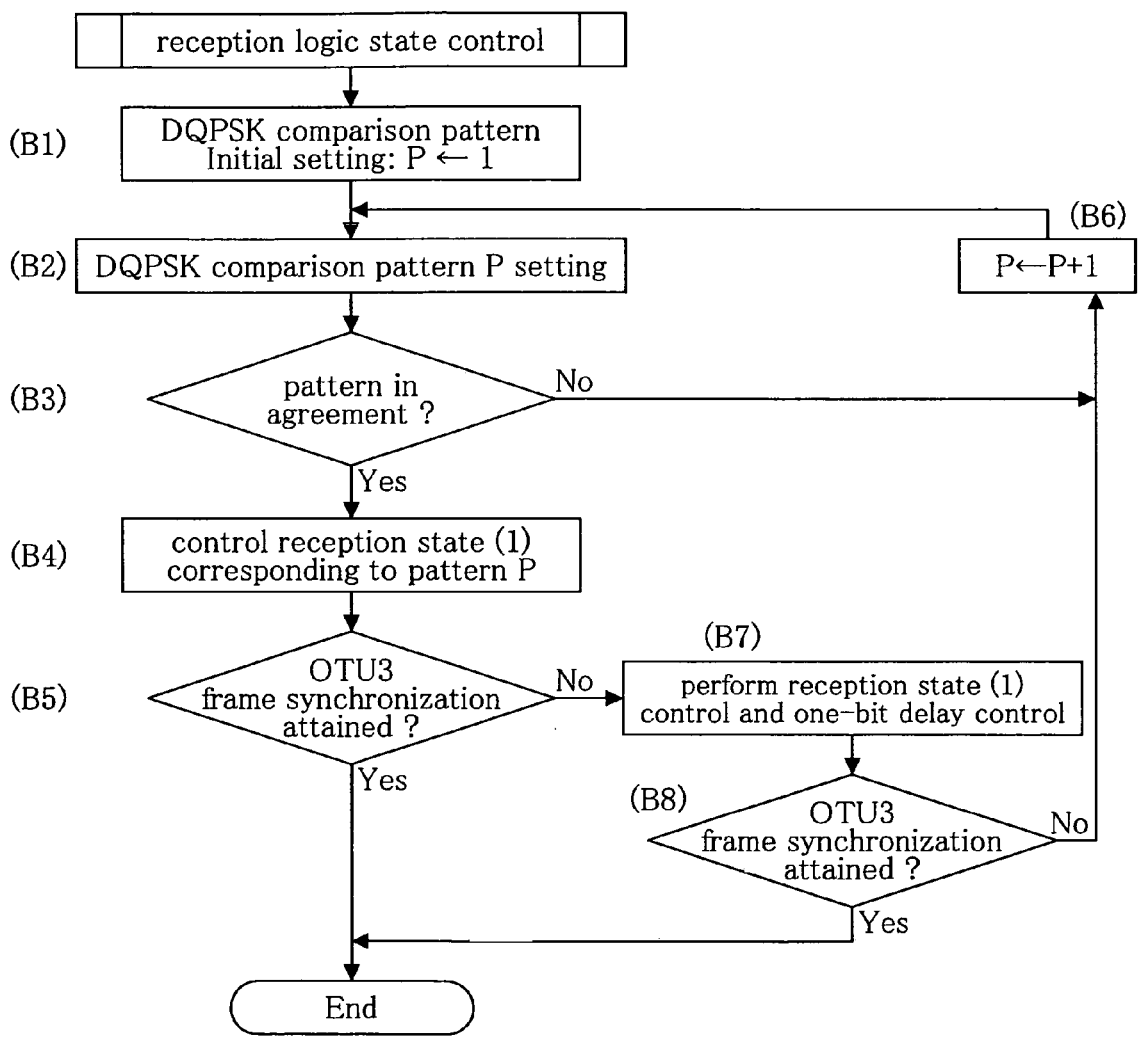
FIG. 37 is a flowchart illustrating operations of the optical signal receiver according to the 16th embodiment of the present invention, which is used in an optical communication system for transmitting DQPSK optical signals.

FIG. 37 is a flowchart illustrating operations of the optical signal receiver according to the 16th embodiment of the present invention, which is used in an optical communication system for transmitting DQPSK optical signals.

In step B1, a DQPSK comparison pattern P is initialized. Specifically, as shown by the symbol "P←1" in FIG. 37, the DQPSK comparison pattern P is set to be the first DQPSK comparison pattern (1010 1100 0100 0001) in the table in FIG. 36.

In step B2, in this way, the DQPSK comparison pattern P is set corresponding to the current order number in the table in FIG. 36.

In step B3, the controller 337, as shown in FIG. 35, sets the OTUk-FAS comparison byte in the DQPSK signal reception state identification circuit 336, and determines whether the pattern represented by the OTUk-FAS comparison byte in the DQPSK signal reception state identification circuit 336 is in agreement with the current DQPSK comparison pattern P.

If the pattern is in agreement with the DQPSK comparison pattern P, the routine proceeds to step B4; if the pattern is not in agreement with the DQPSK comparison pattern P, the routine proceeds to step B6 to set the current DQPSK comparison pattern to be the next DQPSK comparison pattern in the table in FIG. 36. Then, the routine proceeds to step B2 to repeat step B2 and step B3 until the pattern is in agreement with the current DQPSK comparison pattern.

For example, if the DQPSK comparison pattern P currently equals the first DQPSK comparison pattern (1010 1100 0100

0001) in the table in FIG. 36, then after step B6, the DQPSK comparison pattern P becomes the second DQPSK comparison pattern (1111 1001 0001 0100) in the table in FIG. 36.

In step B4, if the pattern is in agreement with the DQPSK comparison pattern P, control of the reception state (1) corresponding to the pattern P is performed. For example, when the pattern is in agreement with the first DQPSK comparison pattern in the table in FIG. 36, the reception states are indicated by triangles, and since it is predicted that the control operations on the reception state (1) include logic inversion of even channels and bit swap, the logical inversion circuit 331 as shown in FIG. 35 is controlled to carry out logic inversion of even channels, and the bit swap circuit 333 is controlled to exchange bits of neighboring channels.

In step B5, it is determined whether OUT (Optical Transport Unit) 3 frame synchronization is attained. Specifically, the frame synchronization circuit 335 as shown in FIG. 35 determines whether frame synchronization is attained.

If the frame synchronization is attained, it indicates that the object reception state is obtained, hence the routine is finished.

If the frame synchronization is not attained, the routine proceeds to step B7.

In step B6, as shown by the symbol "P←P+1" in FIG. 33, the DQPSK comparison pattern P is set to be the next DQPSK comparison pattern in the table in FIG. 36. Then, the routine proceeds to step B2 to repeat operations in step B2 and step B3.

In step B7, since the frame synchronization circuit 335 determines that frame synchronization is not attained after pattern agreement determination and control of the reception state (1), the one-bit delay circuit 332 (as shown in FIG. 35) is controlled to perform one-bit delay in addition to control of the reception state (1), and the resulting reception state is regarded as the "reception state (3)" in FIG. 36.

In step B8, it is determined whether OUT (Optical Transport Unit) 3 frame synchronization is attained.

If the frame synchronization is attained, it indicates that the object reception state is obtained, hence the routine is finished.

If the frame synchronization is not attained, the routine proceeds to step B6 to set the DQPSK comparison pattern P to be the next DQPSK comparison pattern in the table in FIG. 36, and then, repeat operations in step B2 through B8.

It should be noted that the order of the DQPSK comparison patterns in the tables in FIG. 36 is just an example, it is certain that the DQPSK comparison patterns can be arranged in different order.

In addition, it is described above that the DQPSK comparison patterns are selected sequentially to identify the reception state, but the first to eighth DQPSK comparison patterns in the tables in FIG. 36 may be stored in the DQPSK signal reception state identification circuit 336 in advance, and comparison may be made with each of the eight DQPSK comparison patterns to find the matching DQPSK comparison pattern, and thereby to identify the reception state.

While the invention has been described with reference to specific embodiments chosen for purpose of illustration, it should be apparent that the invention is not limited to these embodiments, but numerous modifications could be made thereto by those skilled in the art without departing from the basic concept and scope of the invention.

This patent application is based on Japanese priority patent applications No. 2005-054371 filed on Feb. 28, 2005, No. 2005-206467 filed on Jul. 15, 2005, and No. 2006-116291 filed on Apr. 20, 2006, the entire contents of which are hereby incorporated by reference.

What is claimed is:

1. A signal reception device for receiving and demodulating an optical signal modulated by a Differential Quadrature Phase Shift Keying (DQPSK) modulation scheme, said signal reception device comprising:
a front end including two delay interferometers and opto-electric conversion elements that receives the DQPSK optical signal and converts the DQPSK optical signal into an in-phase signal and a quadrature-phase signal;
a clock and data recovery that regenerates a clock and a data signal based on the in-phase signal and the quadrature-phase signal;
a multiplexer that multiplexes the in-phase signal and the quadrature-phase signal output from the clock and data recovery;
a reception frame processing unit that detects frame synchronization based on the signal multiplexed by the multiplexer; and
a controller that, based on a detection result from the reception frame processing unit indicating an out-of-frame-synchronization state, controls logical inversion operations in the clock and data recovery and controls a multiplexing timing in the multiplexer.

2. A signal reception device for receiving and demodulating an optical signal modulated by a Differential Quadrature Phase Shift Keying (DQPSK) modulation scheme, said signal reception device comprising:
a front end including two delay interferometers and opto-electric conversion elements that receives the DQPSK optical signal and converts the DQPSK optical signal into an in-phase signal and a quadrature-phase signal;
a clock and data recovery that regenerates a clock and a data signal based on the in-phase signal and the quadrature-phase signal;
a multiplexer that multiplexes the in-phase signal and the quadrature-phase signal output from the clock and data recovery;
a reception frame processing unit that detects frame synchronization based on the signal multiplexed by the multiplexer; and
a controller that, based on a detection result from the reception frame processing unit indicating an out-of-frame-synchronization state, controls logical inversion operations in the clock and data recovery, controls a multiplexing timing in the multiplexer, and controls the delay interferometers in the front end.

3. The signal reception device as claimed in claim 1 or 2, wherein the reception frame processing unit comprises:
a frame processor that performs a frame synchronization pull-in operation and a frame de-mapping operation;
a frame synchronization circuit that detects a synchronization bit string in the multiplexed signal obtained by multiplexing the in-phase signal and the quadrature-phase signal in the multiplexer, and performs frame synchronization detections;
a register that stores combinations of plural of the synchronization bit strings; and
an identification section that, based on the synchronization bit strings of the multiplexed signal and the synchronization bit strings stored in the register, identifies a signal reception state, and notifies the controller of the signal reception state.

4. The signal reception device as claimed in claim 1 or 2, wherein:
the controller, based on the signal reception state identification information, determines whether a detected signal reception state is an object state, whether the detected signal reception state is a state convertible to the object state by the logical inversion control, or whether the detected signal reception state is a state convertible to the object state by the logical inversion control and the multiplexing timing control;

the controller does not perform control operations when the detected signal reception state is the object state;

the controller controls the clock and data recovery to perform the logical inversion control when the detected signal reception state is a state convertible to the object state by the logical inversion control; and the controller controls the clock and data recovery to perform the logical inversion control and controls the multiplexer to perform the multiplexing timing control when the detected signal reception state is a state convertible to the object state by the logical inversion control and the multiplexing timing control.

5. The signal reception device as claimed in claim 1 or 2, further comprising:

an in-phase detector configured to detect whether a quadrature phase relation holds based on exclusive OR logic between the in-phase signal and the quadrature-phase signal input to the multiplexer;

wherein the controller shifts a phase of the delay interferometers by $\pi/2$ or $-\pi/2$ based on detection results of the in-phase detector.

6. The signal reception device as claimed in claim 1 or 2, wherein the reception frame processing unit comprises:

at least one of a logic inversion circuit that performs logic inversion of input data according to a logic inversion control signal from the controller and a neighboring bit exchanging circuit that exchanges neighboring bits of the input data.

7. The signal reception device as claimed in claim 1 or 2, wherein according to a logic inversion control signal from the controller, the reception frame processing unit performs logic inversion control on an in-phase signal component and a quadrature-phase signal component output from the front end, independently.

8. The signal reception device as claimed in claim 1 or 2, wherein the reception frame processing unit comprises:

a frame processor that performs a frame synchronization pull-in operation and a frame de-mapping operation;

a frame synchronization circuit including a plurality of frame synchronization units, each of said frame synchronization units receiving a synchronization bit string in the multiplexed signal and performing frame synchronization detections corresponding to respective combinations of plural of the synchronization bit strings; and an identification section that identifies a signal reception state depending on which one of the frame synchronization units a detection signal is output from, and notifies the controller of information of the signal reception state identification.

* * * * *

UNITED STATES PATENT AND TRADEMARK OFFICE
CERTIFICATE OF CORRECTION

PATENT NO. : 7,689,133 B2  Page 1 of 1
APPLICATION NO. : 11/510729
DATED : March 30, 2010
INVENTOR(S) : Toru Katagiri et al.

It is certified that error appears in the above-identified patent and that said Letters Patent is hereby corrected as shown below:

On the Title Page Item (56) (Other Publications), Line 3, change "Ei-Sahn," to --El-Sahn,--.

On the Title Page Item (56) (Other Publications), Line 4, change "V. Phan." to --V. Plant.--.

Column 42, Line 64, after "wherein" delete ":".

Signed and Sealed this

Thirteenth Day of July, 2010

David J. Kappos
*Director of the United States Patent and Trademark Office*